United States Patent

Jaekel et al.

[11] Patent Number: 6,092,865
[45] Date of Patent: Jul. 25, 2000

[54] HYDROFORMED SPACE FRAME AND METHOD OF MANUFACTURING THE SAME

[75] Inventors: Fred G. Jaekel, Richmond Hill, Canada; Gianfranco Gabbianelli, Troy; Frank A. Horton, Rochester Hills, both of Mich.

[73] Assignee: Cosma International Inc., Concord, Canada

[21] Appl. No.: 09/173,554

[22] Filed: Oct. 16, 1998

Related U.S. Application Data

[60] Provisional application No. 60/062,204, Oct. 16, 1997.

[51] Int. Cl.⁷ .................................................. B60J 9/00
[52] U.S. Cl. .................... 296/205; 296/29; 296/146.5; 296/203.04
[58] Field of Search .................. 296/29, 185, 187, 296/193, 194, 195, 202, 203.01, 203.02, 203.03, 203.04, 204, 205, 209, 146.5; 72/60, 61

[56] References Cited

U.S. PATENT DOCUMENTS

| | | | |
|---|---|---|---|
| 1,581,931 | 4/1926 | Lamplugh | 296/205 |
| 1,846,567 | 2/1932 | Murray, Jr. | 280/796 |
| 2,269,451 | 1/1942 | Ford | 296/28 |
| 2,389,907 | 11/1945 | Helmuth | 296/28 |
| 2,668,722 | 2/1954 | Muller | 280/106 |
| 3,159,419 | 12/1964 | Kerby | 296/28 |
| 3,630,056 | 12/1971 | Cuq | 72/28 |
| 3,971,588 | 7/1976 | Bauer | 296/28 |
| 4,355,844 | 10/1982 | Muzzarelli | 296/205 |
| 4,471,519 | 9/1984 | Capello et al. | 29/460 |
| 4,618,163 | 10/1986 | Hasler et al. | 280/785 |
| 4,648,208 | 3/1987 | Baldamus et al. | 49/502 |
| 4,660,345 | 4/1987 | Browning | 52/648 |
| 4,726,166 | 2/1988 | DeRees | 52/694 |
| 4,735,355 | 4/1988 | Browning | 228/189 |
| 4,759,111 | 7/1988 | Cudini | 29/523 |
| 4,986,597 | 1/1991 | Clausen | 296/205 |

(List continued on next page.)

FOREIGN PATENT DOCUMENTS

| | | | |
|---|---|---|---|
| 0 570 150 A1 | 11/1993 | European Pat. Off. | B62D 23/00 |
| 694 774 | 12/1930 | France | 1/10 |
| 867 059 | 2/1953 | Germany . | |
| 4122862 | 1/1993 | Germany | F16B 7/00 |
| WO 97/00595 | 1/1997 | WIPO | H05B 6/10 |

OTHER PUBLICATIONS

Hanicke et al., IBEC 96, Detroit, "Lighter Car Body in Aluminum with Hydroforming Technology R&D Results", Oct. 1–3.

Primary Examiner—Stephen T. Gordon
Assistant Examiner—Paul Chenevert
Attorney, Agent, or Firm—Pillsbury Madison & Sutro LLP

[57] ABSTRACT

A space frame includes a pair of laterally spaced, longitudinally extending side rail structures and longitudinally spaced pairs of laterally spaced upright structures having joints at their lower ends with the pair of side rail structures. The longitudinal spaced pairs of laterally spaced upright structures extend upwardly from the side rails structures and define a plurality of pairs of pillars, including a pair of forward A pillars, a longitudinally spaced pair of B pillars, and a longitudinally spaced pair of rearward end pillars. A pair of the side roof structures has joints with the pair of A pillars. The pair of side roof structures extends longitudinally rearwardly from the pair of A pillars and have joints with the pair of B pillars and with the pair of rearward end pillars. Longitudinally spaced cross structures have joints with the pair of side rail structures, with the pair of A pillars and with the pair of side roof structures. A front structural assembly has joints with a forward end of the pair of side rail structures and with the A pillars at positions spaced upwardly of the pair of side rail structures. A plurality of the structures have more than two spaced successive joints which determine defining lengths in the space frame. The plurality of structures comprise a pair of hydroformed tubular members, each of which is defined by an irregularly outwardly deformed tubular metallic wall fixed into a predetermined irregular exterior surface configuration.

26 Claims, 46 Drawing Sheets

U.S. PATENT DOCUMENTS

| | | | |
|---|---|---|---|
| 5,031,958 | 7/1991 | Fujita et al. | 296/194 |
| 5,094,313 | 3/1992 | Mauws | 180/210 |
| 5,106,249 | 4/1992 | Janotik | 411/43 |
| 5,209,541 | 5/1993 | Janotik | 296/29 |
| 5,213,386 | 5/1993 | Janotik et al. | 296/29 |
| 5,228,259 | 7/1993 | Haddad et al. | 52/653.2 |
| 5,233,789 | 8/1993 | Priest et al. | 49/360 |
| 5,233,856 | 8/1993 | Shimanovski et al. | 72/62 |
| 5,269,585 | 12/1993 | Klages et al. | 296/205 |
| 5,271,687 | 12/1993 | Holka et al. | 403/233 |
| 5,320,403 | 6/1994 | Kazyak | 296/203 |
| 5,332,281 | 7/1994 | Janotik et al. | 296/209 |
| 5,333,775 | 8/1994 | Bruggemann et al. | 228/157 |
| 5,338,080 | 8/1994 | Janotik et al. | 296/29 |
| 5,343,666 | 9/1994 | Haddad et al. | 52/648.1 |
| 5,458,393 | 10/1995 | Benedyk | 296/203 |
| 5,460,026 | 10/1995 | Schafer | 72/55 |
| 5,481,892 | 1/1996 | Roper et al. | 72/61 |
| 5,518,209 | 5/1996 | Chicoine et al. | 244/158 R |
| 5,549,352 | 8/1996 | Janotik et al. | 296/209 |
| 5,561,902 | 10/1996 | Jacobs et al. | 29/897.2 |
| 5,564,785 | 10/1996 | Schultz et al. | 297/452.2 |
| 5,577,796 | 11/1996 | Clausen | 296/202 |
| 5,581,947 | 12/1996 | Kowall et al. | 49/451 |
| 5,582,052 | 12/1996 | Rigsby | 72/62 |
| 5,600,983 | 2/1997 | Rigsby | 72/61 |
| 5,641,176 | 6/1997 | Alatalo | 280/690 |
| 5,649,735 | 7/1997 | Tomforde et al. | 296/71 |
| 5,673,929 | 10/1997 | Alatalo | 280/690 |
| 5,718,048 | 2/1998 | Horton et al. | 29/897.2 |
| 5,720,092 | 2/1998 | Ni et al. | 29/421.1 |
| 5,720,511 | 2/1998 | Benedyk | 296/203 |
| 5,765,906 | 6/1998 | Iwatsuki et al. | 296/203 |
| 5,794,398 | 8/1998 | Kaehler et al. | 52/653.2 |
| 5,800,003 | 9/1998 | Clenet | 296/29 |
| 5,845,382 | 12/1998 | Schultz et al. | 29/421.1 |
| 5,848,853 | 12/1998 | Clenet | 403/272 |

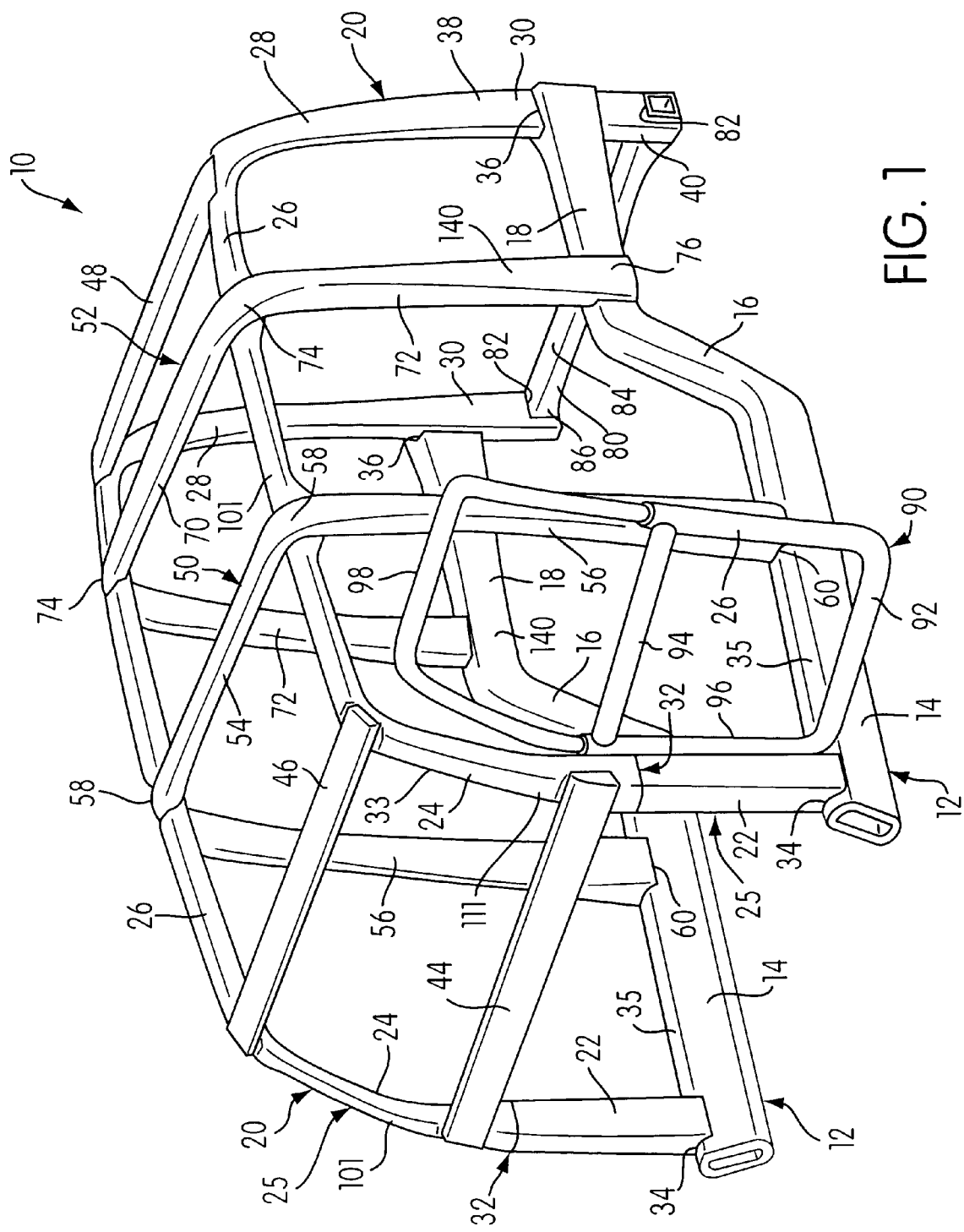

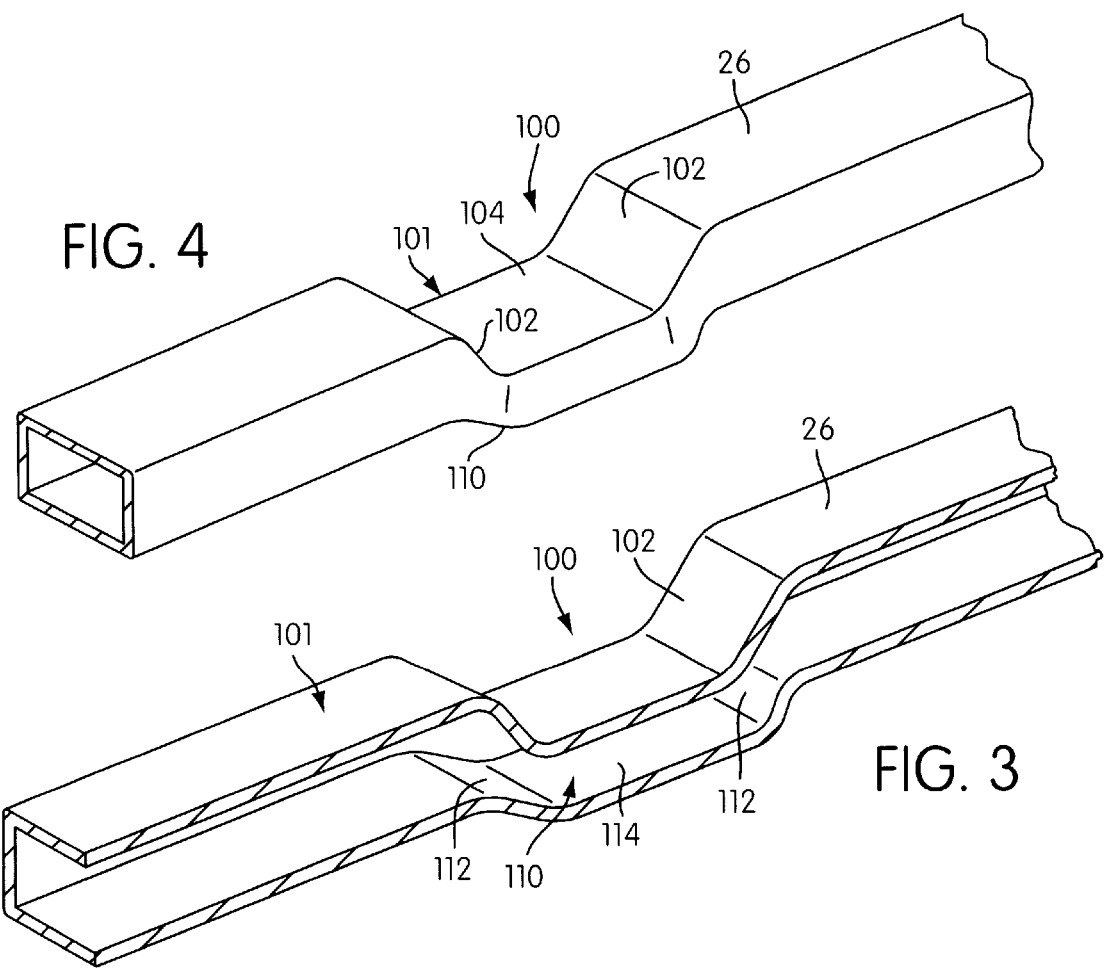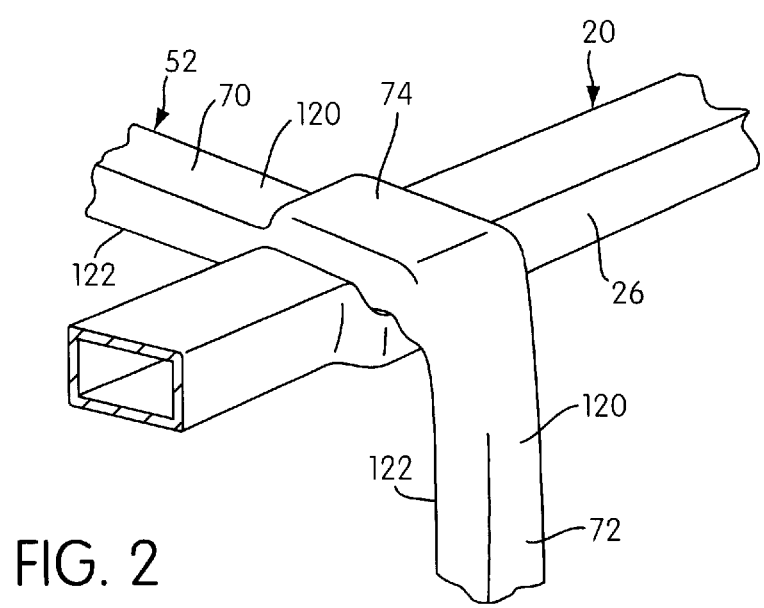

6,092,865

HYDROFORMED SPACE FRAME AND METHOD OF MANUFACTURING THE SAME

This application claims the benefit of U.S. Provisional Application No. 60/062,204, filed Oct. 16, 1997.

FIELD OF THE INVENTION

The present invention relates to space frames for motor vehicles.

BACKGROUND OF THE INVENTION

It is known in the automotive industry to provide a vehicle space frame which can be used to mount various components and body panels for the motor vehicle. Typically, the space frame is made from many frame structures which are joined together by welding or other types of connections. The numerous connections that are typically required to form a space frame from the frame structures leads to tolerance build-up, which causes dimensional accuracy problems in the space frame.

It is an object of the invention to provide a space frame that requires fewer parts and fewer connections than the conventional space frame, so that a space frame of greater dimensional accuracy can be produced.

In accordance with this object, the present invention provides a space frame for a motor vehicle, comprising a first hydroformed, longitudinally extending tubular lower side rail member, and a second hydroformed, longitudinally extending tubular lower side rail member, the lower side rail members being laterally spaced from one another. Also included is a pair of hydroformed tubular upper longitudinal members, each being an integrally formed member fixed to an associated one of the lower side rail members. The structure of each upper longitudinal member includes a longitudinally extending portion constructed and arranged to support a roof of the motor vehicle, each longitudinally extending portion extending longitudinally between an upper end of an A-pillar structure provided by the space frame and an upper end of a rearward-most pillar structure of the space frame. The hydroformed tubular upper longitudinal members thus define lengths between the vehicle A-pillar structures and the rearward-most structures of the space frame. Laterally extending connecting structure connects the lower side rail members to one another.

The object of the present invention can be achieved by other structural components, as well as various method of manufacture. For example, in one method of the invention, the following steps are performed: placing a tubular metal blank having a generally U-shaped configuration into a hydroforming die assembly, the die assembly having die surfaces defining a die cavity; providing pressurized fluid to an interior of the tubular metal blank so as to expand the blank into conformity with the die surfaces of the die cavity and thereby form a U-shaped hydroformed cross member; positioning first and second lower side rail members in laterally spaced relation to one another; connecting a first end of the hydroformed cross member to the first lower side rail member; and connecting a second end of the hydroformed cross member to the second lower side rail member.

Because fewer parts are required in accordance with the space frame of the present invention, assembly is made much simpler.

SUMMARY OF THE INVENTION

An object of the present invention is to meet the need expressed above by providing a space frame comprising a pair of laterally spaced, longitudinally extending side rail structures and longitudinally spaced pairs of corresponding laterally spaced upright structures having joints at their lower ends with the pair of side rail structures and extending upwardly therefrom defining a plurality of pairs of pillars including a pair of forward A pillars, a longitudinally spaced pair of B pillars, and a longitudinally spaced pair of rearward end pillars. A pair of the side roof structures are integral with the pair of A pillars. The pair of side roof structures extend longitudinally rearwardly from the pair of A pillars and the pair of side roof structures have joints with the pair of B pillars and the pair of rearward end pillars. Longitudinally spaced cross structures having joints with the pair of side rail structures, the pair of A pillars and the pair of side roof structures. A front structural assembly has joints with a forward end of the pair of side rail structures and with the A pillars at positions spaced upwardly of the pair of side rail structures. A plurality of all of the structures are hydroformed members, each hydroformed member being defined by an irregularly, outwardly deformed tubular metallic wall fixed into a predetermined irregular exterior surface configuration. The hydroformed members include a pair of hydroformed members forming the pair of side roof structures integral with the A pillars and having more than two spaced successive joints which determine defining longitudinal lengths in the space frame.

Other objects, features, and advantages of the present invention will become apparent from the following detailed description, the accompanying drawings, and the appended claims.

BRIEF DESCRIPTION OF THE DRAWINGS

FIG. 1 is a perspective view of a vehicle space frame manufactured in accordance with the principles of the present invention;

FIG. 2 is a perspective view of a connection between a rearward cross-structure at one corner portion thereof and the associated uppermost straight portion of one of the longitudinal upper structures of the first embodiment illustrated in FIG. 1;

FIGS. 3 and 4 are a cross-sectional view and a partial perspective view of the straight portion of the connection illustrated in FIG. 2;

DETAILED DESCRIPTION OF THE DRAWINGS

Figure 5:
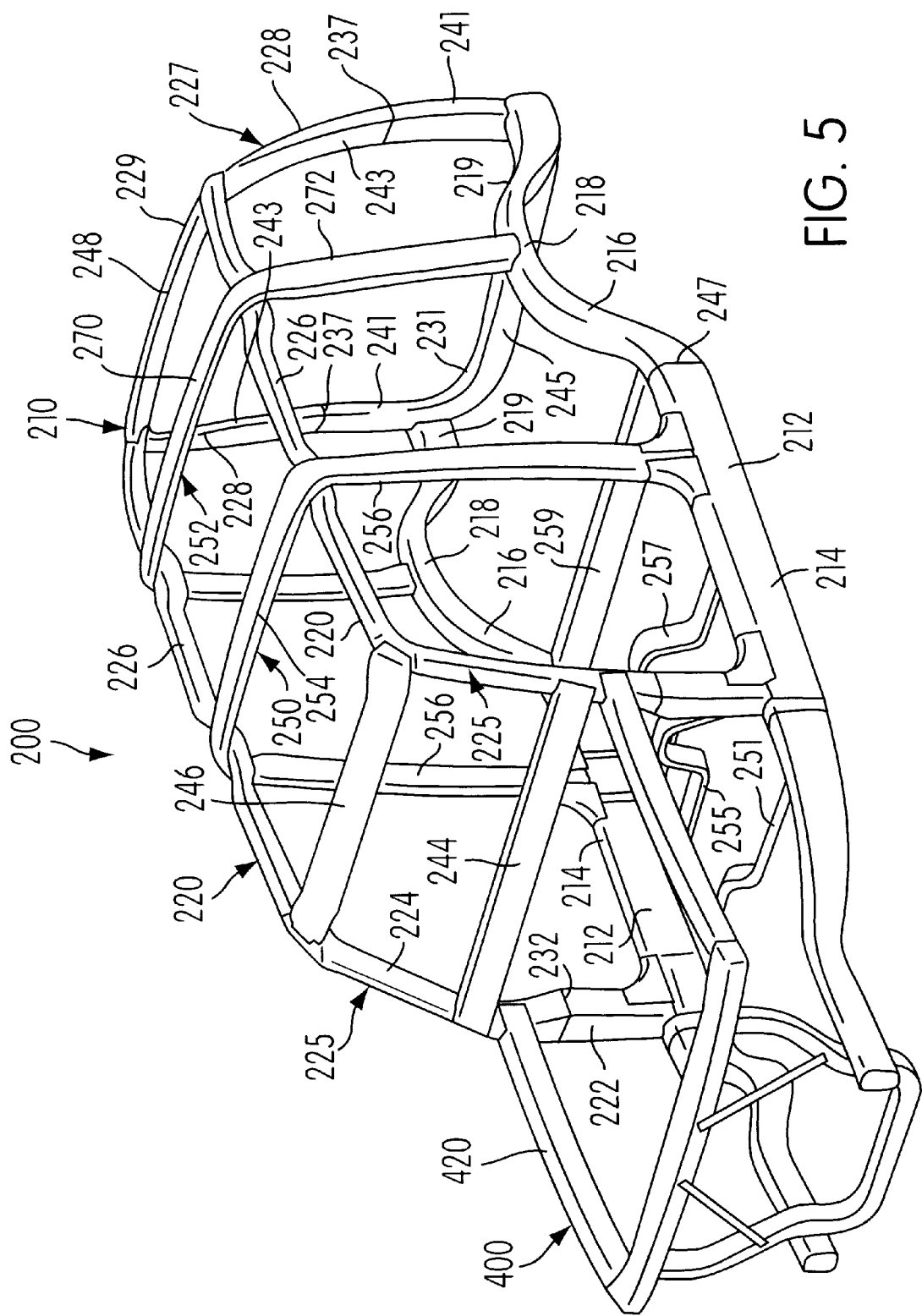
FIG. 5 is a perspective view of a second embodiment of a vehicle space frame manufactured in accordance with the principles of the present invention.

FIG. 1 is a perspective view of a vehicle space frame 10 manufactured in accordance with the principles of the present invention. The vehicle space frame 10 comprises a pair of laterally spaced, longitudinally extending lower side structures 11. Each of the side structures 11 has a relatively straight forward portion 14 which transitions into an upwardly and rearwardly sloping intermediate portion 16. In addition, each of the side structures 11 includes a generally straight rearward portion 18 extending rearwardly from the upper rearward end of the intermediate portion 16. The forward portion 14 and rearward portion 18 of the lower side rail structures 11 are disposed generally horizontally, and parallel to the ground and one another in an assembled vehicle. The intermediate portion 16 provides the rear "kick-up" for accommodating a rear wheel well.

The side rail structures 11 are preferably each formed from a straight tubular blank (formed by conventional roll forming and seam welding) which are bent generally into the "S" configuration shown, then diametrically expanded, and shaped in any conventional hydroforming operation to form two hydroformed lower side rail members 12.

The vehicle space frame 10 further includes a pair of longitudinal upper structures 19 having a generally inverted U-shaped configuration. Each upper structure 19 is preferably a hydroformed member 20. Each of the upper members 20 includes a forwardly disposed, lower vertical portion 22, which transitions into an upwardly and rearwardly extending forward portion 24. The portions 22 and 24 form the "A-pillar" structures of the vehicle space frame, as generally indicated at 25. Each longitudinal upper member 20 further includes an uppermost, longitudinally extending, generally straight portion 26, which transitions from and extends rearwardly from the upwardly and rearwardly extending forward portions 24. The straight portions 26 constitute the bight portion of the generally inverted U-shaped configuration of the longitudinal upper member 20 and provides roof structure for the space frame 10. Towards the rearward portion of the longitudinal upper members 20 are downwardly and rearwardly extending portions 28, which transition from the rearward portions of the uppermost straight portions 26. The downwardly and slightly rearwardly extending portions 28 form the space frame "D-pillar" structures. Finally, the longitudinal upper members 20 each terminate in respective lower end portions 30 connected with the rearward ends of side rail members 12.

As shown, each longitudinal upper member 20 preferably has a generally rectangular, closed cross-section throughout its extent. In addition, it should be appreciated that both of the longitudinal upper members 20 have been hydroformed from a single tubular blank structure, preferably formed from two separately roll-formed tubular members which have been butt-welded to one another at butt-welded connection 32. In particular, the butt-welded connection 32 is performed prior to the hydroforming operation and connects two separate tubular blank members of different diameter to one another. More specifically, because the lower vertical portions 22 have a much greater diameter than the upwardly and rearwardly extending forward portions 24, these portions of each longitudinal upper member 20 are preferably formed from blanks having substantially different diameters. The connection 32 can be accomplished by either utilizing a reduction tool for reducing a diameter of one end of the tubular blank which forms the lower vertical portion 22 so that such end of the blank can be butt-welded to the end of the smaller diameter roll-formed blank which forms the rest of the longitudinal upper member, as indicated by reference numeral 33. Alternately, a flaring or expansion tool can be used to expand the smaller diameter blank at the end thereof which is to form the lower forward end of the upwardly and rearwardly extensions forward portion 24 so as to provide the end of that blank portion (which forms portion 33) with substantially the same diameter as the adjoining end of the blank which is to form the lower vertical portion 22. The butt-welding operation can be performed either before or after the relevant tubular blank portions (which are to form portion 33) are bent into a U-shaped configuration. Bending of the blank is conducted prior to hydroforming. After the blank portions are butt welded to one another to form a complete single blank structure, the single blank structure is hydroformed as a single structure into the associated longitudinal upper member 20.

In view of the rather severe bends of >30° in the U-shaped longitudinal upper structures 20 and in the side rails 12, the present invention preferably employs the teachings of Ser. No. 60/061,238, filed Oct. 7, 1997, entitled METHOD AND APPARATUS FOR WRINKLE-FREE HYDROFORMING OF ANGLED TUBULAR PARTS, and hereby incorporated by reference, to avoid wrinkle formation at the concave portion of the bends.

As shown, the lower side rail members 12 have a varying cross-sectional configuration along its longitudinal extent. For example, towards the rearward portion 18, the lower side rail members 12 preferably have a substantially rectangular cross-section. Towards the more forward portions 14, the lower side rail members 12 have a substantially hexagonal cross-sectional configuration. Altering the cross-sectional configuration of this member or other tubular hydroformed members disclosed herein can be accomplished without departure from the principles of the present invention.

As shown, the lower edge 34 of each of the lower vertical portions 22 is contoured to form-fittingly receive the corresponding upper surface portions 35 of the forward portion 14 of the lower side rail members 12. The lower edges 34 are cut into such form-fitting configuration after the hydroforming operation is completed. After the edges 34 are positioned on upper surface portions 35, they are preferably mig-welded in place.

In similar fashion, the rearward portions 18 of the lower side rails 12 terminate in cut-out edges 36. The edges 36 are each constructed and arranged to receive a corner portion of the lower end portion 30 of the associated upper longitudinal structure 20. More specifically, the lower end portions 30 each have a rectangular cross-section. The edges 36 of the lower side rail members 12 are formed as cut-outs so as to engage the outboard facing surface 38 and the forwardly facing surface 40 of the lower end portion 30. The edge 36 is preferably mig-welded to the lower end portion 30.

A plurality of cross-structures are interconnected between the longitudinal upper members 20. In particular, a first cross-structure 43 comprises a hydroformed tubular first cross member 44 having a substantially rectangular cross-section and connected between the longitudinal upper members 20, preferably towards the lower portions of the upwardly and rearwardly extending forward portions 24 and immediately above the butt-welded connections 32. Similarly, a cross-structure provided by a hydroformed cross-member 46 connects the two longitudinal upper members 20, generally at the bending or arcuate transition between the upwardly and rearwardly extending forward portions 24 and the uppermost straight portions 26. In addition, a rearward cross-structure provided by a hydroformed cross-member 48 extends between the longitudinal upper members 20, generally at the bending or arcuate transition between the uppermost straight portions 26 and the downwardly and rearwardly extending portions 28. Preferably, each of these cross-members 44, 46, 48 has a generally rectangular cross-sectional configuration and is hydroformed from a circular tubular blank in conventional fashion.

The cross-members 44, 46 and 48 have opposite ends thereof disposed in overlapping or overlying relation with adjoining portions of upper members 20, and are received in recesses which are hydroformed into the exterior configuration of longitudinal upper members 20 and mig-welded in place. The recesses formed in the longitudinal upper member 20 are preferably formed in a hydroforming operation, as will be described.

A pair of inverted U-shaped cross-structures 49 and 51 are disposed between the cross-members 46 and 48. The cross-structures 49, 51 are preferably provided by two inverted U-shaped hydroformed cross members 50, 52. The forwardly disposed U-shaped hydroformed cross member 50 has a generally horizontally disposed bight portion 54 extending in a cross-car direction, and a pair of integral leg portions 56 extending downwardly from the opposite ends of the bight portion 54. Corner portions 58 of the cross-member 50 form the transition between the bight portion 54 and the respective leg portions 56. The corner portions 58 are disposed in overlying or overlapping relation with adjacent, underlying portions of the uppermost straight portions 26. The bottom edges 60 of the leg portions 56 are cut so as to be form fitting with respect to the adjacent upper surfaces 35 of the respective lower side rail members 12. The edges 60 are then mig-welded to the upper surface 35 of the lower side rail members 12.

The corner portions 58 are received in hydroformed recesses formed in the exterior configuration of the uppermost straight portions 26, as will be described later, to form overlapping glove-joints with the associated uppermost straight portions 26 and mig-welded in place.

The rearward cross-member 52 comprises a bight portion 70, which is substantially horizontally disposed and extends in the cross-car direction. The bight portion 70 transitions into vertically downwardly extending leg portions 72 from the opposite ends of the bight portion 70. Corner portions 74 form the transition between the bight portion 70 and the respective leg portions 72. The corner portions 74 are disposed in overlapping or overlying relation to adjacent portions of the uppermost straight portions 26. In particular, the corner portions 74 are disposed in hydroformed recesses formed in the exterior configuration of the uppermost straight portions 26 as will be described later.

The leg portions 72 have ends 76 thereof received within recesses which are hydroformed in the associated lower side rail members 12 and mig-welded in place. Again, the recess is formed within the lower side rail members 12 for receiving the end portions 76 as will be described later.

Again, the teachings of Ser. No. 60/061,238 are preferably employed to avoid wrinkling at the bends (corner portions 58 and 74) in the cross-members 50 and 52.

It should be appreciated that the legs 56 of cross-member 50 form the "B-pillar" structures of the space frame. Similarly, the legs 72 of the more rearwardly disposed cross-member 52 form the "C-pillar" structures of the space frame. Finally, the downwardly and rearwardly extending portion 28 of each of the longitudinal upward members 20 forms the "D-pillar" structures.

A lower rearward cross-member 80 is hydroformed into a rectangular cross-sectional configuration, and extends between the lower ends 30 of the rearward vertical portions of the longitudinal upper member 20. The lower end portions 30 are cut so as to be provided with a cornered edge 82 which is constructed and arranged to engage the upper surface 84 and forwardly facing surface 86 of the rearward cross-member 80. The edges 82 are welded to the surfaces 84 and 86 preferably by a mig-welding operation.

The vehicle space frame assembly 10 further includes a door structure 90, including a hydroformed lower U-shaped tubular member 92, a straight tubular cross-member 94 which is welded adjacent to the ends of the vertical legs 96 of the U-shaped member 92 and an inverted U-shaped hydroformed member 98 having the opposite leg portions thereof telescopingly received within the tubular ends of the U-shaped member 92. These U-shaped members 92 and 98 are hydroformed once again in accordance with Ser. No. 60/061,238.

FIG. 2 is a perspective view of a connection between the rearward cross-member 52 at one corner portion 74 thereof and the associated uppermost straight portion 26 of one of the longitudinal upper members 20. As can be appreciated from the partial perspective view of FIG. 4 and the cross-sectional view of FIG. 3, which illustrate only the straight portion 26 of the connection, each of the uppermost straight portions 26 has a recess 100 formed therein. This recess 100 is formed as a result of the hydroforming process. In particular, a net pad is provided as part of a hydroforming dye assembly so as to give the particular configuration illustrated. As shown, the recess 100 is formed in an upper wall 101 of straight portion 26. The upper wall 101 forms the recess 100 with opposite sloping faces 102, and an adjoining straight, horizontally disposed wall portion 104. It can be appreciated that this particular configuration for the recess is not critical. For example, the sloping faces 102 may be more vertically disposed, so as to form a substantially right angle with respect to the surface 104. As also can be appreciated from FIGS. 3 and 4, the recess 100 is formed such that the bottom wall 110 of the hydroformed straight portion 26 is formed so as to have a corresponding configuration in relation to the upper wall 101. More specifically, the bottom wall portion 110 includes downwardly and inwardly sloping wall portions 112, which are adjoined by substantially horizontally disposed wall portion 114. It should be appreciated, however, that the wall portion 114 has a greater length than the wall portion 104. In addition, the sloping wall portions 112 preferably slope to a lesser extent than the angle at which the wall portions 102 slope. As a result, the distance between the upper wall portion 101 and the bottom wall portion 110 is substantially less at areas of the recess 100 than immediately surrounding or adjacent portions on opposite sides of the recess. It should be appreciated that while the lower wall 110 formed at the recess 100 generally conforms to the configuration of the upper wall 101, it is contemplated that the lower wall 110 may be substantially straight as it extends from before, through, and after the areas immediately beneath the recess 100.

Referring back to FIG. 2, the preferred configuration for the upper cross-member 52 is shown, which incorporates a downwardly facing recess at the corner portion 74. While the recess is substantially hidden in FIG. 2, it should be appreciated that it has generally the same configuration as the recesses illustrated in FIGS. 3 and 4 and has a horizontal or straight surface which rests upon and is fixed to the upwardly facing surface of the wall portion 104 of the uppermost straight portion 26. At the downwardly facing recess provided in cross-member 52, the distance between the wall portions 120, and 122 at the recessed portion of the cross-structure 52 beneath the corner portion 74 is substantially less than the distance between such wall portions 120, 122 on opposite sides of the recess.

As a result of the formation of the overlapping recesses formed in the longitudinal straight portions 26 of the upper members 20 and the corner portions 74 of the cross-member 52, the overlapping intersections forming the connections between the cross-member 52 and laterally spaced uppermost straight portions 26 of the upper members 20 can be made so as to have a reduced cross-sectional profile. It is contemplated that the desired profile could also be achieved if only one of the overlapping members 20 or 52 is provided with a recess, although it is preferred for both overlapping portions to be provided with such a recess.

A similar overlapping joint connection having recesses is provided at the connection of the cross-member 50 with the uppermost straight portions 26 of the upper members 20, generally beneath corner portions 58 of the cross-member 50. These connections are virtually identical to the connection illustrated in FIG. 2.

It should also be appreciated that similar recesses are formed in the longitudinal upper members 20 so as to form connections with opposite ends of the cross-members 44, 46, and 48. However, at such connections, recesses formed within the longitudinal upper members 20 are provided in the upper or outwardly facing wall portion 111 only. The opposing wall portion at these connections is substantially straight, as contemplated in the discussions above. In addition, the cross members 44, 46, and 48 are not provided with any recess, but are simply received within recesses at their opposite ends to form reduced profile welded connections.

Finally, it should also be appreciated that the same type of connection is fused to connect the bottom portions 76 of the cross-member 52, which are received and welded within a hydroformed recesses formed within the lower side rail members 12. Again, in this configuration, only one of the wall portions is configured in forming the recess, and the opposite wall portion is substantially flat or continuous with adjoining wall portions, as can be appreciated from area 140 in FIG. 1.

Because the frame structures described above are all hydroformed, a precisely configured space frame can be achieved. For example, because the upper longitudinal structures 19 are hydroformed as a single member 20, the desired distance between the forward lower vertical portions 22 and the rearward lower vertical portions 30 (i.e., between the "A" pillar structure and "D" pillar structure) can be made within a higher degree of accuracy and precision in comparison to constructions in which the structures are separately formed and then connected. The same is true in the cross-car direction, e.g., the distance between the "C" pillar structures or between the "B" pillar structures is precisely achieved in accordance with the accuracy to which the cross members 50 and 52 can be hydroformed.

FIG. 5 is a perspective view of a second embodiment of the present invention. FIG. 5 illustrates a space frame 200, which incorporates a main body module or vehicle cage 210 and a front structural assembly provided by a front end module assembly 400 connected to the front end of the vehicle cage.

The vehicle cage 210 is similar in many respects to the space frame 10 of the first embodiment. The vehicle cage 210 comprises a pair of laterally spaced, longitudinally extending lower side rail structures 211. Each of the side rail structures 211 is preferably a hydroformed rail member 212. Each lower side rail member 212 has a relatively straight forward portion 214 which transitions into an upwardly and rearwardly sloping portion 216. In addition, each of the side rail members 212 includes a generally straight or slightly arcuate portion 218 extending rearwardly from the upper rearward end of the intermediate portion 216. Unlike the first embodiment, however, the side rail members also include a downwardly and then rearwardly extending rearward portion 219 forming the rearward end of the side rail members 212. The portions 216, 218, and 219 provide the rear "kick-up" for accommodating a rear wheel well.

The side rail members 212 are each formed from a straight tubular blank (formed by conventional roll forming and seam welding) which are bent generally into the "S" configuration shown, then diametrically expanded, and shaped in any conventional hydroforming operation.

The vehicle cage 210 further includes a pair of upper structures 219. Preferably each structure 219 is a hydroformed longitudinal upper member 220. Each of the upper members 220 includes a forwardly disposed, lower vertical portion 222, which transitions into an upwardly and rearwardly extending forward portion 224. Portions 222 and 224 form the "A-pillar" structures on the left and right sides of the vehicle space frame 200, as generally indicated at 225. Each longitudinal upper member 220 further includes an uppermost, longitudinally extending, generally straight portion 226, which forms a roof structure and which transitions from and extends rearwardly from the upwardly and rearwardly extending forward portions 224.

Each longitudinal member 220 terminates towards the rearward portion of the generally straight portion 226, where it is welded to a rear loop or aperture ring structure 203 of the vehicle cage. The rear aperture ring structure 203 comprises two U-shaped tubular hydroformed members 229 and 231 to form a loop or ring 227. The upper U-shaped member 229 is inverted and is connected at opposite ends thereof to the opposite ends of the upright lower U-shaped member 231 at a glove joint 237. More particularly, opposite legs 243 of the upper U-shaped member 229 terminate in a cross sectional diameter portion that is smaller than the cross-sectional diameter of the opposite ends of the opposite legs 241 of lower U-shaped member 231. Thus, the end portions of the legs 243 of the upper U-shaped member 229 are received within the open ends of the lower U-shaped member 231 and then welded in place. The portions of the upper U-shaped member 229 immediately above the end portions that are received within the legs 241 of lower member 231 are diametrically expanded so as to form integral flange-like surfaces that engage the mating upper edges of the open ends of the upwardly extending legs 241 of the lower member 231, so as to limit the extent to which the legs 243 of upper member 229 can extend within the legs of lower member 231. This rear aperture ring 227 defines a rear opening for a vehicle rear door or lift gate.

The legs 243 of the upper U-shaped member 229 and the legs 241 of the lower U-shaped member 231 cooperate to form laterally spaced, generally parallel, and vertically extending D-pillar structures 228 of the frame assembly 200. The upper U-shaped member 229 has a laterally extending bight portion 248 connected between the leg portions 243.

The junctures between the legs 243 and the bight portion 248 are joined to the rear ends of the generally straight portions 226 by a welded connection ("joint E") as illustrated best in FIGS. 7 and 20–22. It should thus be appreciated that each upper longitudinal member 220 comprises an entire A-pillar structure and also defines the portion at which the upper end of an associated D-pillar structure 228 is connected. Thus, it can be appreciated that the hydroformed tubular members 220 in conjunction with the aperture ring 227 define both a longitudinal dimension and a cross-vehicle dimension of the vehicle cage 210. The aperture ring 227 also defines a height of the rearward end of the space frame 200.

The aperture ring 227, being formed from two hydroformed U-shaped members provides enhanced dynamic stability of the space frame from a matchboxing standpoint, to prevent twisting of the frame in its application environment.

Figure 19:
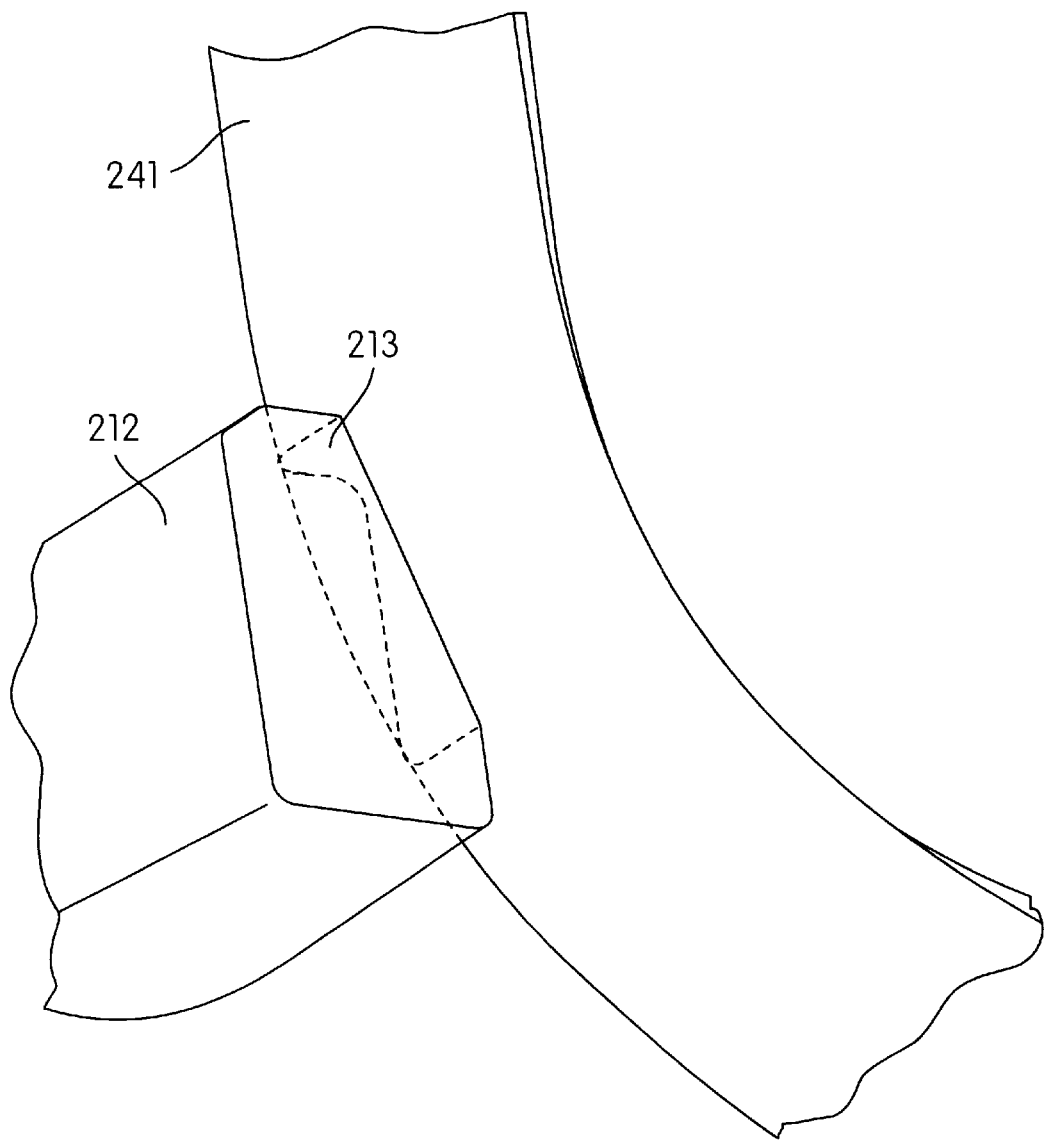
Figure 20:
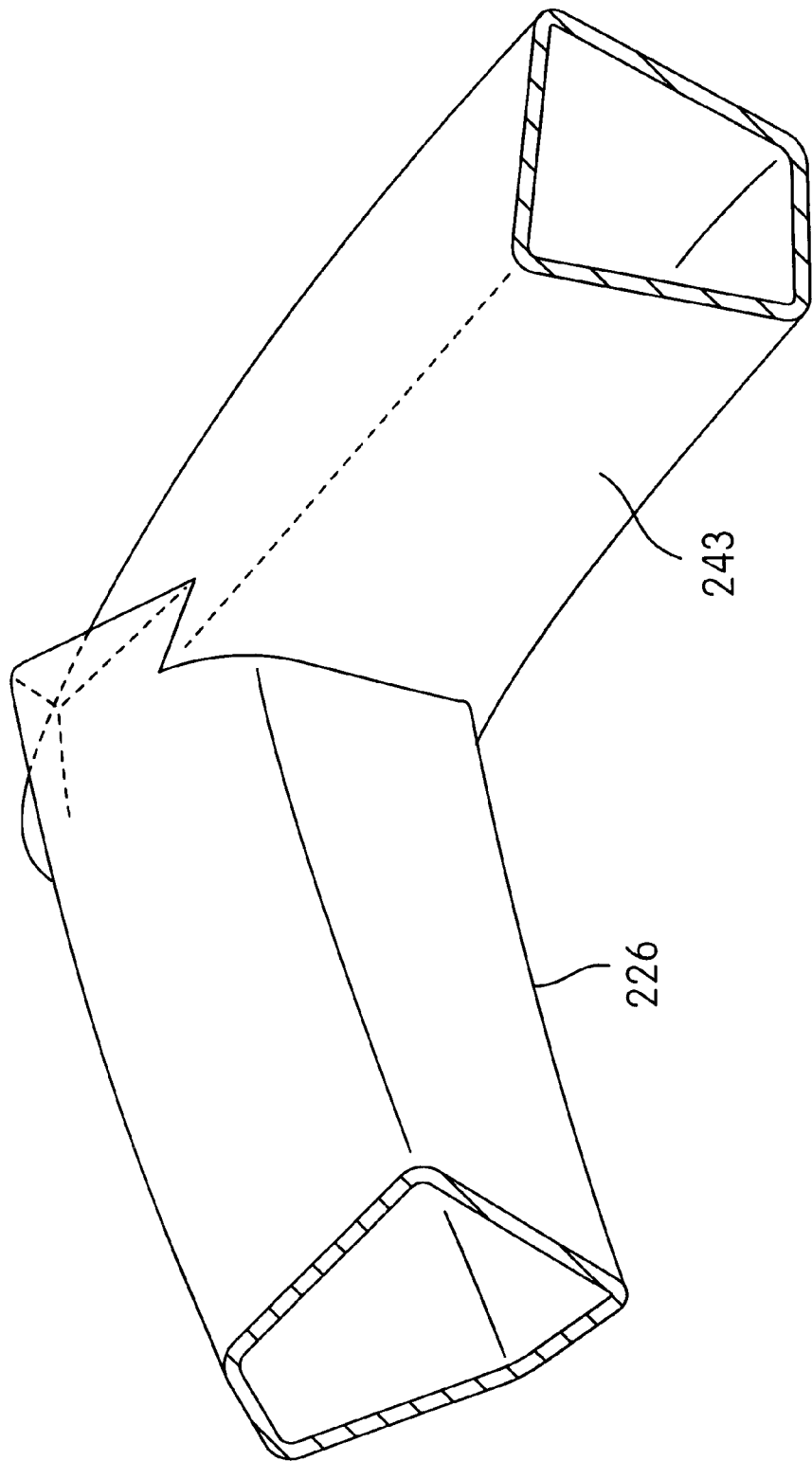
Figure 21:
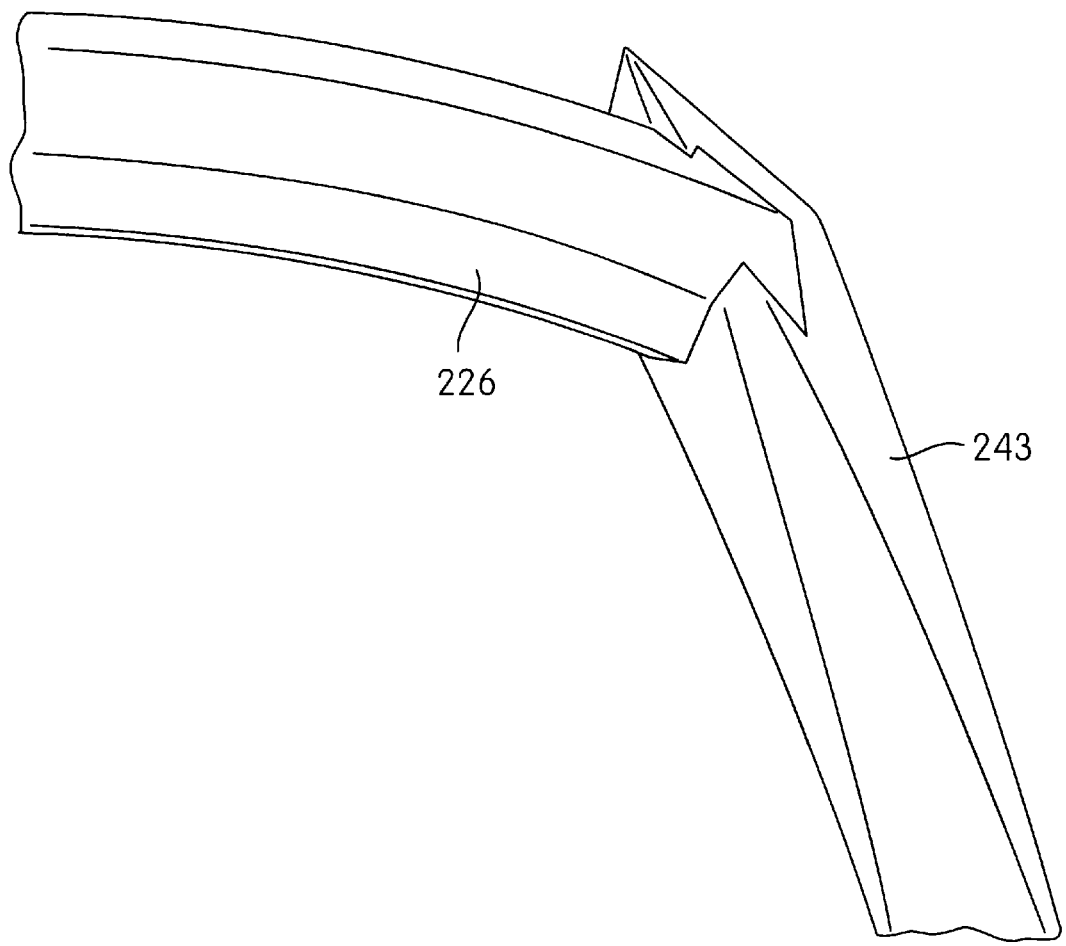
Figure 22:
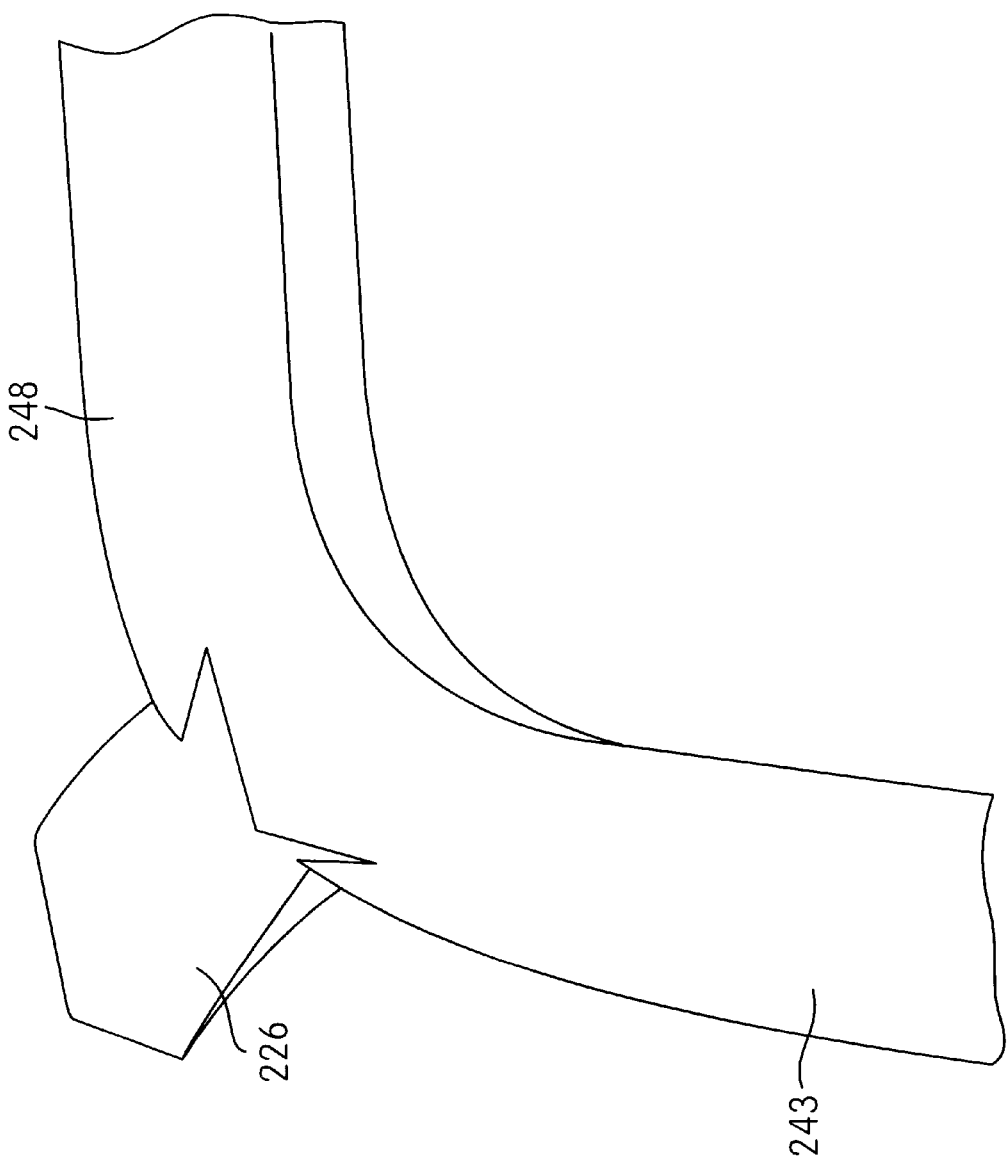

As also shown, the leg portions 241 of the lower U-shaped member 231 are connected by a bight portion 245. The junctures or transitions between the bight portion 245 and the opposing leg portions 241 are joined at a welded connection with rearward ends of the side rail members 212, as best illustrated as Joint D in FIGS. 7 and 17–19 (see welds W). As best shown in FIG. 19, a notch 213 is cut in the end of each side rail 212 to nestingly receive the lower U-shaped member 231.

As shown, each longitudinal upper member 220 preferably has an irregular, almost pyramidal or trapezoidal cross-section. In addition, it should be appreciated that both of the longitudinal upper members 220 have been hydroformed from a single tubular blank structure, preferably formed from two separately roll-formed tubular blanks which have been butt-welded to one another at butt-welded connection 232. In particular, as described with the first embodiment, the butt-welded connection 232 is performed prior to the hydroforming operation and connects two separate tubular blank members of different diameter to one another.

In view of the rather severe bend of substitute at the junction of the generally straight portion 226 and the portion 224 that forms the A-pillar structure, the longitudinal upper structures 220 are formed according to the teachings of the said Ser. No. 60/061,238, filed Oct. 7, 1997. This methodology is also preferably used to form the upper U-shaped member 229 and the lower U-shaped member 231, as well as the inverted U-shaped cross members 250 and 252 to be described.

Figure 10:
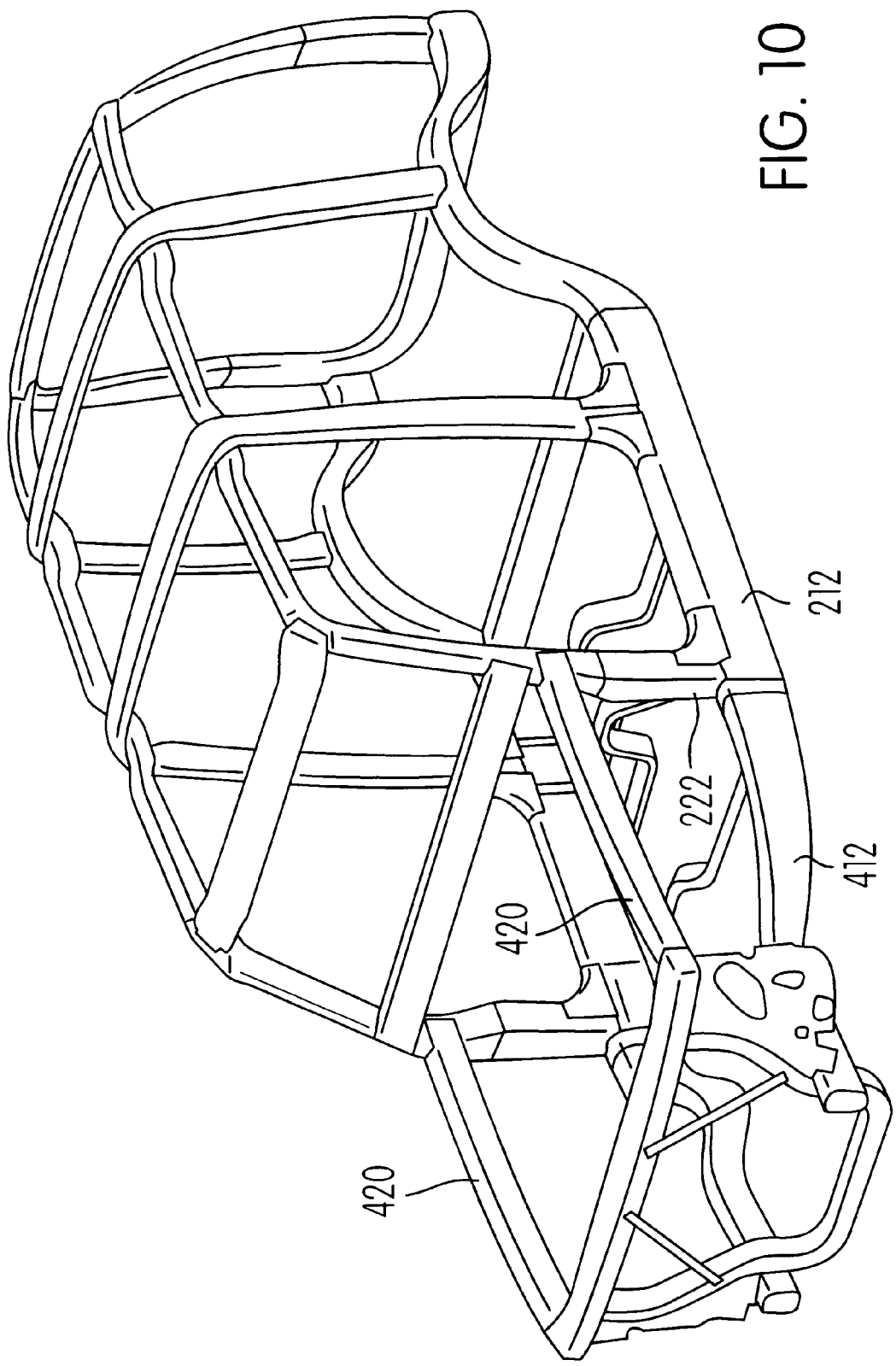

As described with the first embodiment, the lower side rail members 212 have a varying cross-sectional configuration along its longitudinal extent. Preferably, the side rail members 212 extend generally from a position immediately forward of the lower portions 222 of the A-pillar structures to the rearward end of the main body module or cage 210. The forward ends of the side rail members 212 are joined to front side rail structures 411 of the front frame assembly 400. In particular, the front side rail structures 411 are hydroformed side rail members 412 and are glove-fitted into the forward opened ends of side rail members 212 and welded in place, as is best illustrated as "Joint O" in FIGS. 10 and 41.

Figure 6:
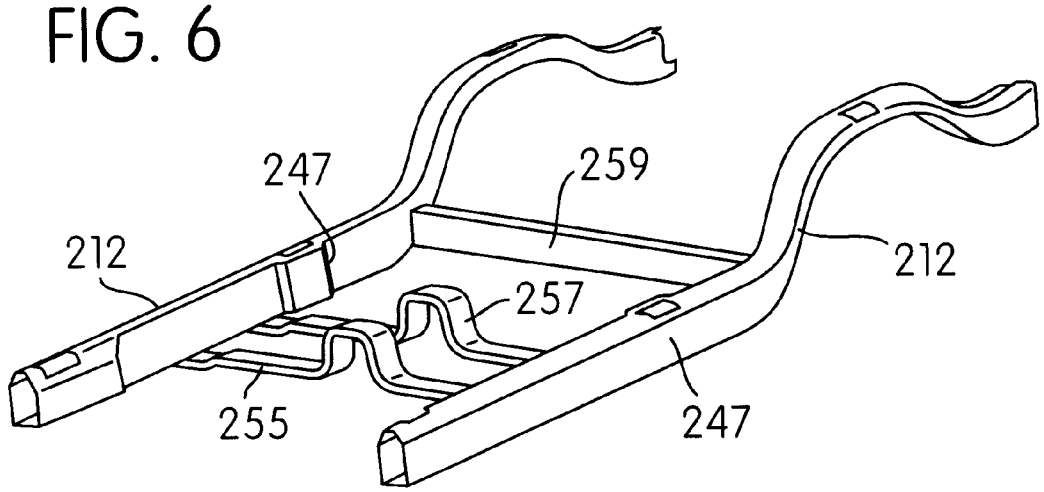
FIGS. 6–11 are perspective views of various stages of assembly of space frame illustrated in FIG. 5.

Preferably, in similar fashion to the A-pillar being formed from two tubular members butt-welded at joint 232, the side rail members 212 are formed from two separately roll-formed tubular blanks which have been butt-welded to one another at butt-welded connection 247 (see FIG. 6). The butt-welded connection 247 is performed prior to the hydroforming operation and connects two separate tubular blank members of different diameter to one another as discussed above in relation to the A-pillar structure.

Figure 7:
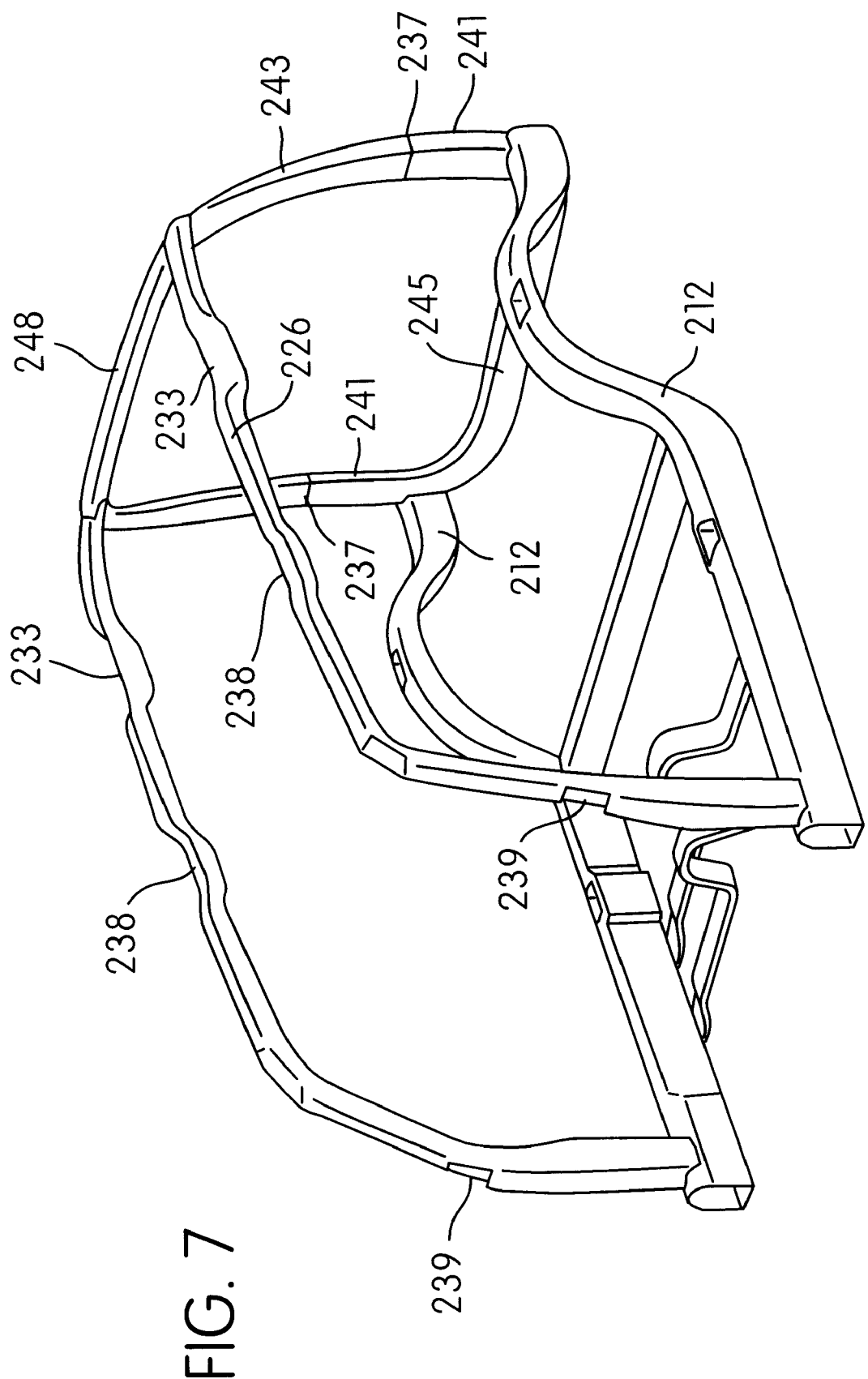
Figure 16:
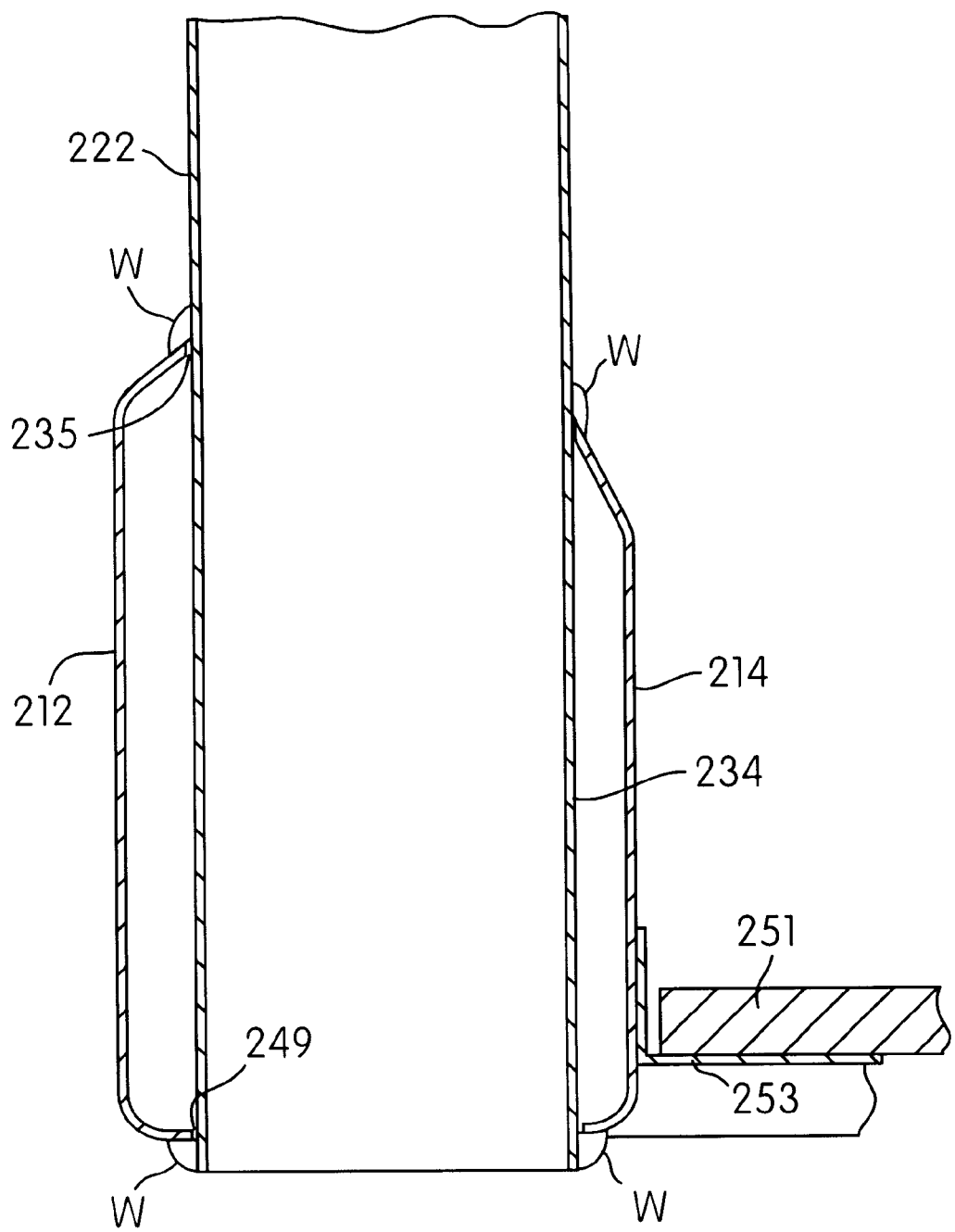
Figure 17:
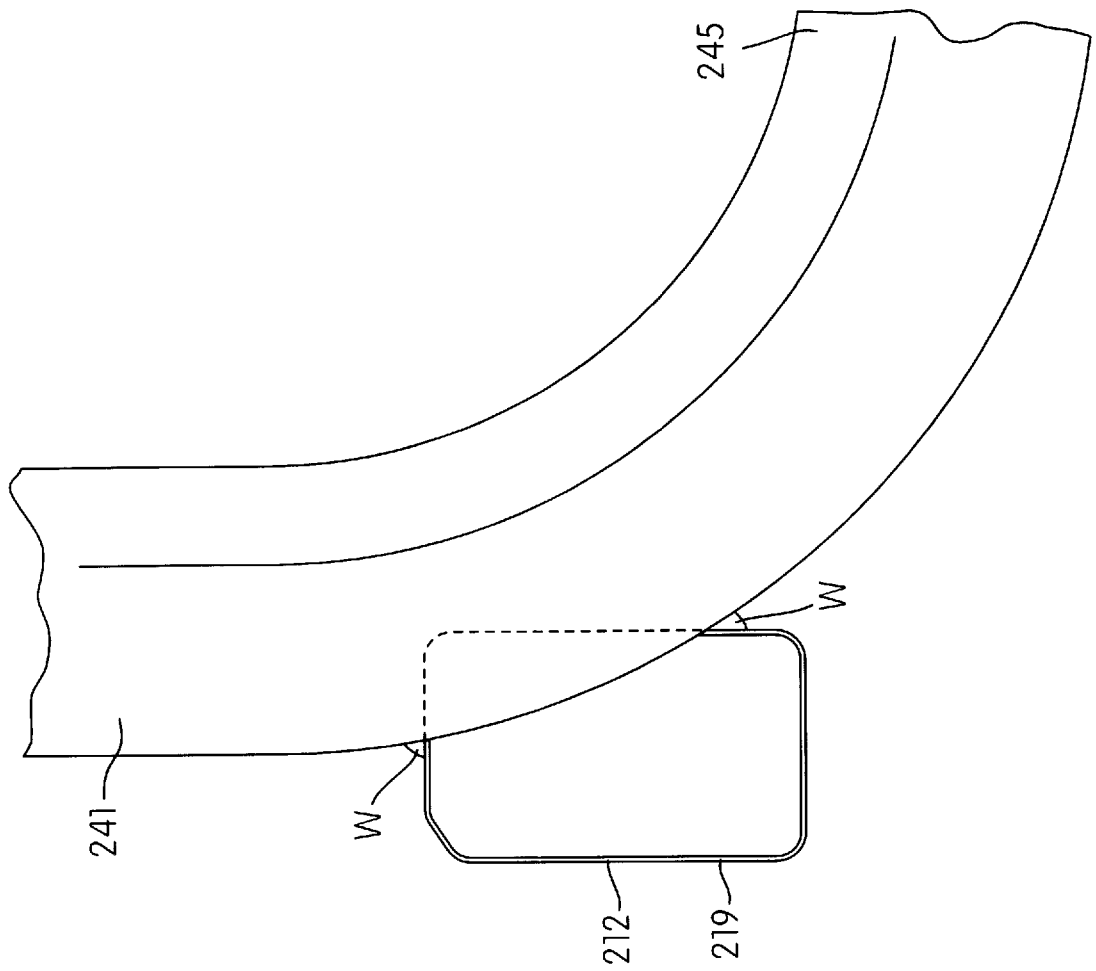
Figure 18:
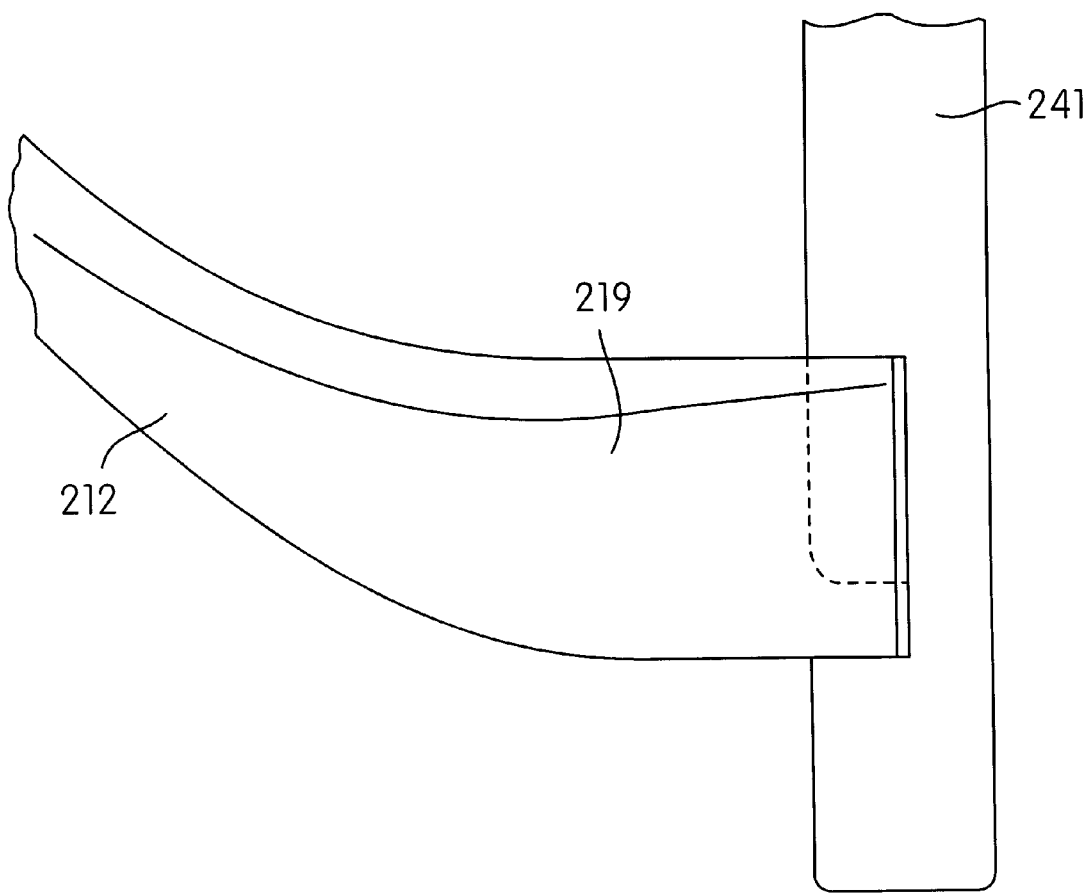

As best illustrated as Joint C in FIGS. 7 and 16, the lower portion 234 of each of the lower vertical portions 222 is received in a hole 235 in the upper wall and a hole 223 in the lower wall of the forward portion 214 of each lower side rail member 212. The holes 235 and 223 are formed either during the hydroforming process in what is known in the art as a hydropiercing operation (see U.S. Pat. No. 5,460,026, hereby incorporated by reference), or cut into such form-fitting configuration after the hydroforming operation is completed. After the lower portions 234 are positioned as shown, they are preferably mig-welded in place at welds W. As can also be seen in FIGS. 10 and 16, a cross frame member 251 forms a cross structure that connects the lower side rail members 212 to one another by an L-shaped bracket 253. The bracket 253 connects the cross frame member 251 at the same longitudinal location as the A pillar structure lower portion 222, relative to the longitudinal direction of the side rail member 212. Otherwise stated, the frame member 251 is at least partially overlapping with the lower portion 222 relative to the longitudinal direction of the side rails 212.

Figure 12:
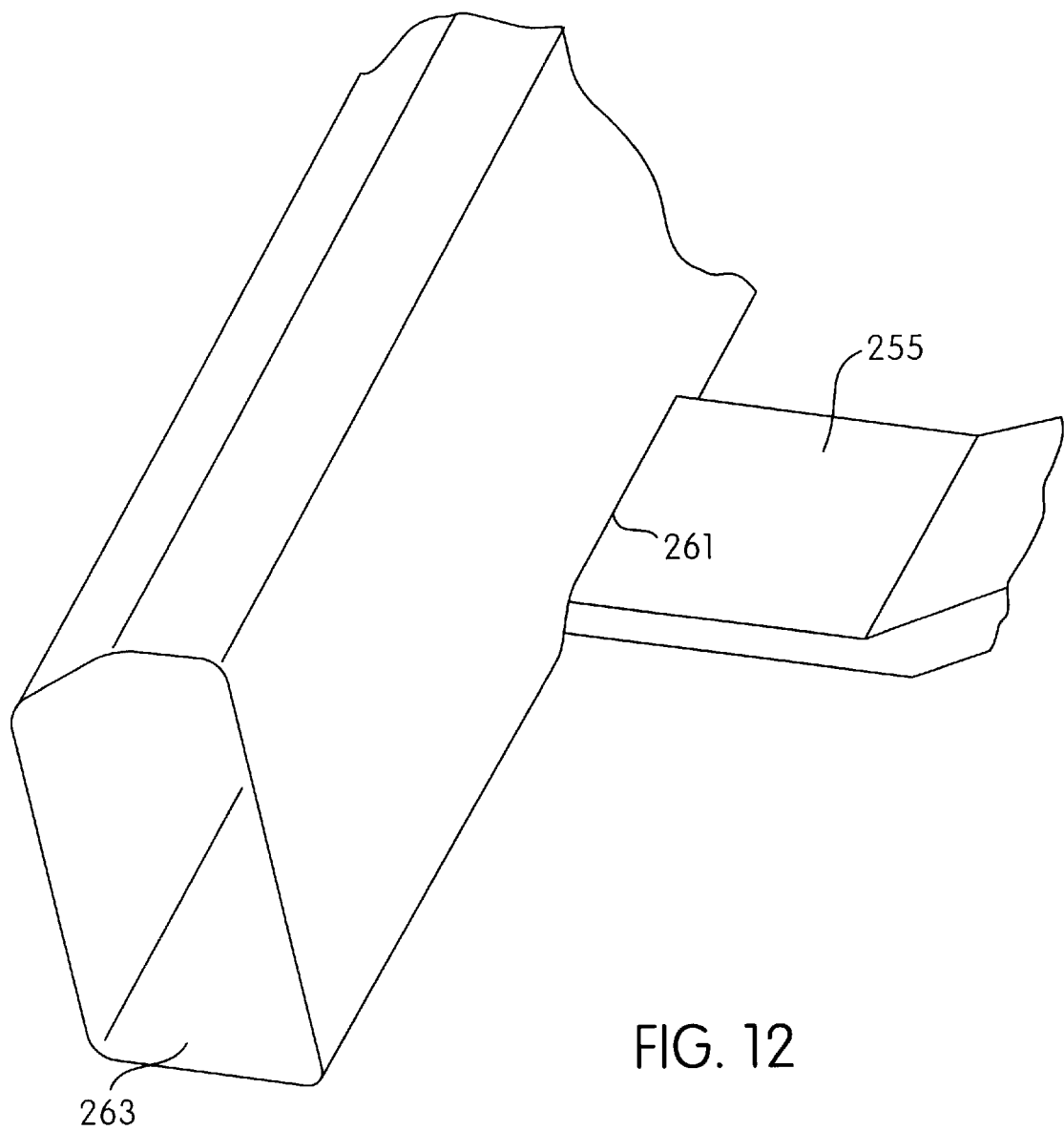
FIGS. 12–47 are various enlarged views of Joints A–T illustrated in FIGS. 6–11.
Figure 13:
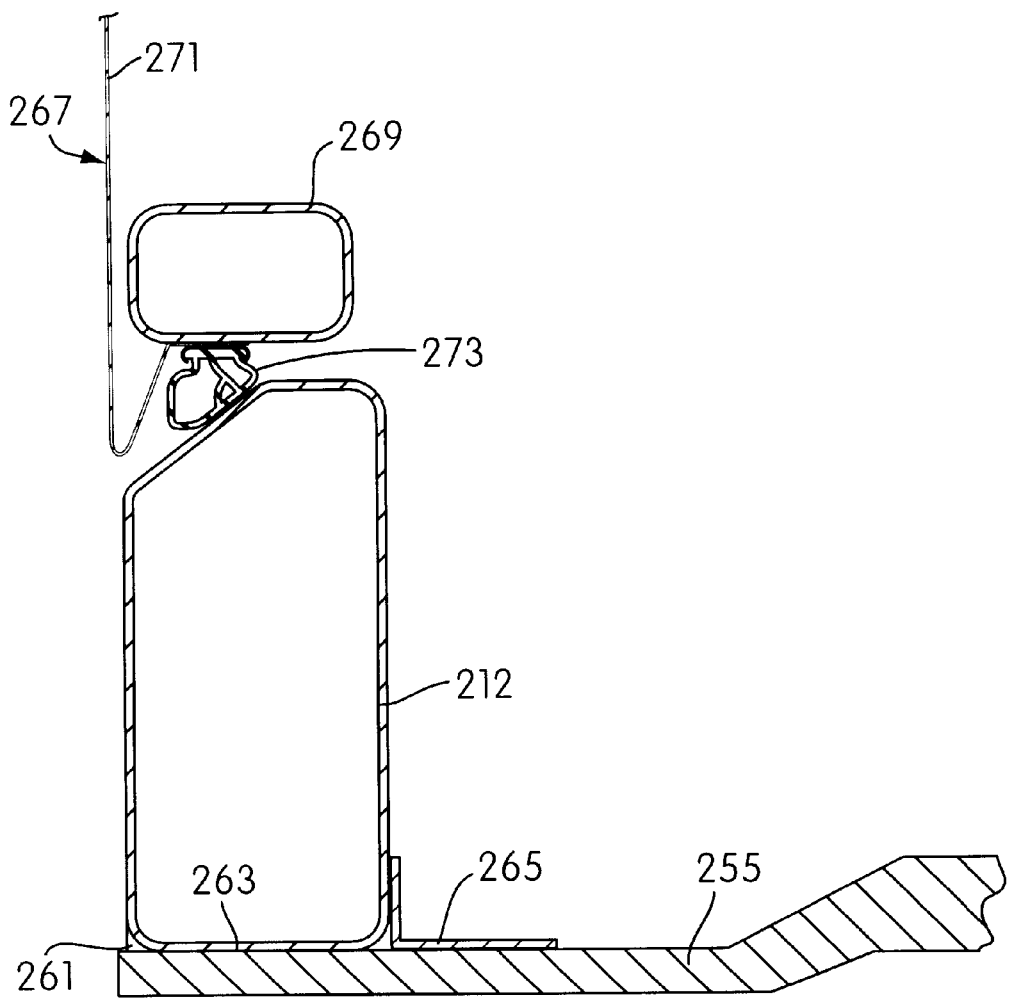
Figure 14:
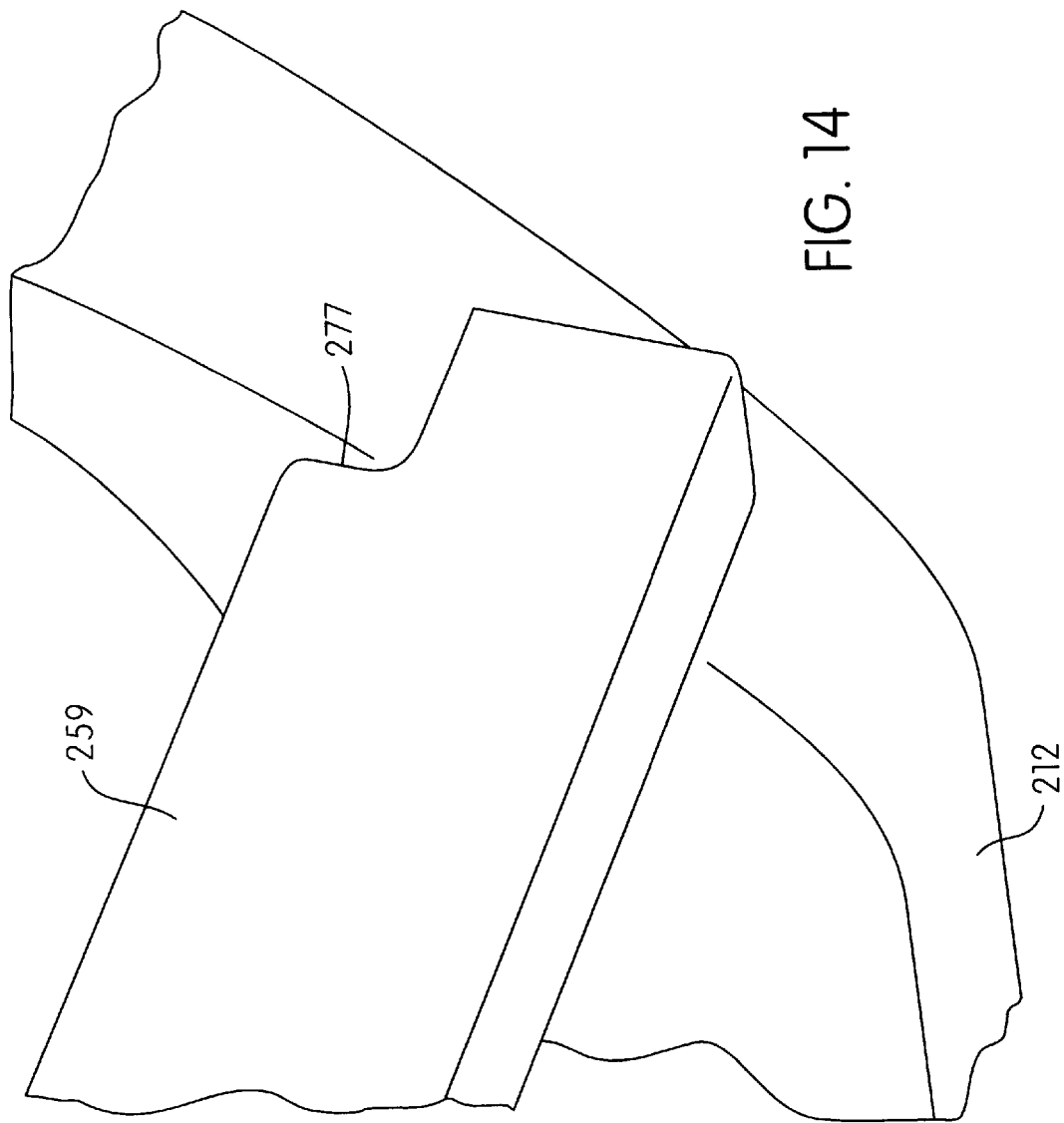
Figure 15:
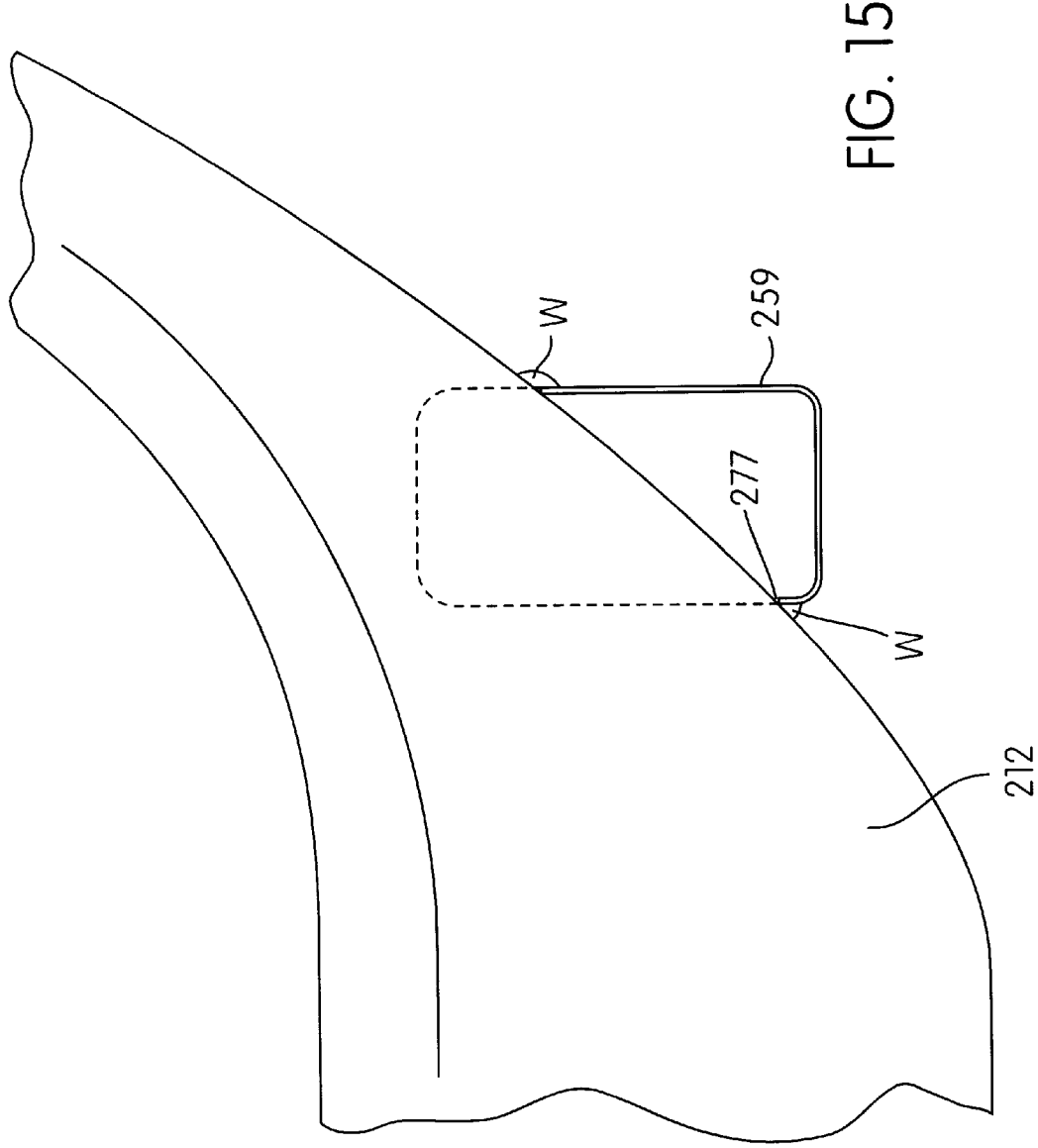

A plurality of additional cross structures provided by cross frame members 255, 257, and 259 are also connected between the side rail members 212. This is best illustrated in FIGS. 6 and 12–15. In particular, members 255 and 257 constitute front seat support members. As shown in FIGS. 12 and 13, the opposite ends of the cross member 255 is received within a recess 261 in the lower wall 263 of each of the side rail members 212 and welded in place. As shown in FIG. 13, an optional L-shaped bracket 265 may be welded between the side wall of side rail member 212 and the upper surface of the cross member 255 for added rigidity. It should be appreciated that the cross member 257 is of similar structure and purpose as cross member 255, and is secured in similar fashion between the side rail members 212 (see FIG. 35).

The cross member 259 constitutes a riser-floor pan support structure. As best illustrated as Joint B in FIGS. 14 and 15, the cross member 259 is connected between the side rail members 212 at portions of the side rail members immediately forwardly of the rear kick-up for accommodating the rear wheels. As can be appreciated from the figures, the ends of the cross member 259 are provided with notches 277 that are formed to nestingly receive the underside of the side rails 212. The cross member 259 is welded at welds W to the side rails 212.

Figure 24:
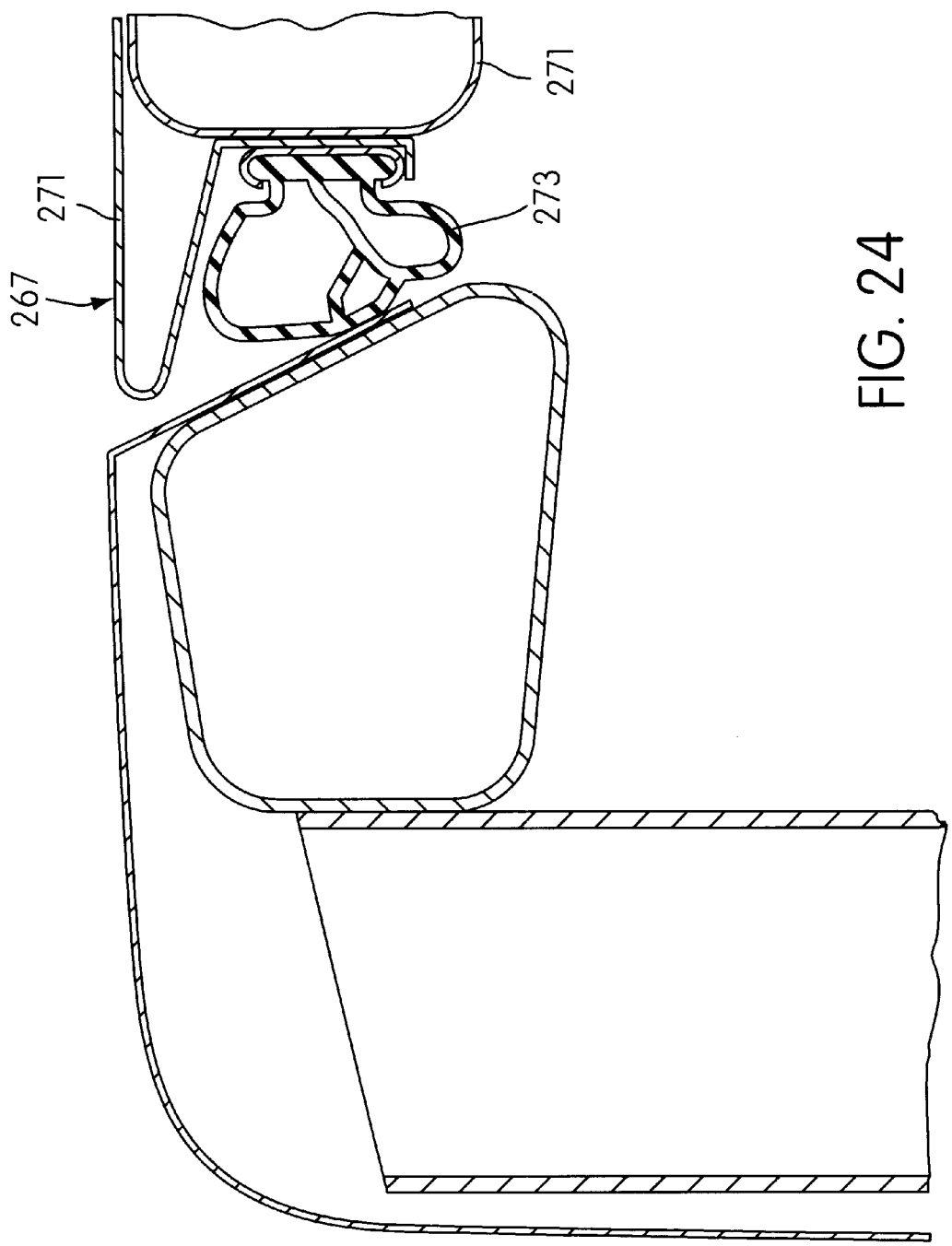
Figure 25:
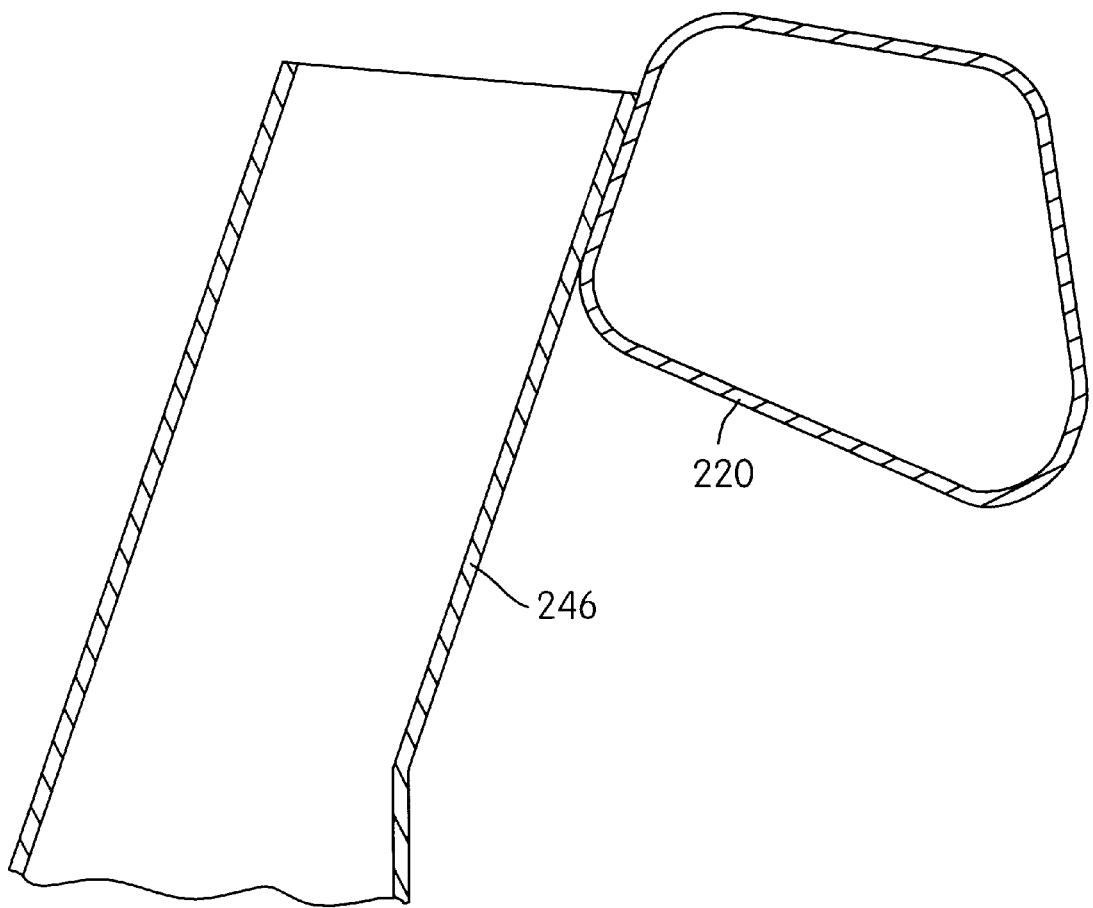
Figure 38:
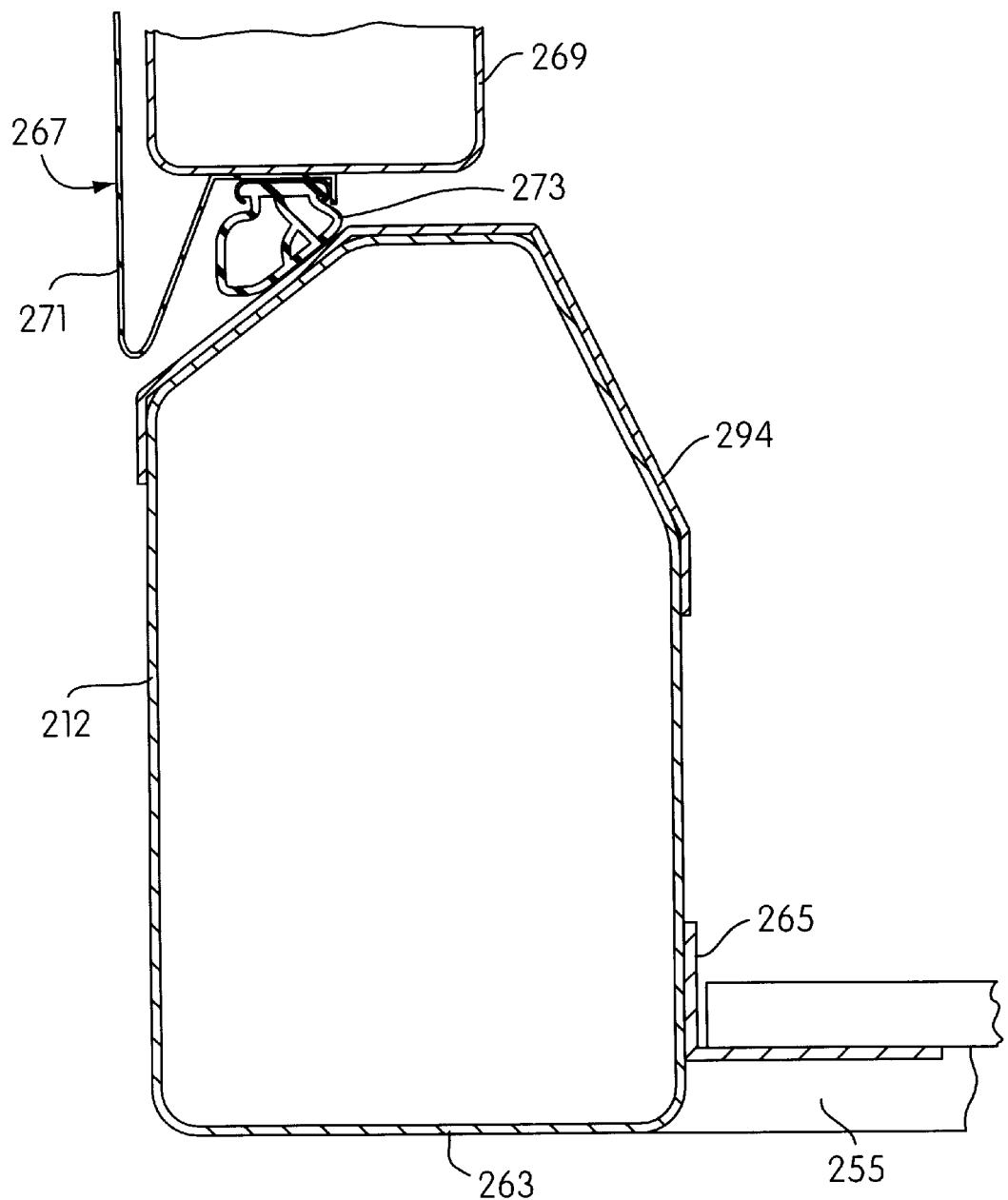

The vehicle cage 210 is shown in combination with a vehicle front door 267 in FIGS. 13, 24, 38. As shown, the door 267 incorporates a hydroformed lower cross member 269, which is welded to a door outer panel 271. A peripheral rubber seal structure 273 is fixed to the door 267 and surrounds the door to form a door seal with the lower rail (or an aesthetic covering therefor) when the door is closed. The lower cross member 269 forms the lower portion of a door frame structure that is similar to the door frame structure 90 illustrated in FIG. 1. The seal structure 273 also forms a seal with the A-pillar structure when the door is closed, as illustrated in FIG. 24. Also illustrated in FIG. 24 is a portion of a forwardly disposed vertical structure 275 of the door 267, which forms the downwardly extending forward leg portion of the door structure, similar to the forward portion 75 of the door upper frame structure 98 illustrated in FIG. 1. The structure thus forms part of an inverted, tubular hydroformed structure, similar to the structure 98 of FIG. 1.

A plurality of cross-structures are interconnected between the longitudinal upper members 220. In particular, a first cross-structure is provided by a first cross-member 244. The cross-member 244 comprises a hydroformed tubular member having a substantially rectangular cross-section and is connected between the longitudinal upper members 220, preferably between the lower portion 222 and upwardly and rearwardly extending portion 224 of the A-pillar structure, and immediately above the butt-welded connections 232. Similarly, a cross structure provided by a, cross-member 246 connects the two longitudinal upper members 220, generally between the upper ends of the A-pillar structures (formed by portions 222,224). Preferably, each of these cross-members 244 and 246 has a closed cross-sectional configuration and is hydroformed from a circular tubular blank in conventional fashion.

Figure 23:
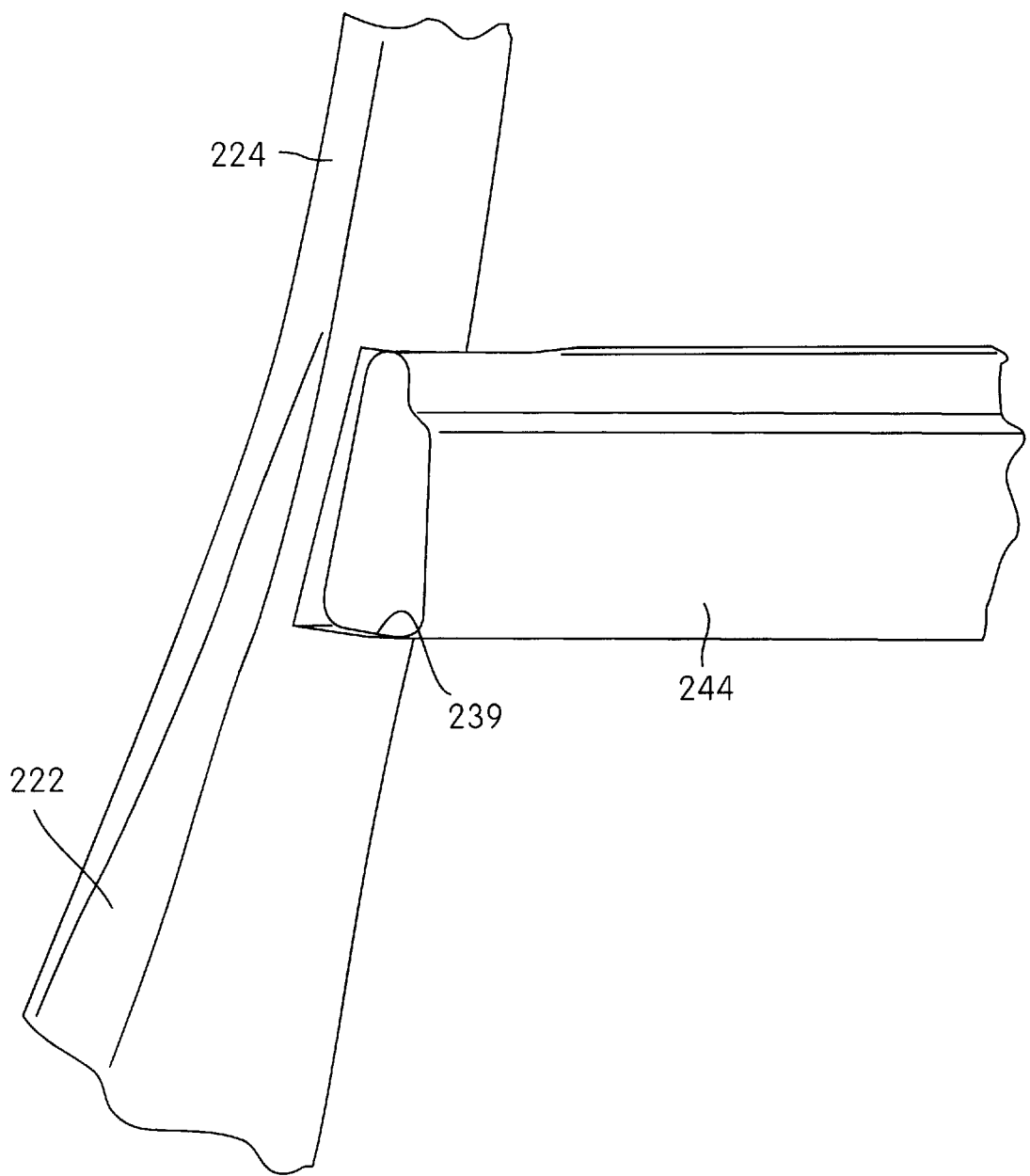
Figure 26:
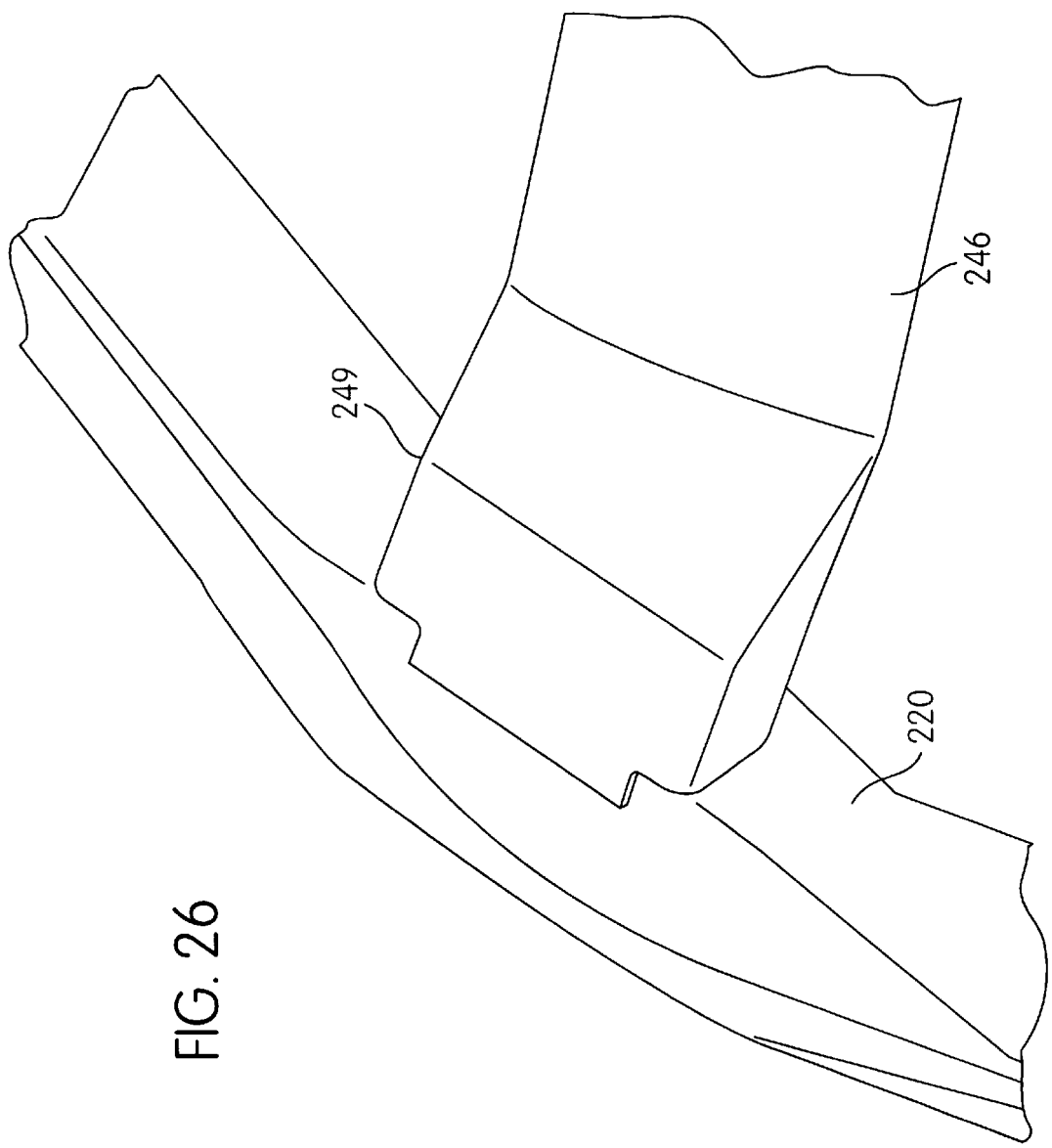
Figure 27:
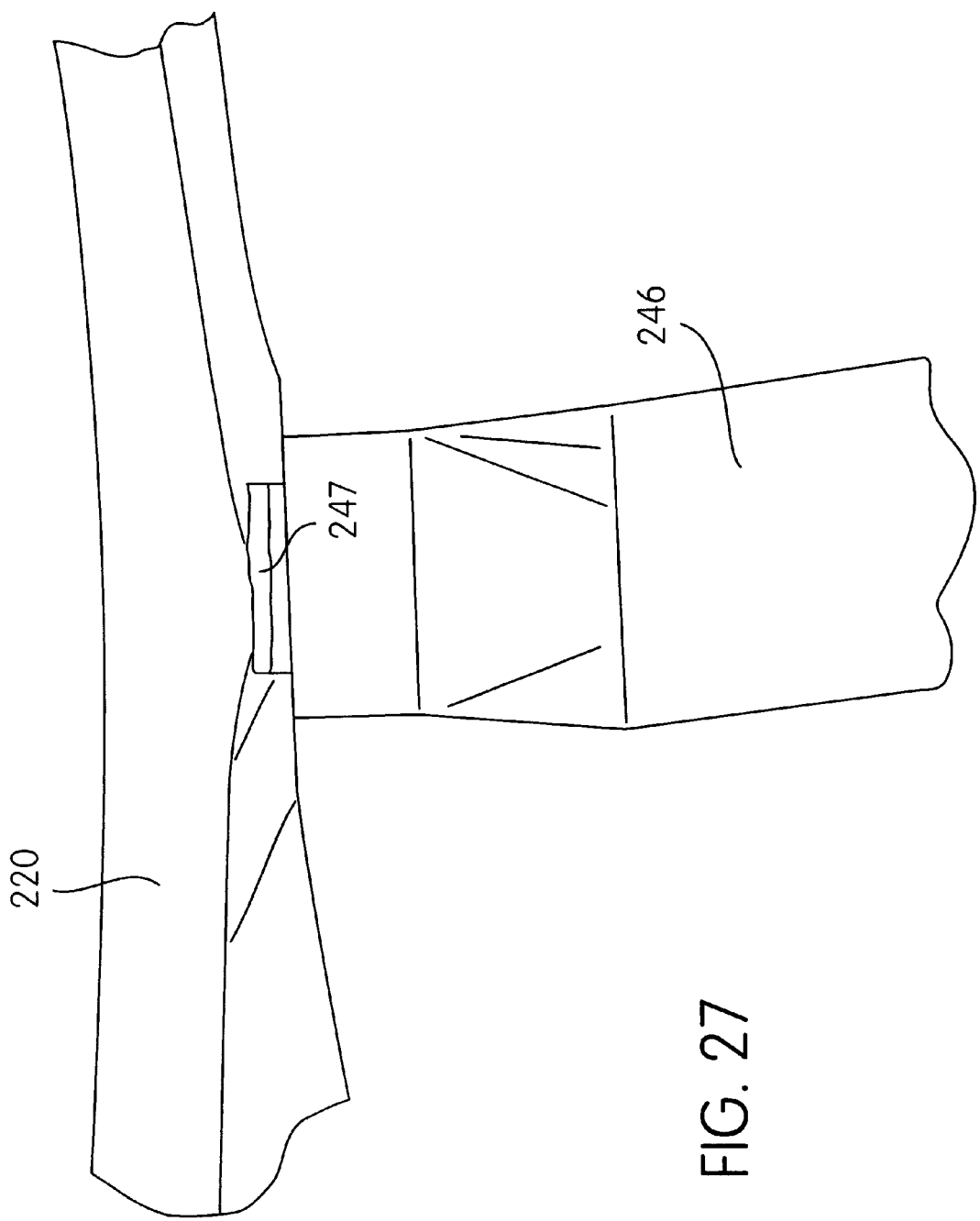
Figure 28:
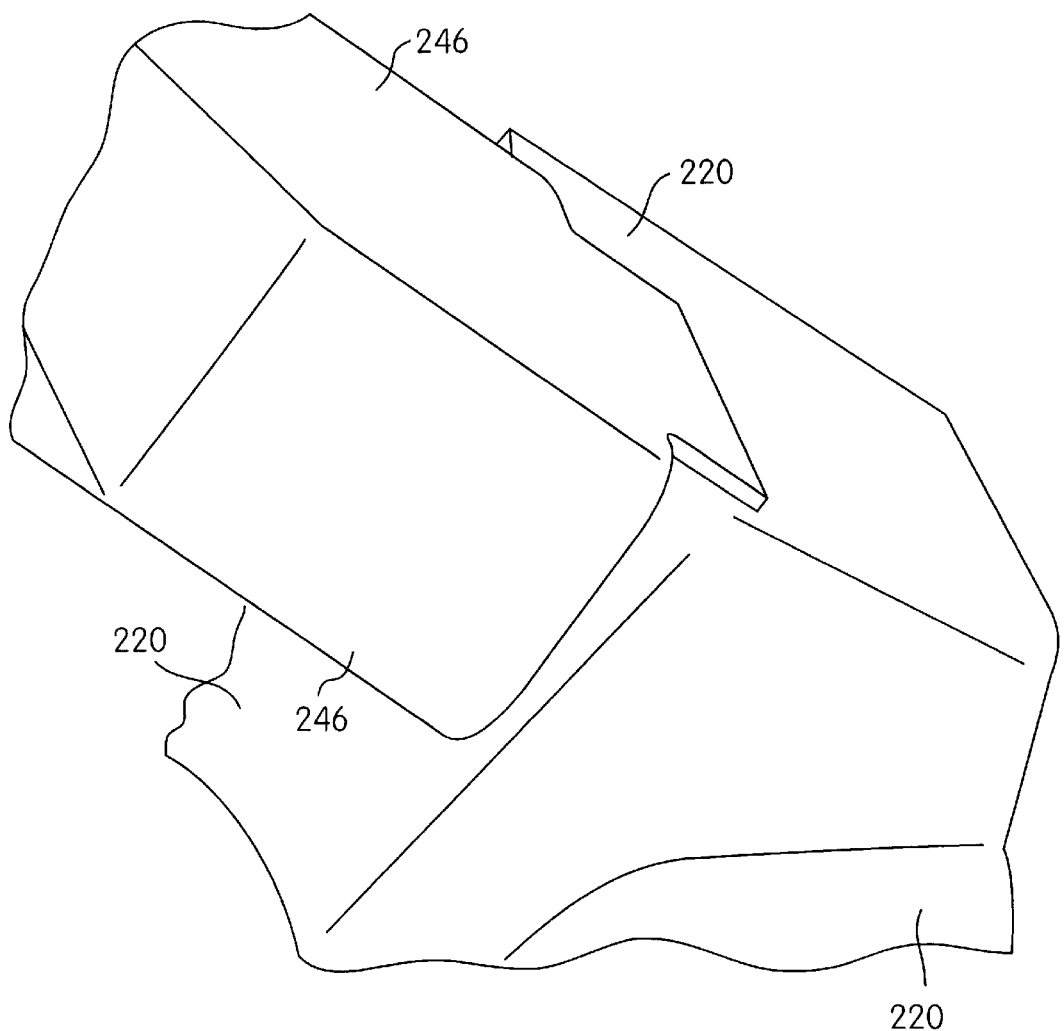

The cross-members 244, 246 have opposite ends joined to the upper structures 220 at joints F and G, respectively. Joint F can be best appreciated from FIGS. 8 and 23–25, while Joint G can be best appreciated from FIGS. 8 and 26–28. These joints are formed by welded connections. Recesses 233, 238, 239, and 249 are formed in the longitudinal upper structures 220, preferably using a net pad during the hydroforming operation, as was described with the first embodiment. The opposite ends of cross member 244 are received in the recesses 239 and are welded in place (see FIG. 23), while the opposite ends of cross member 246 are received in recesses 249 and welded in place (see FIG. 26). Joint G may be facilitated by a structural adhesive connection, as indicated by 247 in FIG. 27, which can be used in lieu of, or in conjunction with welding.

Figure 29:
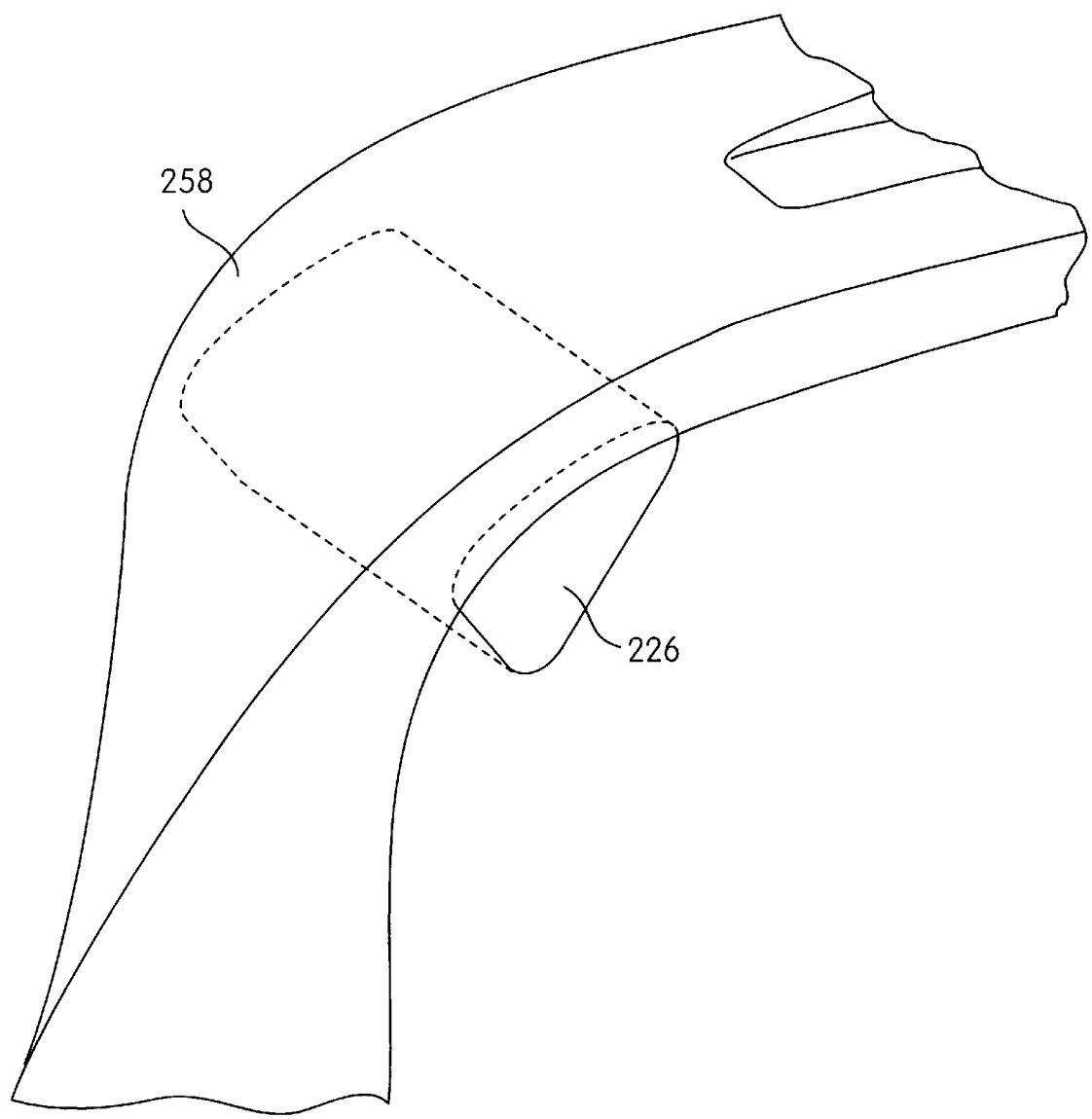
Figure 30:
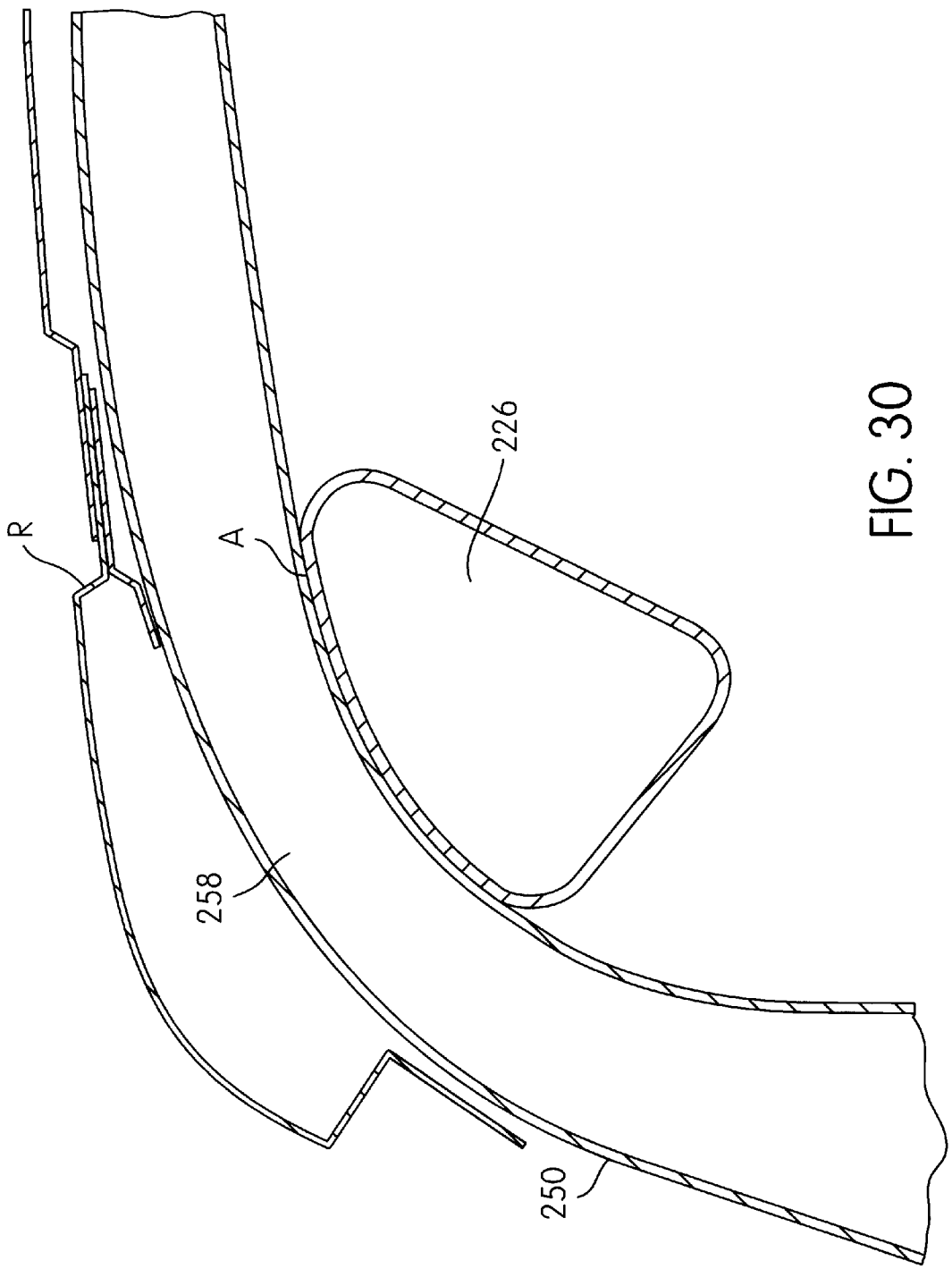
Figure 31:
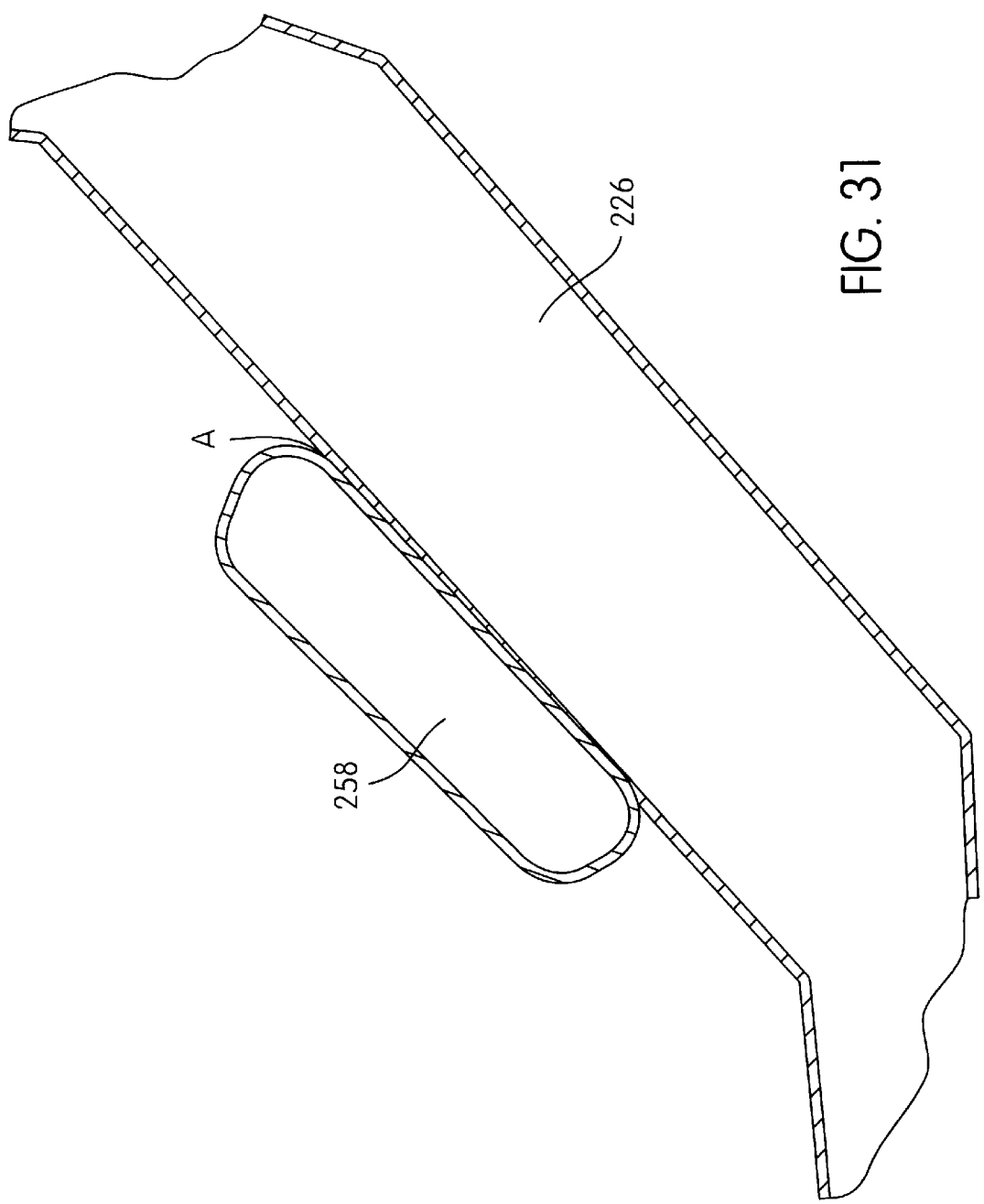
Figure 32:
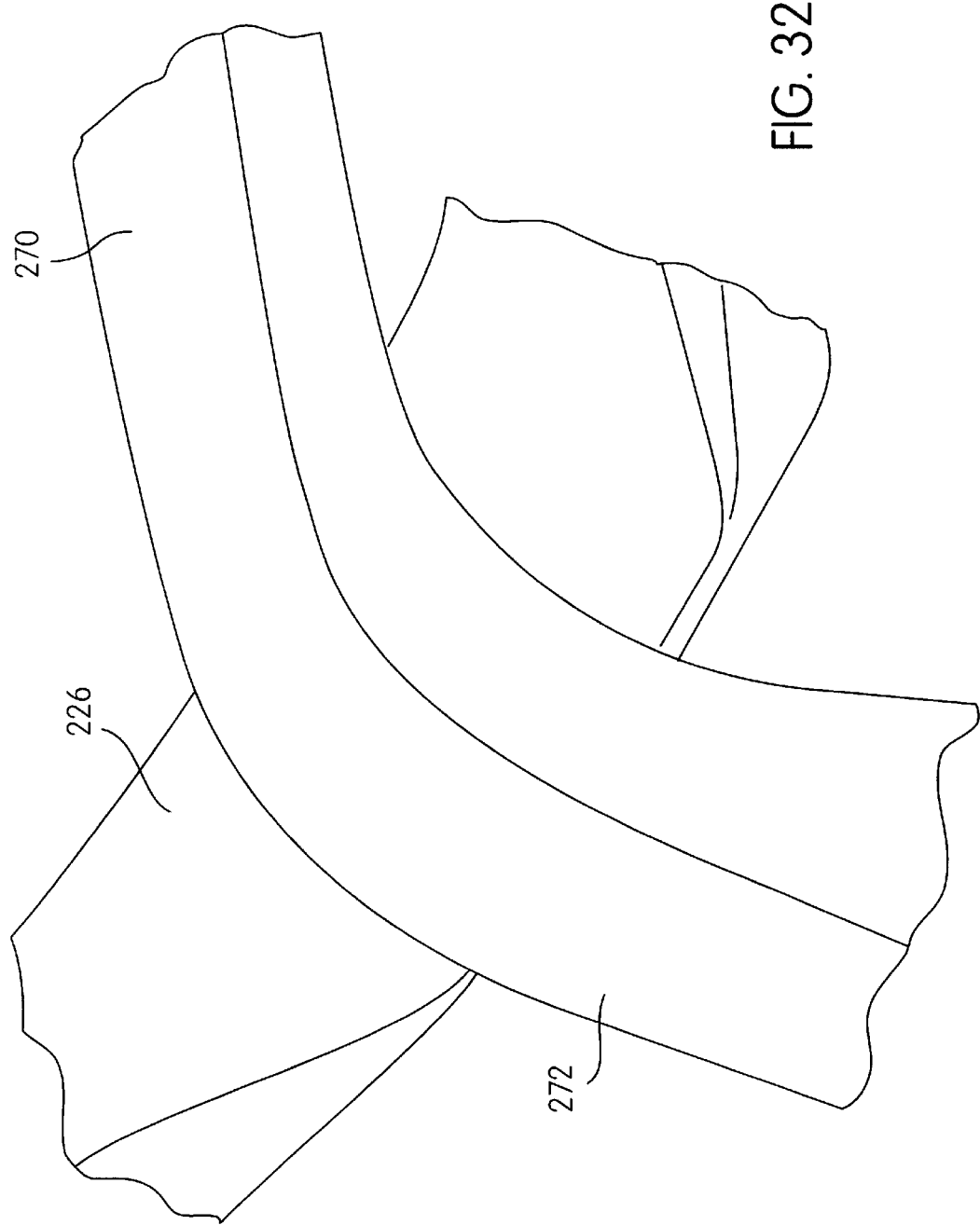
Figure 33:
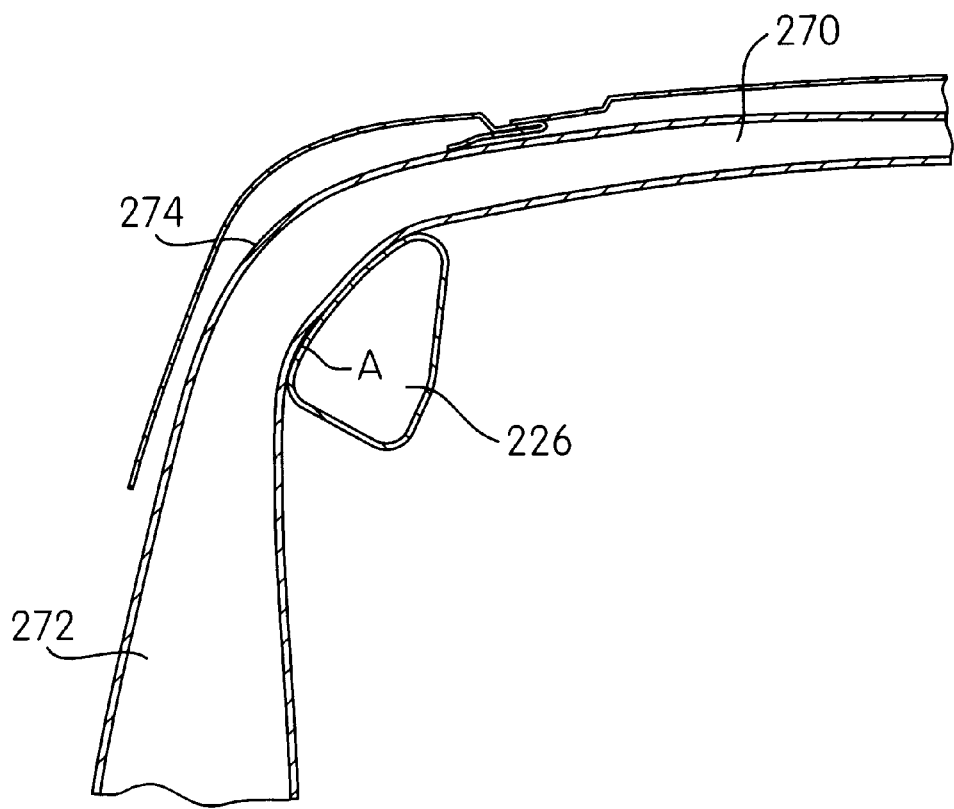
Figure 34:
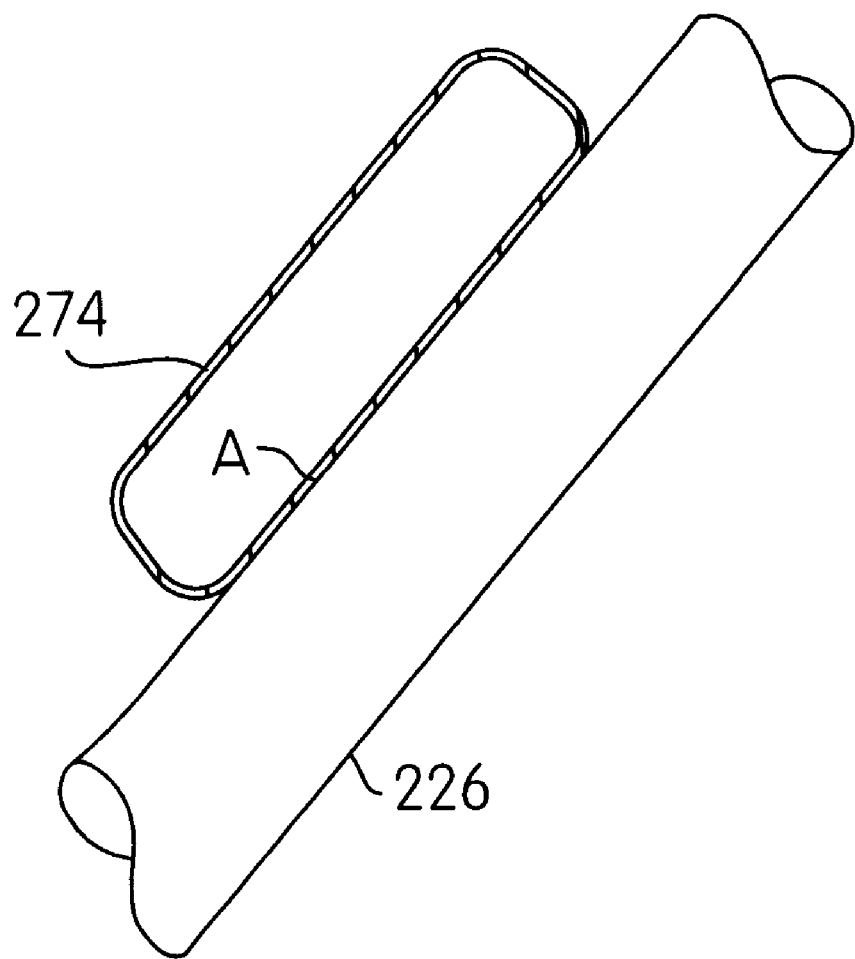

A pair of inverted U-shaped hydroformed cross-structures 251 and 253 are disposed between the cross-members 246 and the rear aperture ring 227. Specifically a hydroformed forwardly disposed U-shaped cross member 250 has a generally horizontally disposed bight portion 254 extending in a cross-car direction, and a pair of leg portions 256 extending downwardly from the opposite ends of the bight portion 254. Corner portions 258 of the cross-member 250 form the transition between the bight portion 254 and the respective leg portions 256 (see FIG. 8). The corner portions 258 are disposed in overlying or overlapping relation with adjacent, underlying portions of the uppermost straight portions 226 (see Joint H in FIGS. 29–31). The corner portions are preferably adhered to the straight portions by a structural adhesive A. FIG. 30 illustrates how a vehicle roof R would interface with the cross member 250.

Figure 8:
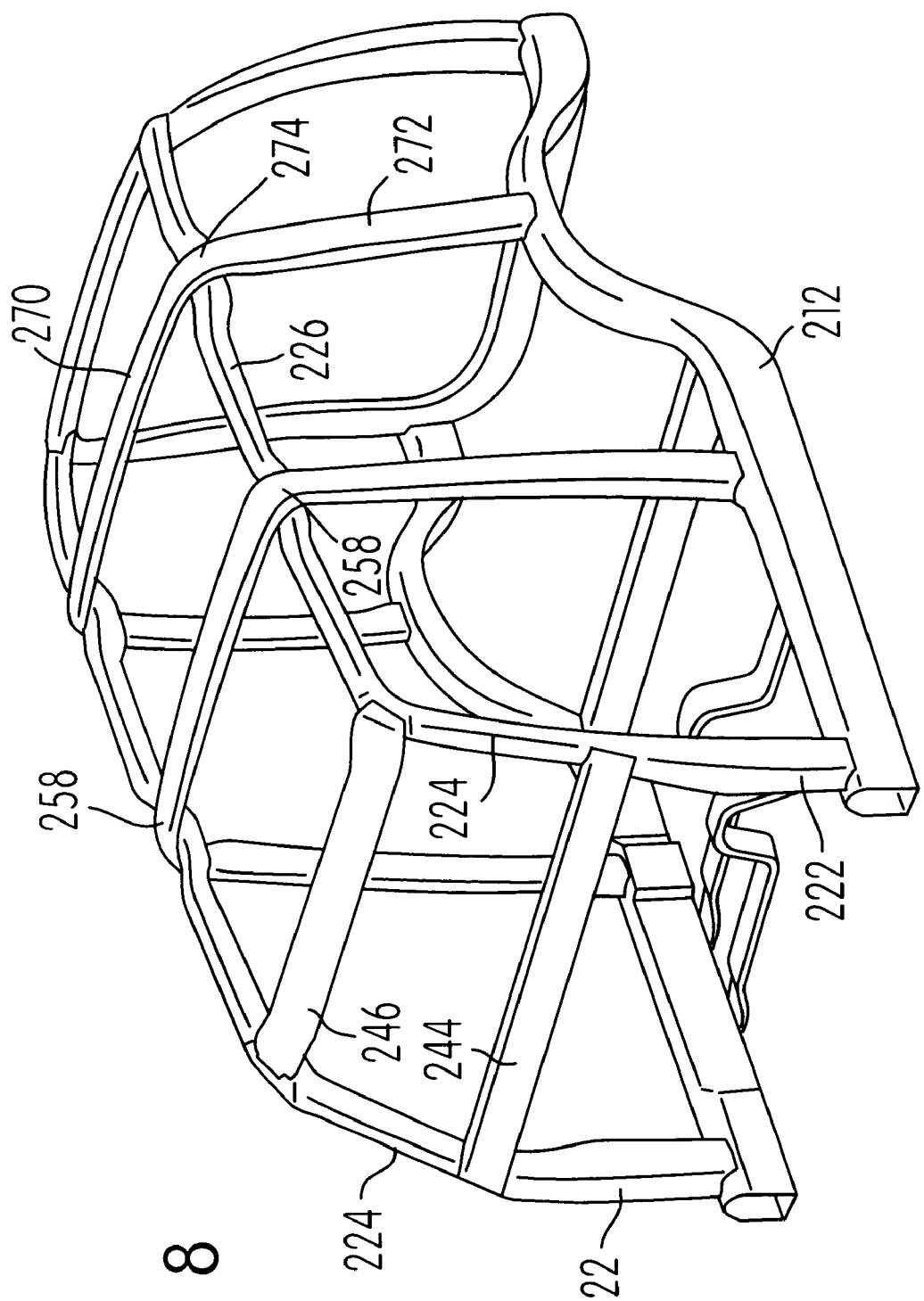
Figure 9:
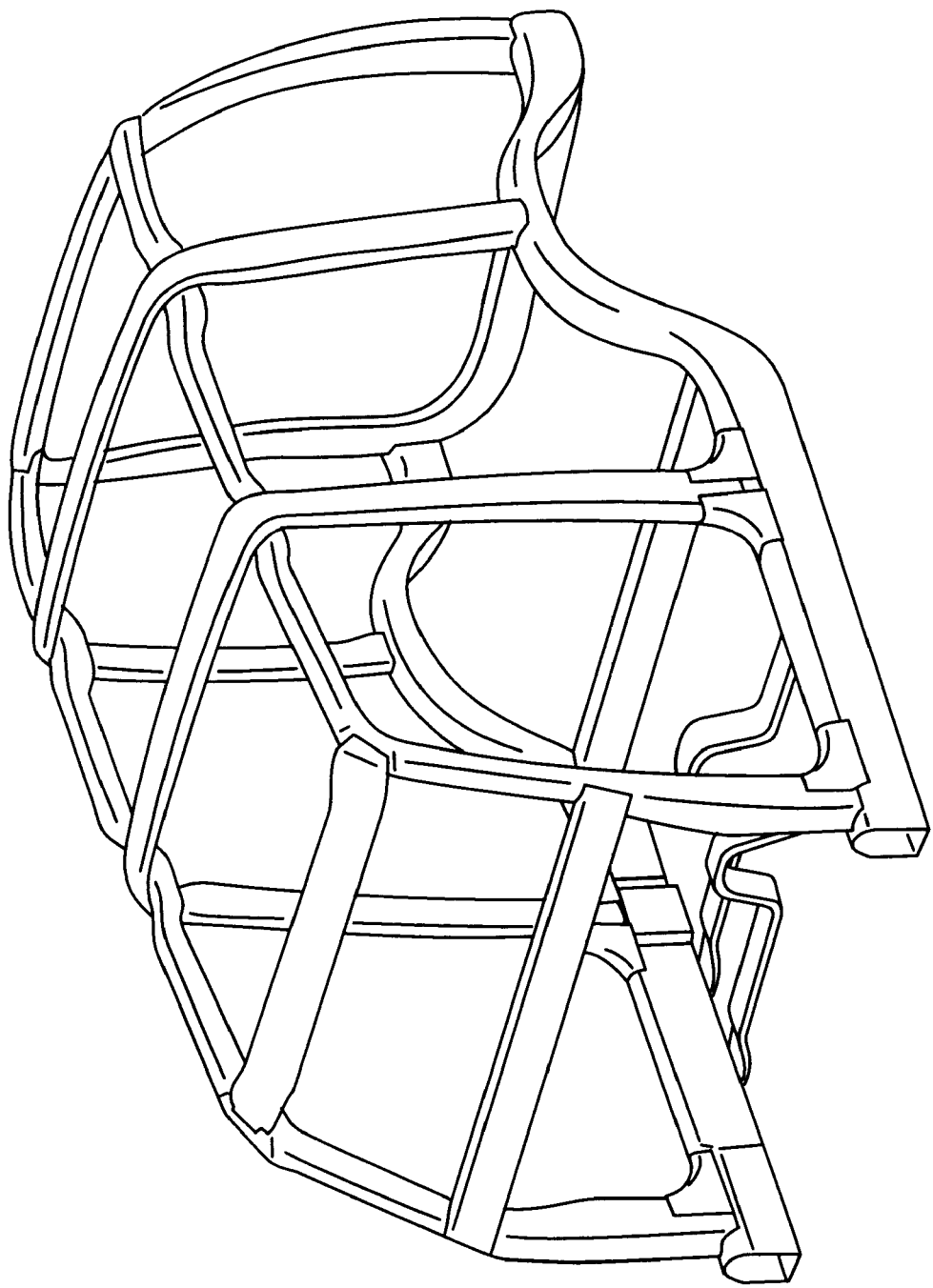
Figure 35:
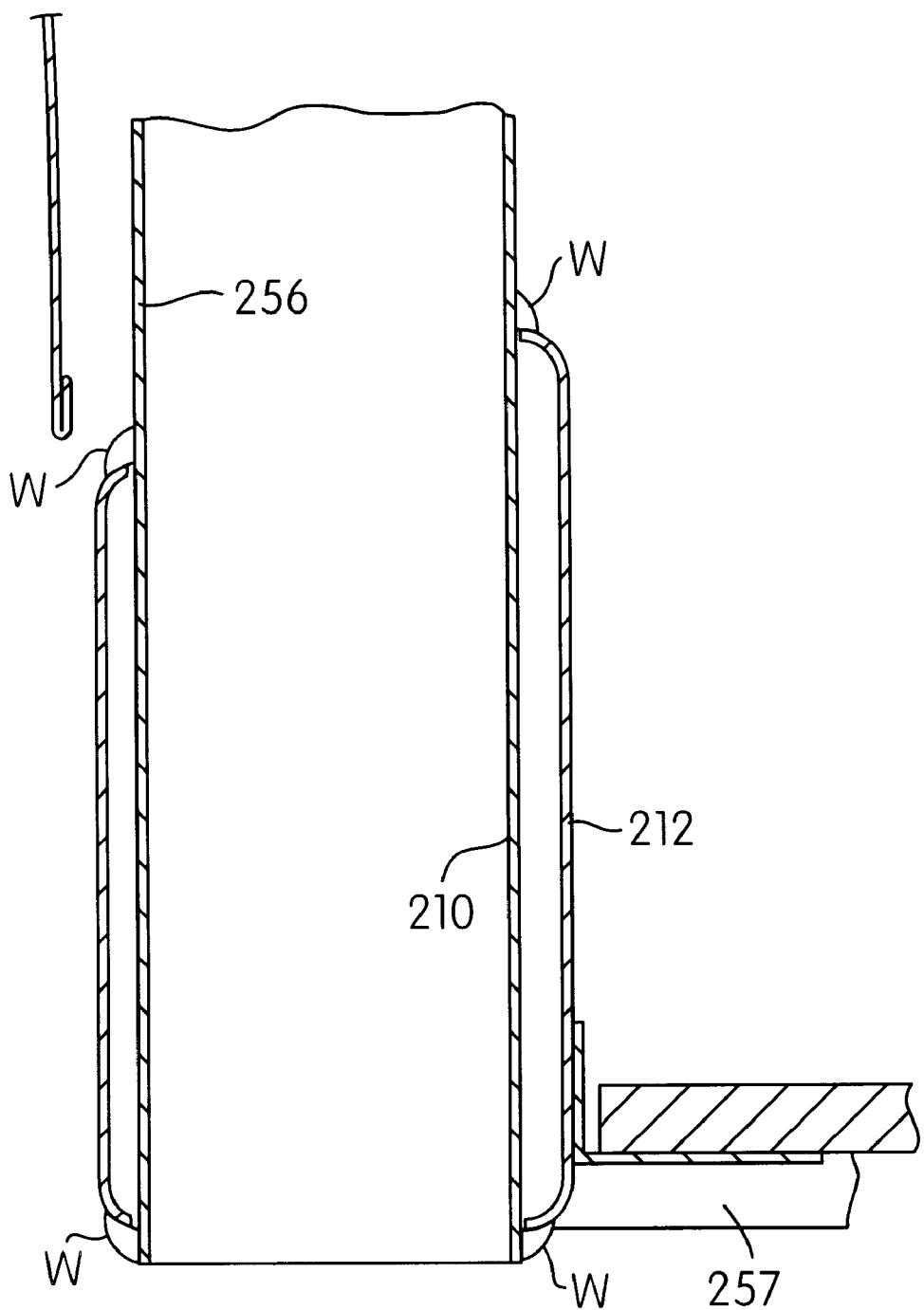

The bottom end portions 260 of the leg portions 256 are received within openings in the side rail members 212 and welded in place at welds W (see Joint J in FIGS. 8 and 35).

The rearward cross-structure 253 is provided by a rear cross-member 252. The rear cross-member 252 comprises a bight portion 270, which is substantially horizontally disposed and extends in the cross-car direction. The bight portion 252 transitions into vertically downwardly extending leg portions 272 from the opposite ends of the bight portion 270. Corner portions 274 form the transition between the bight portion 270 and the respective leg portions 272 (see Joint I in FIGS. 8 and 32–34). The corner portions 274 are disposed in overlapping or overlying relation to adjacent portions of the uppermost straight portions 226, and are preferably joined by a structural adhesive A.

The corner portions 258 and/or 274 may be disposed in hydroformed recesses formed in the exterior configuration of the uppermost straight portions 226 as in the first embodiment.

Figure 36:
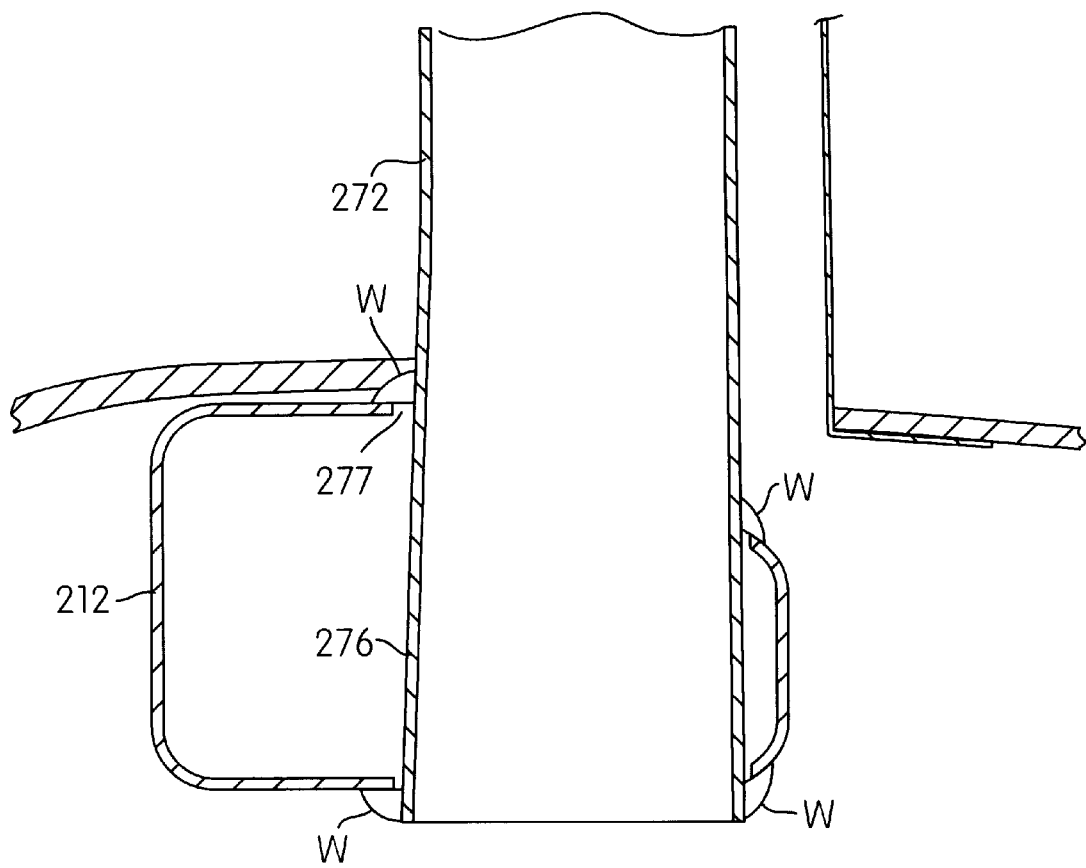

The leg portions 272 have ends 276 thereof received within holes or openings 277 which are punched in the top and bottom walls of the associated lower side rails 212 and mig-welded in place at welds W, as best shown as Joint K in FIGS. 8 and 36.

Again, the teachings of Ser. No. 60/061,238 are preferably employed to avoid wrinkling at the bends (corner portions 258 and 274) in the cross-members 250 and 252.

It should be appreciated that the legs 256 of cross-structure 250 form the "B-pillar" structures of the space frame 200. Similarly, the legs 272 of the more rearwardly disposed cross-structure 252 form the "C-pillar" structures.

It should be appreciated that at each of the overlapping joints discussed above in the second embodiment, net pads can be used in the hydroforming die for forming recesses in the hydroformed tubes to facilitate joining of the parts, as can be appreciated from the discussions of the first embodiment, particularly with respect to FIGS. 2–4. It should be appreciated that this type of connection can be at any joint, and not only at the corners 258 and 274.

Because the frame members described above are all hydroformed, a precisely configured space frame can be achieved. For example, because the upper longitudinal structures 220 are hydroformed and extend from the A-pillar structure to an upper connection with the D-pillar structure, the length of the space frame between the A-pillar and D-pillar structures can be precisely defined. In addition, the rear aperture ring, formed by two hydroformed U-shaped members the, cross-car dimension (between the D-pillar structures) as well as the vertical dimension of the space frame can be precisely defined.

Figure 37:
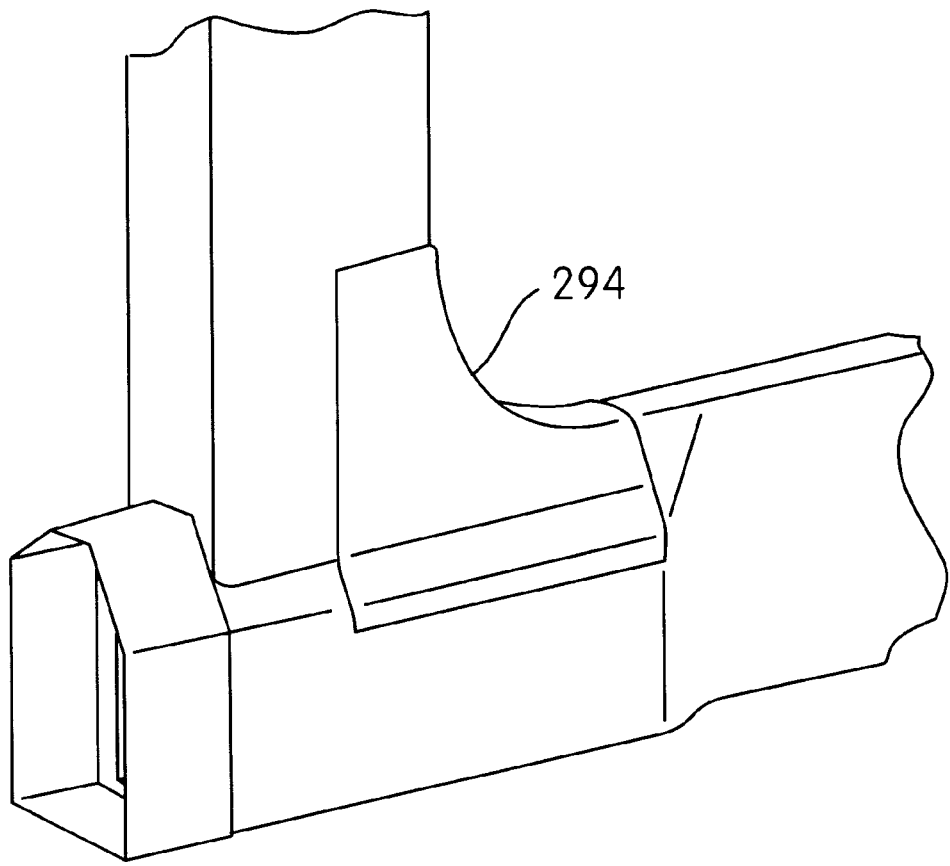
Figure 39:
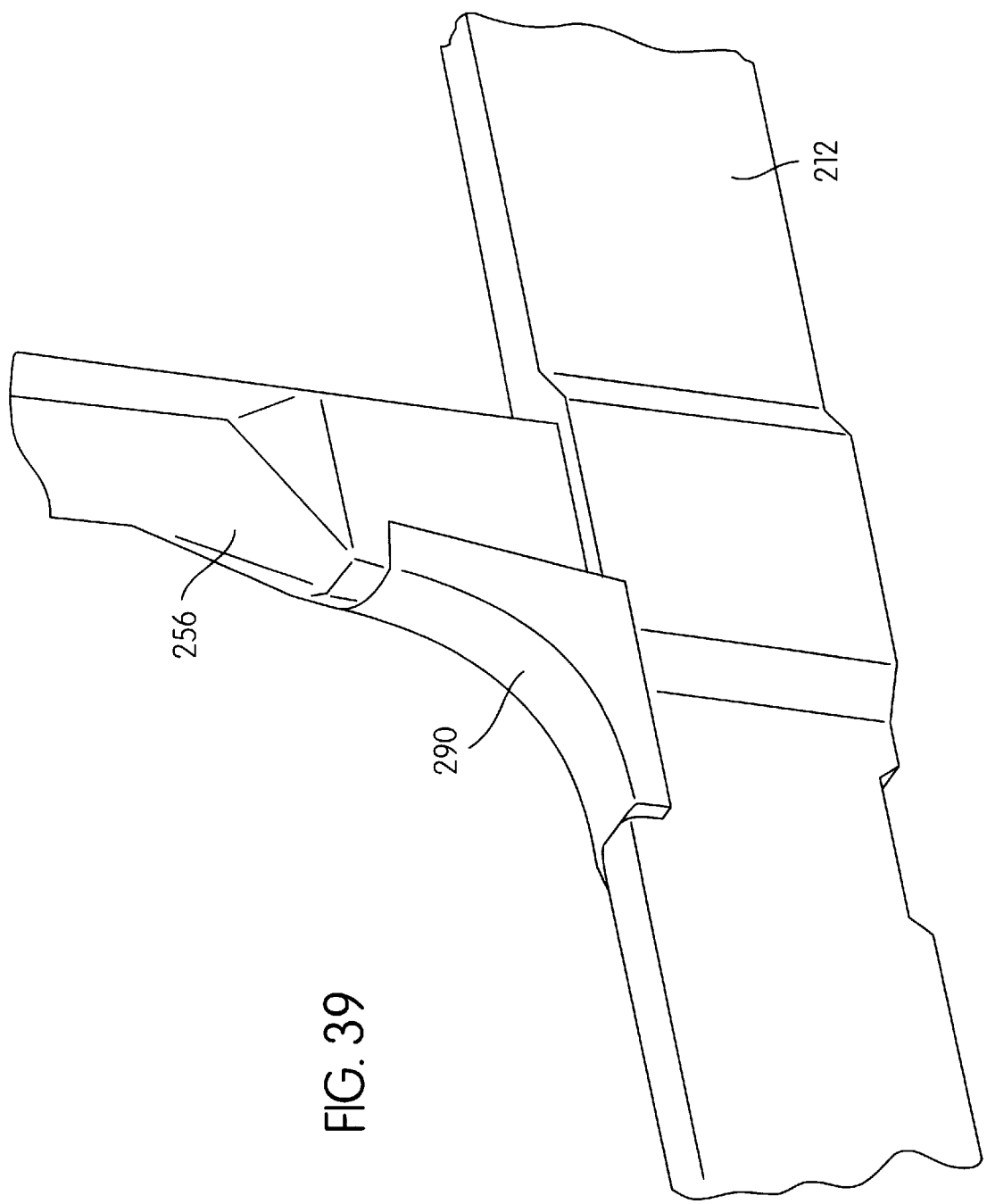
Figure 40:
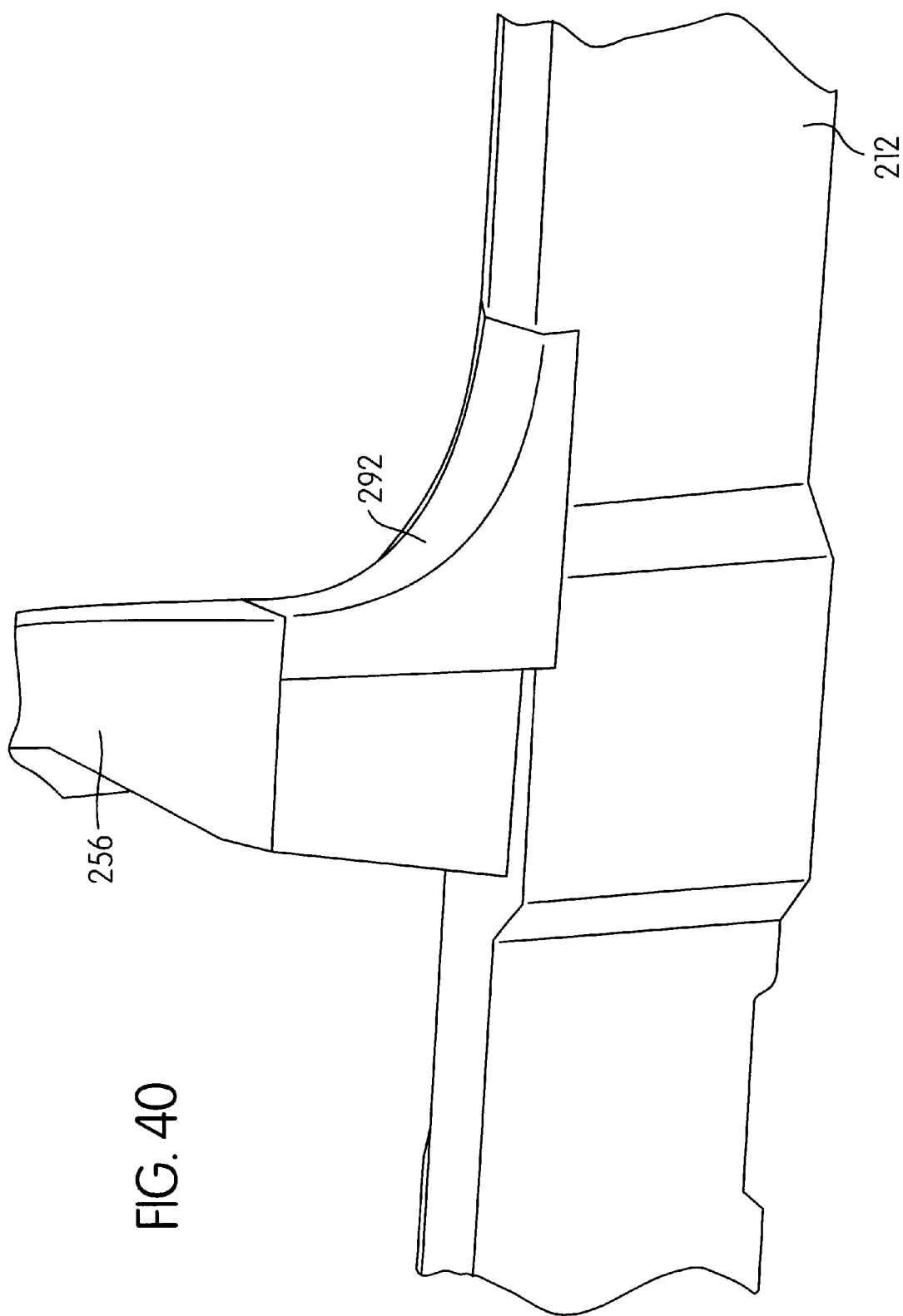

Preferably, as illustrated in FIGS. 39 and 40, the lower end portions 260 of the B-pillar structures formed by vertical portions 256, after being received and welded in place in the opening within the lower rail members 212 (see FIG. 35) are each further supported by a front gusset member 290 (see FIG. 39) and a rear gusset member 292 (see FIG. 40), which are preferably fixed in place by a structural adhesive. Similarly, the A-pillar structures are each provided with a rear gusset 294 (see FIGS. 37 and 38) for supporting the connection between each A-pillar structure and the associated lower rail.

Figure 41:
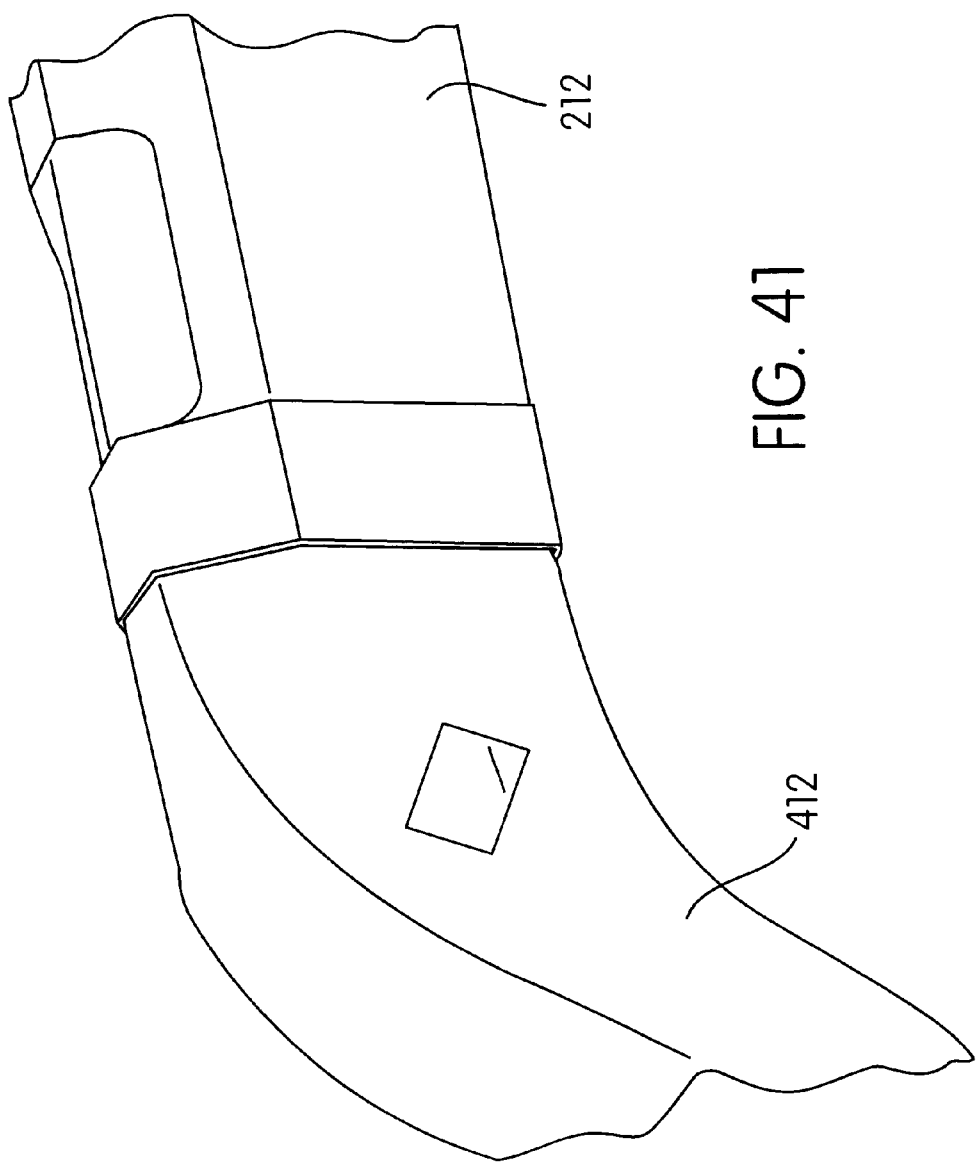

The front end module 400 is preferably made from a plurality of hydroformed members, including lower front frame rail members 412 connected with the side rail members 212 as best illustrated in FIG. 41 that provide laterally spaced, rigid elongated structures on each side of the front module 400. As shown, the rear ends of front frame rail members 412 are telescopingly received in the front ends of the side rail members 212.

Figure 42:
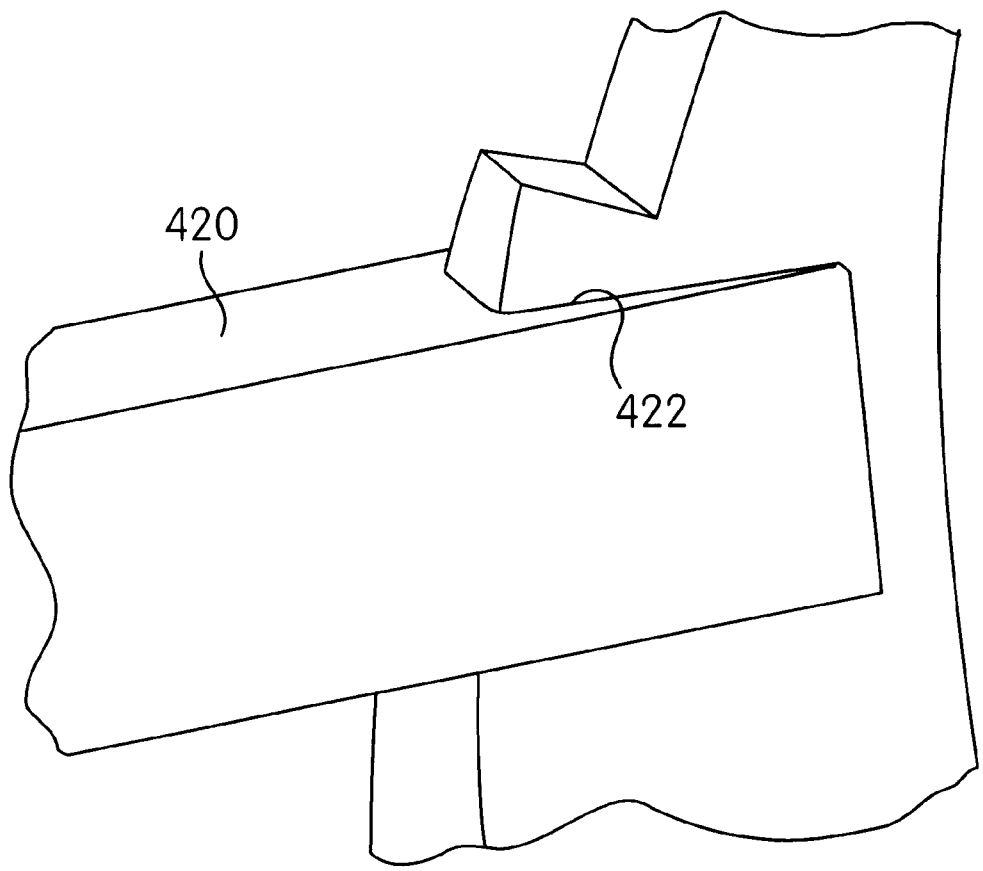

In addition, a pair of upper longitudinally extending structures are provided by elongated members 420. The elongated members 420 are preferably hydroformed and define the upper front end of the vehicle (e.g., for supporting body panels including the front hood). As shown best in FIG. 42, each member 420 is provided with a recess 422 formed in the opposite ends thereof for receiving the A-pillar structure of the space frame, and is then welded in place. Because the members 420 are connected with the A-pillar structures, the A-pillar structures will absorb longitudinal force applied to the members 420. Similarly, longitudinal forces applied to the front rail members 412 will be absorbed by the rail members 212. As a result, the front end module 400 allows front end forces to be absorbed and countered by the vehicle cage 210.

Figure 11:
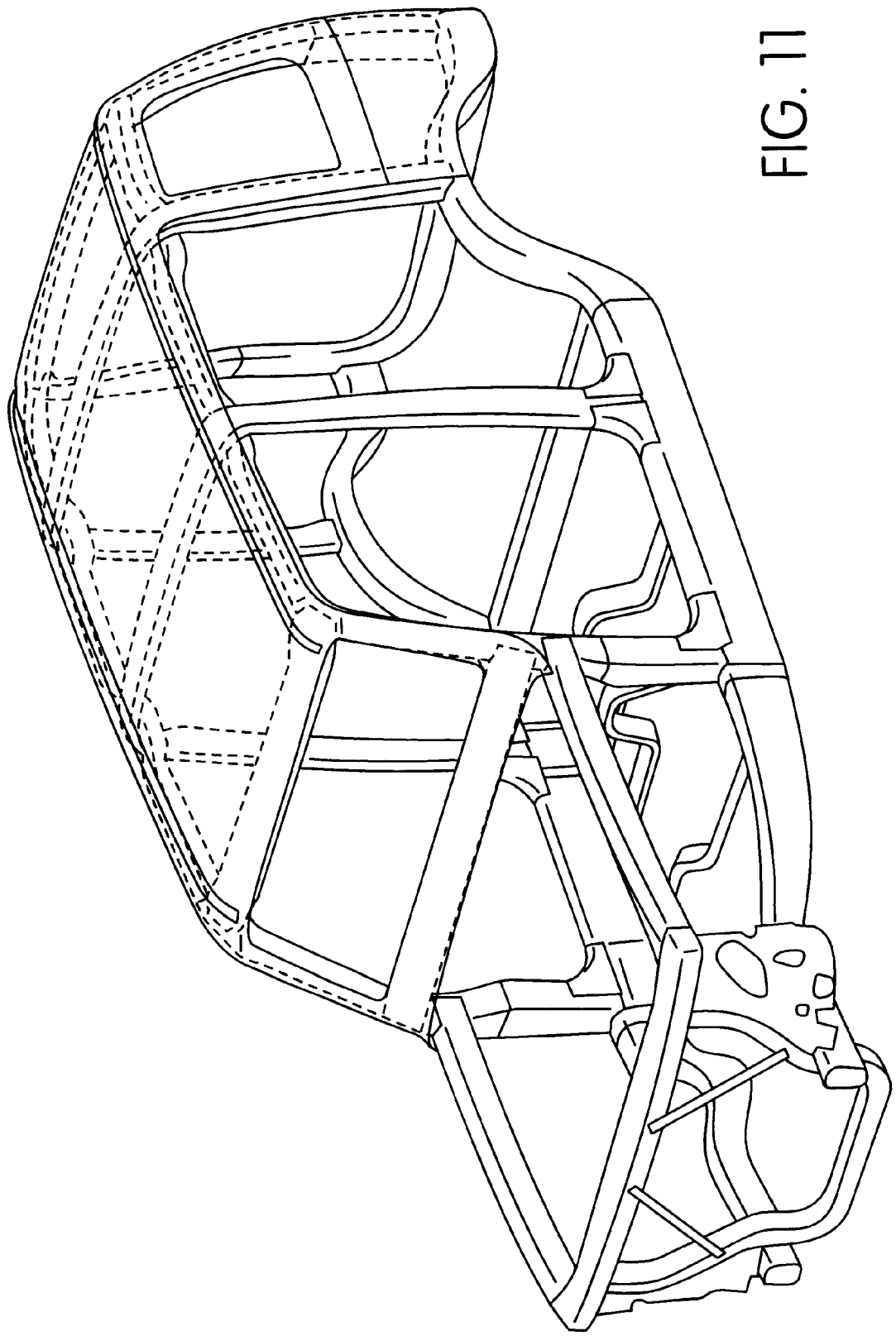
Figure 43:
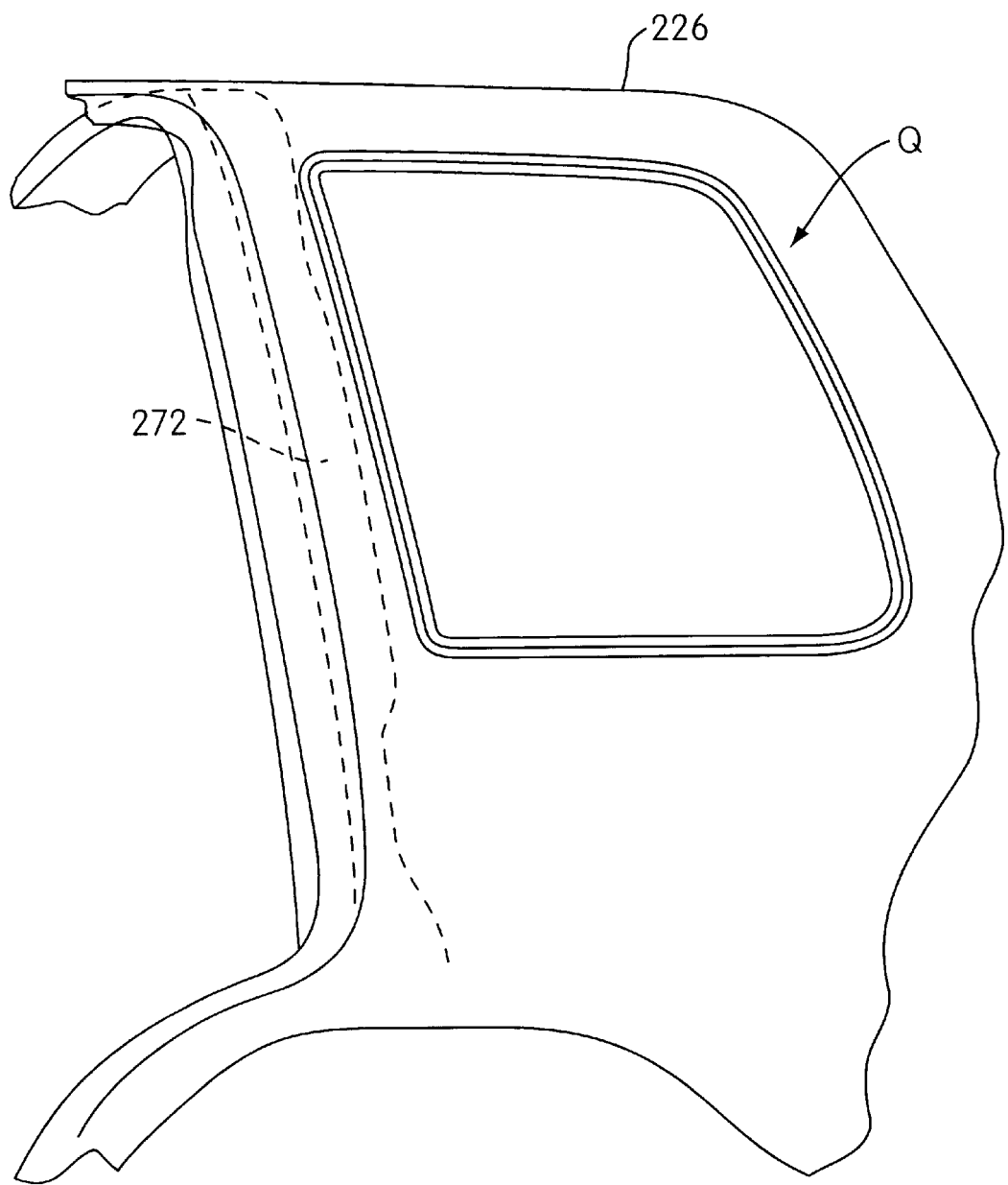

FIGS. 11 and 43 illustrate the manner in which a rear quarter panel Q would be mounted on the space frame 200. Preferably, the rear quarter panel would be fixed to the C-pillar structure 272 (Joint R) and to the rearward portion of the longitudinally extending portion 226 by a structural adhesive A, as best seen in FIG. 45.

Figure 44:
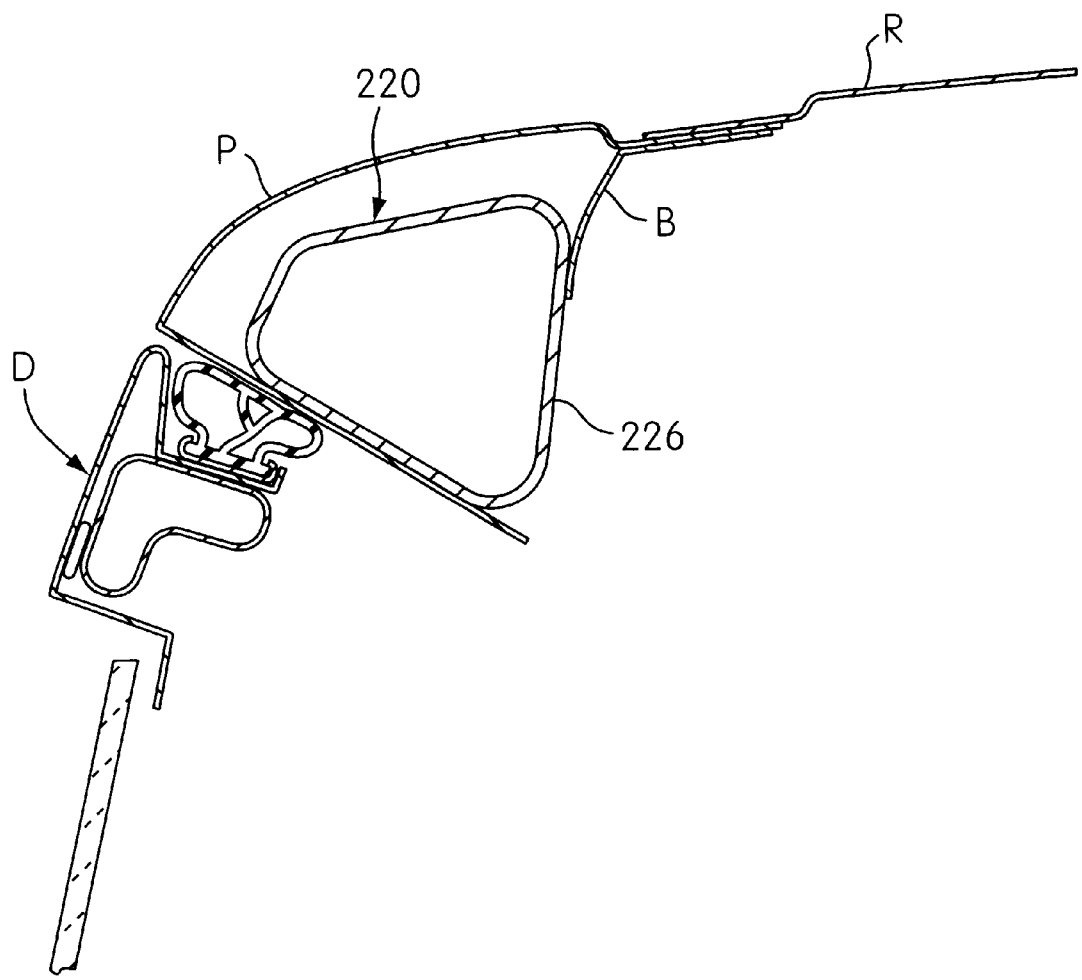

As best seen in FIG. 44, a vehicle roof R can be mounted to the longitudinally extending portion 226 by a bracket B. The bracket B may also support a corner panel P. A front driver's side door D is also illustrated in FIG. 44, the parts of which can be appreciated from the more detailed description of a rear passenger door 374.

Figure 45:
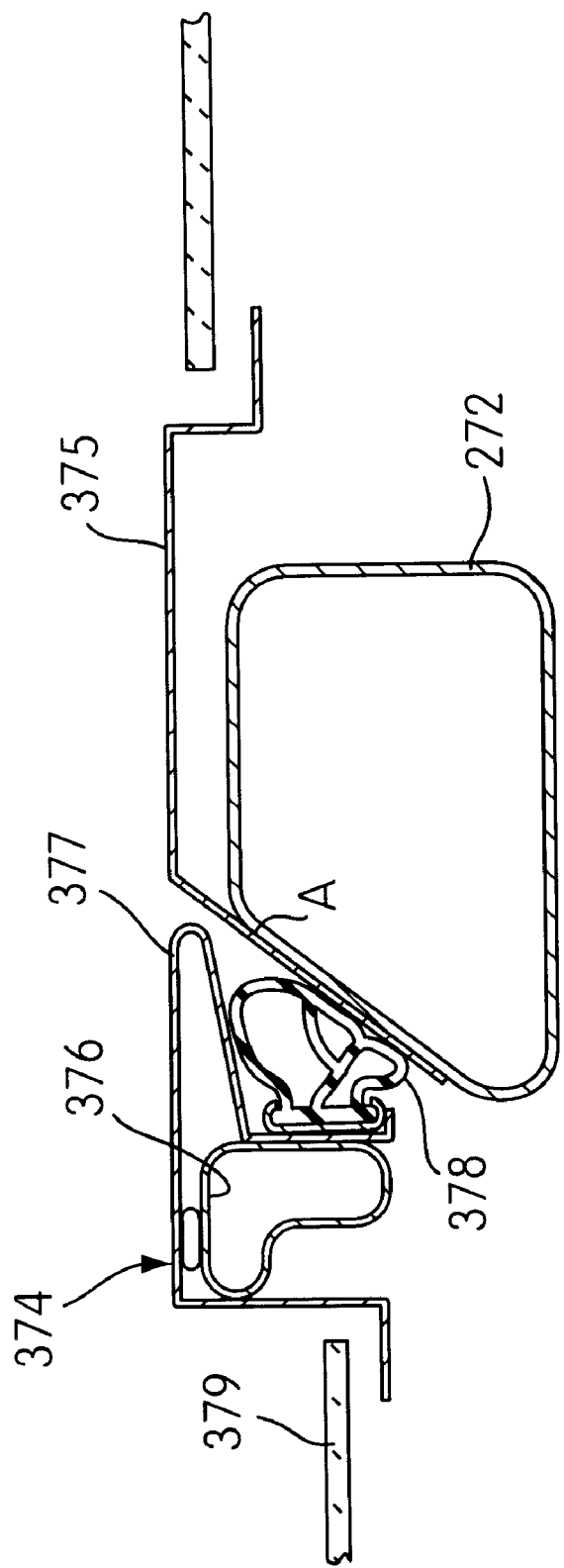

Joint R, which is the interface between the vehicle C-pillar structure and the rear passenger door 374, and the connection of the C-pillar structure 272 with the rear quarter panel Q is illustrated in FIG. 45. Preferably, the door 374 has a peripheral hydroformed door frame 376 manufactured by hydroforming two U-shaped tubular members in accordance with the teachings above in relation to the door in the first embodiment. The frame 376 is welded to outer door sheet metal 377. A door seal 378 and door window 379 are also shown.

Figure 46:
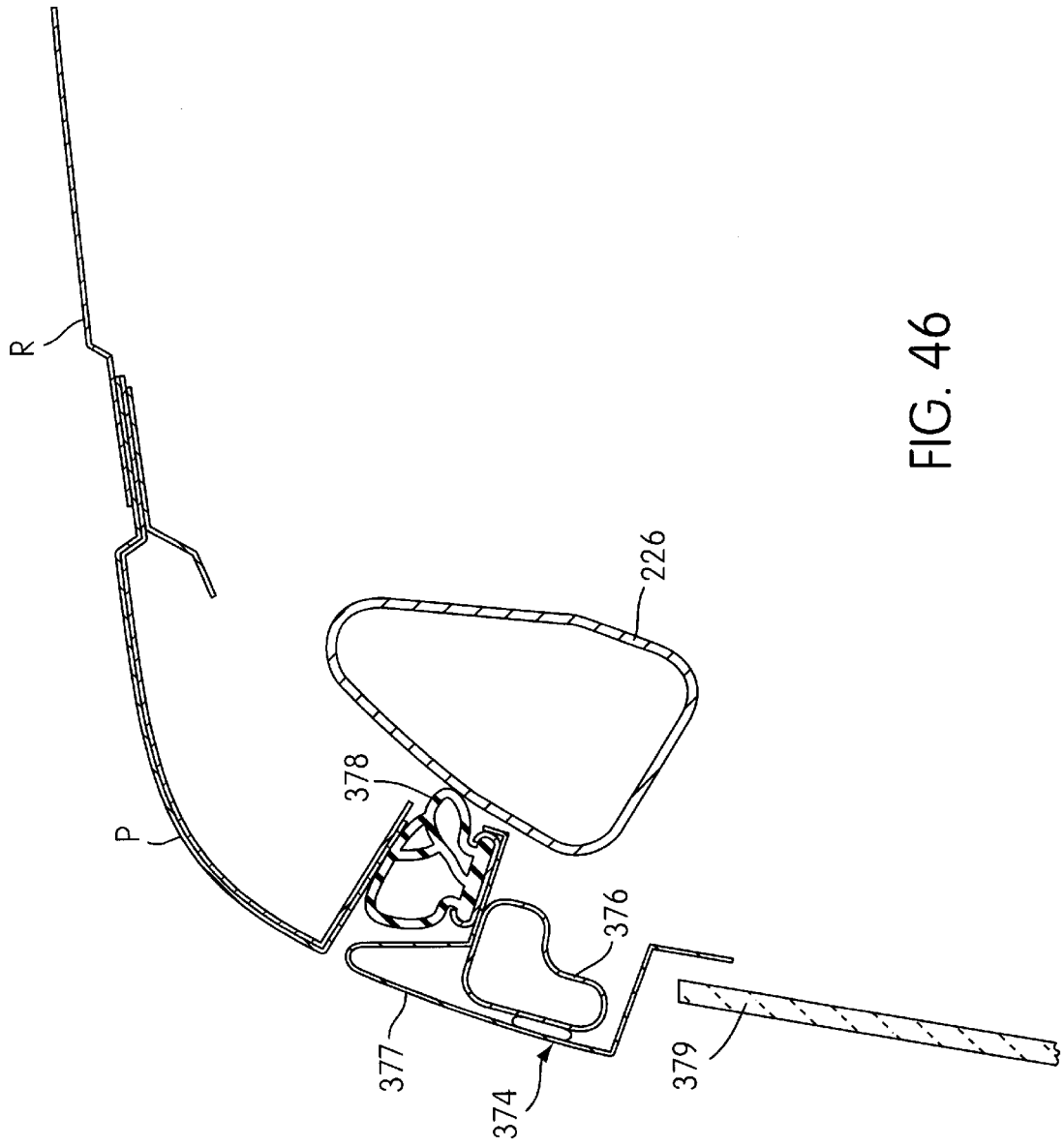
Figure 47:
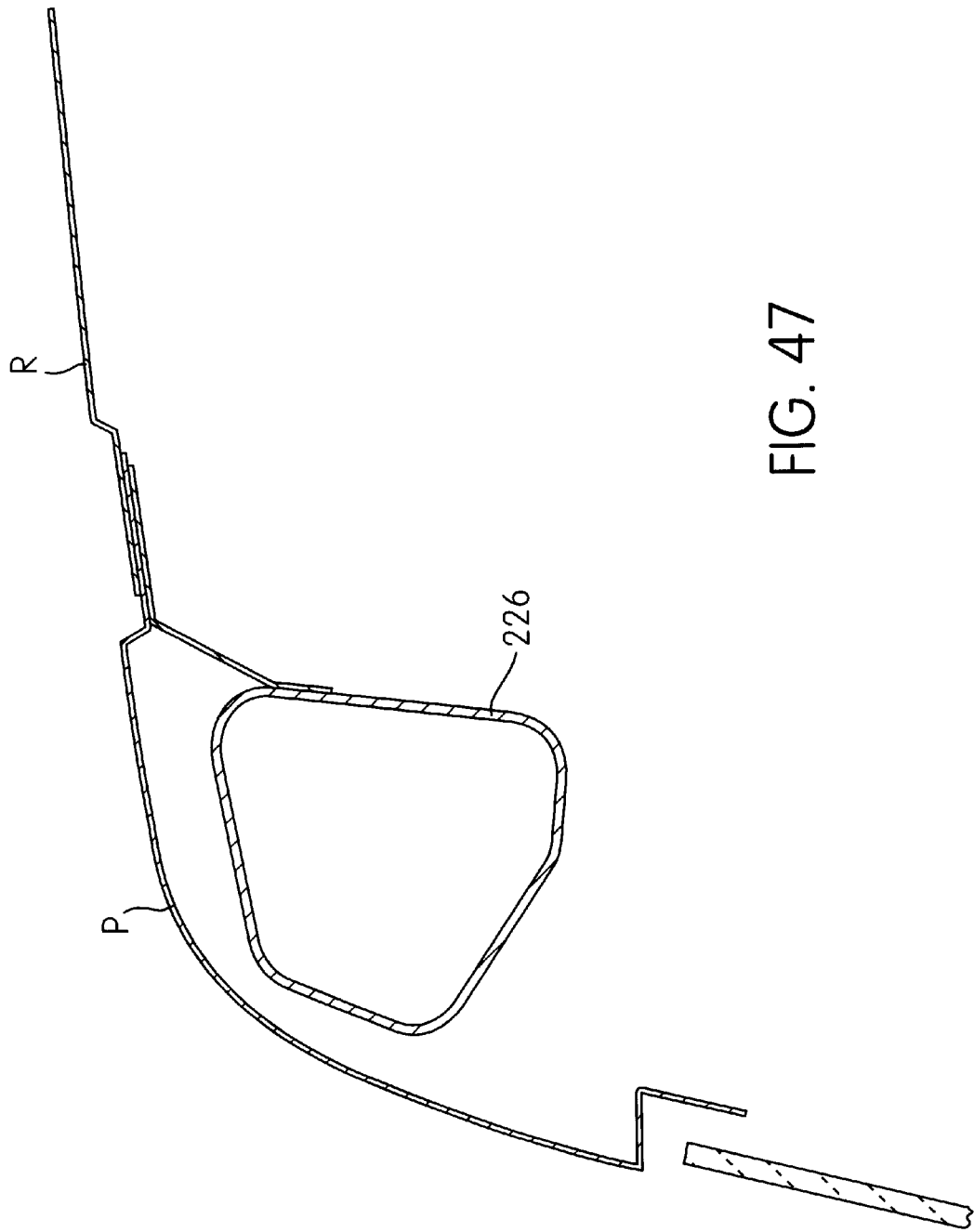

FIGS. 46 and 47 are enlarged cross-sectional views of Joints S and T of FIG. 11, respectively.

Figure 48:
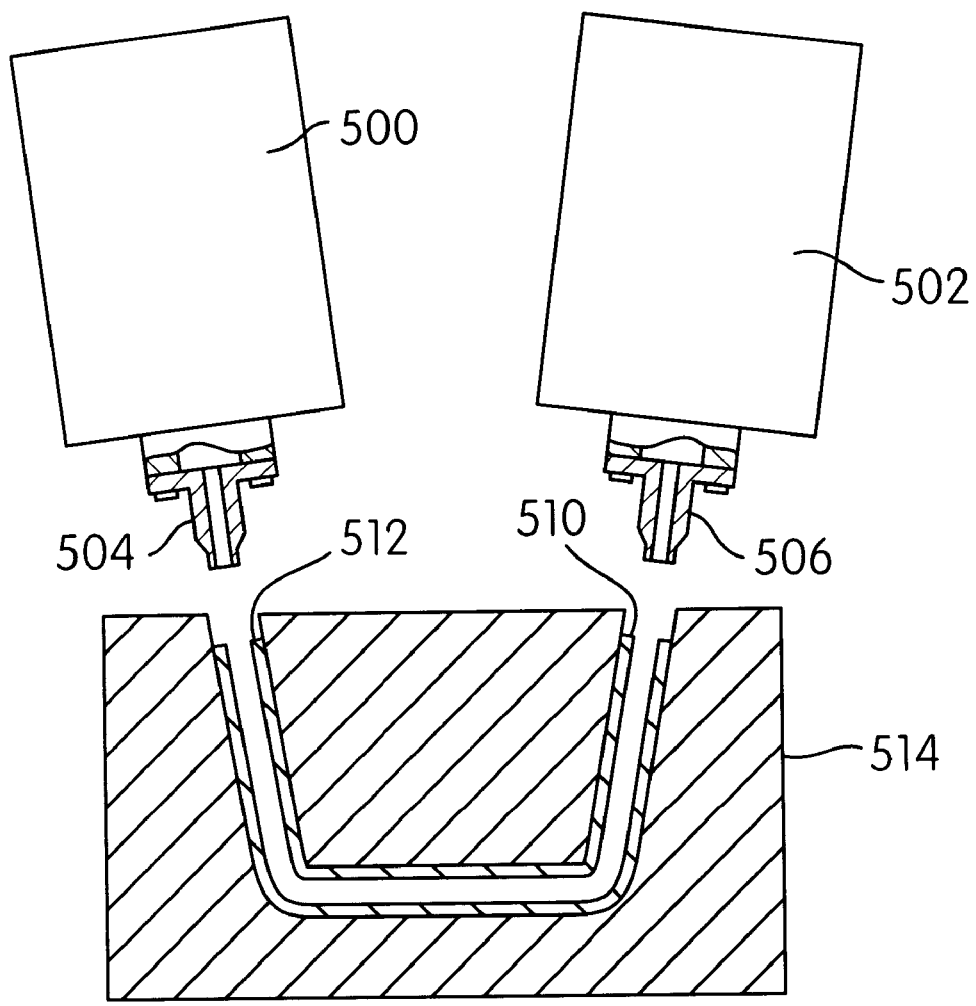
FIG. 48 is a cross-sectional view of a hydroforming die assembly for illustrating the method in accordance with the present invention.

FIG. 48 is a cross sectional view of a hydroforming die assembly for illustrating the method of the present invention. Of course, the shape of the die cavity in accordance with the present invention is particularly adapted to the shape of the new and advantageous tubular parts now contemplated. FIG. 48 is representative in nature and illustrates two hydroforming ram assemblies 500 and 502, which have outer ram members, respectively, which are movable to engage and seal opposite ends of a tubular blank 510, which has been bent (for example in a CNC bending machine) to fit within a die cavity 512 of a hydroforming die structure 514. The blank 510, which is in the form of a tubular metallic wall, can represent any U-shaped or inverted U-shaped metallic wall or blank member discussed above. The tube 510 is preferably immersed in a water bath so as to be filled with hydroforming fluid. The rams 500 and 502 include hydraulic intensifiers, which can intensify the hydroforming fluid to expand the tubular wall or blank into irregularly outwardly deformed conformity with the die surfaces so as to fix the tubular wall or blank into a predetermined irregular exterior surface configuration as disclosed in Ser. No. 60/061,238. The outer rams 504 and 506 push inwardly into the die structure so as create metal flow within the blank 510 so as to replenish or maintain the wall thickness of final tube part within about ± of the original wall thickness of the blank (i.e., to compensate for wall thinning during diametric expansion of the tube). As discussed above, greater detail of the method is disclosed in the incorporated Ser. No. 60/061,238.

It should be appreciated that the methodology of Ser. No. 60/061,238 would not be used for parts that were not bent at an angle of less than 30°. Preferably, straight parts, such as cross member 246 may be hydroformed in accordance with Ser. No. 08/915,910, filed Aug. 21, 1997, entitled Hydroforming Die Assembly For Pinch-Free Tube Forming, hereby incorporated by reference.

Briefly, in accordance with the hydroforming methodology of the present invention, a first tubular metal blank having a generally U-shaped configuration is placed into the hydroforming die assembly, the die assembly having die surfaces defining a die cavity. The ends of the tube blank are sealed, and hydraulic fluid is pressurized by an intensifier within the interior of the first tubular metal blank so as to expand the blank into conformity with the die surfaces of the die cavity and thereby form a first of the hydroformed upper longitudinal members, such as longitudinal members 20 of the first embodiment or 220 of the second embodiment. A second tubular metal blank having a generally U-shaped configuration is also placed into a hydroforming die assembly, and pressurized fluid expands this second tubular metal blank so as to expand the blank into conformity with the die surfaces of the die cavity and thereby form a second of the hydroformed upper longitudinal members (20 or 220). The first and second upper longitudinal members each provide at least one pillar of the space frame. For example, each upper longitudinal member 20 of the first embodiment provides both the A-pillar and the D-pillar structures, while in the second embodiment, each member 220 provides a respective A-pillar structure as an internal point thereof. First and second lower side rail members (12 or 212) are provided, and the at least one pillar structure of the first hydroformed upper longitudinal member is connected to a first of the spaced lower side rail members. The at least one pillar structure of each second hydroformed upper longitudinal member (20 or 220) is connected to a second of the spaced lower side rail members. The first and second lower side rail members are positioned in laterally spaced relation to one another. The first and second lower side rail members (12 or 212) are connected to one another with laterally extending connecting structure, for example, the cross member 80 of the first embodiment and cross members 251, 255, and 257 of the second embodiment.

The present invention also contemplates that the U-shaped cross members (e.g., 50, 52, 250, and 252, are hydroformed by placing a tubular metal blank having a generally U-shaped configuration into a hydroforming die assembly and then providing pressurized fluid inside the blank to expand the blank to conform to the die surfaces. The first and second lower side rail members are positioned in laterally spaced relation to one another. A first end of the hydroformed cross member is connected to the first lower side rail member, and a second end of the hydroformed cross member is connected to the second lower side rail member.

It is to be understood that each of the hydroformed tubular members discussed herein is formed from an integral tubular blank from a tube stock. Preferably, the blank is formed by conventional roll forming and subsequent seam welding technology. The tubular blank is then expanded into conformity with the surfaces defining the hydroforming die cavity, so as to form the tube with a shape corresponding to the desired shape for the part. Preferably, the ends of the tubular blank are forced inwardly toward one another during the hydroforming operation so as to replenish or maintain the wall thickness of the formed part within a predetermined range of the wall thickness of the initial tubular blank, as discussed in more detail in the aforesaid application Ser. No. 60/061,238. It should thus also be appreciated that each of the hydroformed tubular parts disclosed in the present application is formed from a single tubular member which is positioned within the hydroforming die, although the single tubular blank member may itself be formed by joining two or more tubular members to one another (e.g., by butt welding the tubular blank members in end-to-end fashion) before it is placed in the hydroforming die to be hydroformed. In this sense, each hydroformed tubular structure disclosed herein is an integrally formed tubular structure, meaning that it has been hydroformed into a singular tubular structure that corresponds to a desired shape, and does not comprises a plurality of tubular structures fixed to one another. In addition, when formed in accordance with the preferred method, each of the hydroformed tubular structures in accordance with the present invention has only a single longitudinal seam weld, which weld was performed in creating the original tubular blank. This is distinct from more conventional tubular frame members, which comprise two C-shaped or clam-shell halves welded to one another in facing relation along two seams.

While the invention has been disclosed and described with reference with a limited number of embodiments, it will be apparent that variations and modifications may be made thereto without departure from the spirit and scope of the invention. Therefore, the following claims are intended to cover all such modifications, variations, and equivalents thereof in accordance with the principles and advantages noted herein.

What is claimed is:

1. A space frame for a motor vehicle, comprising:

first and second longitudinally extending laterally spaced lower side rails;

a pair of hydroformed tubular upper longitudinal members each being defined by an irregularly outwardly deformed tubular metallic wall fixed into a predetermined irregular exterior surface configuration, each upper longitudinal member being connected to an associated one of said lower side rails, each upper longitudinal member having an upright portion extending upwardly from said associated lower side rail so as to form an A-pillar of said space frame, each upper longitudinal member having a longitudinally extending portion extending rearwardly from said A-pillar forming upright portion thereof, each upper longitudinal member extending downwardly to said associated lower side rail to form a rearward-most pillar of said space frame, said hydroformed tubular upper longitudinal members thus defining longitudinal lengths between the A-pillars and said rearward-most pillars of said space frame; and a lower, rearward cross member constructed and arranged to space said lower side rails from one another.

2. The space frame according to claim 1, further comprising an inverted U-shaped hydroformed tubular cross member defined by an irregularly outwardly deformed tubular metallic wall fixed into a predetermined irregular exterior surface configuration, said tubular cross member having first and second leg portions being connected at a free end of said first leg portion thereof to said first lower side rail and connected at a free end of said second leg portion thereof to said second lower side rail, said first leg portion extending upwardly from the free end thereof to form a first B-pillar, said hydroformed cross member having a cross portion between said leg portions extending across said vehicle frame from said first B-pillar, said second leg portion extending downwardly from said cross portion towards the free end thereof to form a second B-pillar, the cross portion of said hydroformed tubular cross member thus defining a length between said B-pillars of said space frame.

3. The space frame according to claim 2, wherein said lower side rails comprise first and second hydroformed tubular side rail members each being defined by an irregularly outwardly deformed tubular metallic wall fixed into a predetermined irregular exterior surface configuration.

4. The space frame according to claim 3, wherein said hydroformed tubular cross member is disposed in abutting lapped relation with said longitudinally extending portion of each of said hydroformed tubular upper longitudinal members, said longitudinally extending portion of each of said hydroformed tubular upper longitudinal member being provided with a recess, and wherein said hydroformed tubular cross member includes junctures between said leg portions and said cross portion disposed within said recesses.

5. A space frame for a motor vehicle according to claim 4, wherein said lower, rearward cross member comprises a hydroformed tubular spacing member defined by an irregularly outwardly deformed tubular metallic wall fixed into a predetermined irregular exterior surface configuration laterally spacing said lower side rails.

6. A space frame according to claim 5, further comprising forward connecting members, said forward connecting members extending laterally between said upper longitudinal structures and connecting said upper longitudinal structures to one another.

7. A space frame according to claim 1, further comprising a door structure, said door structure being pivotally connected with one of said upper longitudinal members at the upright portion thereof that extends upwardly from a forward end portion of said associated lower side rail.

8. A space frame according to claim 7, wherein said door structure comprises a plurality of hydroformed tubular door members each being defined by an irregularly outwardly deformed tubular metallic wall fixed into a predetermined irregular exterior surface configuration, said hydroformed tubular door members being connected end-to-end to form a periphery of said door structure.

9. A space frame according to claim 8, wherein said plurality of hydroformed tubular door members comprises a first U-shaped hydroformed tubular door member and a second U-shaped hydroformed tubular door member, said second U-shaped hydroformed tubular door member being inverted relative to said first U-shaped hydroformed tubular door member and having opposite ends connected to respective opposite ends of said first U-shaped hydroformed tubular door member.

10. A space frame for a motor vehicle, comprising:

first and second hydroformed, longitudinally extending laterally spaced tubular lower side rails each being defined by an irregularly outwardly deformed tubular metallic wall fixed into a predetermined irregular exterior surface configuration;

a pair of hydroformed tubular upper longitudinal members, each being defined by an irregularly outwardly deformed tubular metallic wall fixed into a predetermined irregular exterior surface configuration fixed to an associated one of said hydroformed lower side rails, each hydroformed upper longitudinal member having a longitudinally extending portion constructed and arranged to support a side of a roof of said motor vehicle, each longitudinally extending portion extending longitudinally between an upper end of an A-pillar of said space frame and an upper end of a rearward-most pillar of said space frame, said hydroformed tubular upper longitudinal members thus defining longitudinal lengths between said vehicle A-pillars and said rearward-most pillars of said space frame; and laterally extending connecting structure constructed and arranged to connect said first and second hydroformed lower side rails to one another.

11. A space frame according to claim 10, wherein each of said A-pillars of said spare frame constitutes a vertically extending portion of an associated hydroformed upper longitudinal member, each vertically extending portion connecting said longitudinally extending portion thereof with the associated hydroformed side rail thereof.

12. A space frame according to claim 11, wherein each of said rearward-most pillars of said space frame constitutes a vertically extending structure, said vertically extending structures connecting rearward ends of said longitudinally extending portions of said space frame with rearward ends of the hydroformed side rails of said space frame.

13. A space frame according to claim 12, wherein said vertically extending structures form part of a rearward ring assembly of said space frame, said rearward ring assembly comprising a lower U-shaped member and an upper inverted U-shaped member, said lower U-shaped member having first and second leg portions connected by a cross portion, said upper inverted U-shaped member having first and second leg portions connected by a cross portion, wherein the first leg portion of said lower U-shaped member is connected to the first leg portion of said upper inverted U-shaped member so that said connected first leg portion constitute one of said vertically extending structures forming one of said rearward-most pillars, and wherein the second leg portion of said lower U-shaped member is connected to the second leg portion of said upper inverted U-shaped member so that said connected second leg portions constitute another of said vertically extending structures forming another of said rearward-most pillars.

14. A space frame for a motor vehicle, comprising:
   first and second longitudinally extending laterally spaced lower side rails;
   a pair of longitudinally extending structures constructed and arranged to support a roof of the motor vehicle;
   a plurality of vertically extending structures, each extending between one of said side rails and an associated one of said longitudinally extending structures, said vertically extending structures constituting pillars of said space frame; and
   a rear ring assembly connected with rearward ends of said longitudinally extending structures and rearward ends of said lower side rails, said rear ring assembly comprising first and second hydroformed U-shaped tubular members, each being defined by an irregularly outwardly deformed tubular metallic wall fixed into a predetermined irregular exterior surface configuration each leg of said first U-shaped member each hydroformed U-shaped tubular member including a cross portion and having a pair of leg portions extending from opposite ends of the cross portion, each leg portion of the first U-shaped member being connected with a leg portion of said second hydroformed U-shaped member to define the rear ring assembly of said space frame.

15. A space frame according to claim 14, wherein said first hydroformed U-shaped member is disposed in an upright U-shape configuration, and wherein said second hydroformed U-shaped member is disposed in an inverted U-shape configuration.

16. A space frame for a motor vehicle comprising:
   a vehicle cage formed from a plurality of hydroformed tubular members each being defined by an irregularly outwardly deformed tubular metallic wall fixed into a predetermined irregular exterior surface configuration, said hydroformed tubular members including a pair of upper hydroformed longitudinal members, each having a forward portion forming an A-pillar of said space frame and each including a longitudinal portion extending rearwardly from said A-pillar to an upper end of a rearward-most pillar of said space frame; and
   a front end assembly including a pair of upper longitudinally extending members, each having a rearward end thereof fixed to an associated one of said A-pillars.

17. A space frame for a motor vehicle according to claim 16, wherein said pair of upper longitudinally extending members of said front end assembly are hydroformed front tubular members each being defined by an irregularly outwardly deformed tubular metallic wall fixed into a predetermined irregular exterior surface configuration, said hydroformed front tubular members being fixed to said A-pillars by welded connection.

18. A space frame according to claim 16, wherein said vehicle cage comprises a first pair of laterally spaced, longitudinally extending lower side rails, and wherein said front end assembly comprises a second pair of laterally spaced, longitudinally extending side rails, said first pair of side rails and said second pair of side rails being fixed to one another, and wherein each of said side rails is a tubular hydroformed member each being defined by an irregularly outwardly deformed tubular metallic wall fixed into a predetermined irregular exterior surface configuration.

19. A space frame comprising:
   a pair of laterally spaced longitudinally extending side rail structures,
   longitudinally spaced pairs of corresponding laterally spaced upright structures having joints at their lower ends with said pair of side rail structures and extending upwardly therefrom defining a plurality of pairs of pillars including a pair of forward A pillars, a longitudinally spaced pair of B pillars, and a longitudinally spaced pair of rearward end pillars,
   a pair of side roof structures integral with said pair of A pillars and extending longitudinally rearwardly from said pair of A pillars, said pair of side roof structures having joints with said pair of B pillars and said pair of rearward end pillars,
   longitudinally spaced cross structures having joints with said pair of side rail structures, said pair of A pillars and said pair of roof side structures,
   a front structural assembly having joints with a forward end of said pair of side rail structures and with said A pillars at positions spaced upwardly of said pair of side rail structures,
   a plurality of all of said structures being hydroformed members, each hydroformed member being defined by an irregularly, outwardly deformed tubular metallic wall fixed into a predetermined irregular, exterior surface configuration,
   said hydroformed members including a pair of hydroformed members forming said pair of side roof structures integral with said A pillars and having more than two spaced successive joints which determine defining longitudinal lengths in said space frame,
   said plurality of structures comprising a pair of hydroformed tubular members each defined by an irregularly outwardly deformed tubular metallic wall fixed into a predetermined irregular exterior surface configuration.

20. A space frame as defined in claim 19, wherein said pair of said rail structures comprise a pair of hydroformed members each being defined by an irregularly outwardly deformed tubular metallic wall fixed into a predetermined irregular exterior surface configuration.

21. A space frame as defined in claim 19 wherein a second plurality of all of said structures have more than two spaced successive joints, two successive joints of which determine defining lateral lengths in said space frame, said second plurality of structures comprising a second pair of hydroformed tubular members each defined by an irregularly outwardly deformed tubular metallic wall fixed into a predetermined irregular exterior surface configuration, said second pair of hydroformed tubular members comprising a pair of U-shaped hydroformed tubular members each having a cross portion constituting one of said cross structures and a pair of leg portions extending from opposite ends of said cross portion, said pair of U-shaped hydroformed tubular members being connected together at free ends of the pair of leg portions thereof, the connected together leg portions constituting a pair of said spaced upright structures defining said pair of rearward end pillars.

22. A space frame as defined in claim 21 wherein a third plurality of all of said structures have more than two spaced successive joints, two successive joint of which determine defining lateral lengths in said space frame, said third plurality of structures comprising a third pair of hydroformed tubular members each defined by an irregularly outwardly deformed tubular metallic wall fixed into a predetermined irregular exterior surface configuration, said third pair of hydroformed tubular members comprising a pair of longitudinally spaced inverted U-shaped hydroformed tubular members, each including a cross portion constituting one of said cross structures and a pair of leg portions extending downwardly from opposite ends of said cross portion, said pairs of leg portions constituting pairs of laterally spaced upright pillar defining structures.

23. A space frame as defined in claim 21 wherein said pair of side rail structures comprise a pair of hydroformed members each being defined by an irregularly outwardly deformed tubular metallic wall fixed into a predetermined irregular exterior surface configuration.

24. A space frame as defined in claim 19 wherein a second plurality of all of said structures have more than two spaced successive joints, two successive joints of which determine a defining lateral length in said space frame, said second plurality of structures comprising a second pair of hydroformed tubular members each defined by an irregularly outwardly deformed tubular metallic wall fixed into a predetermined irregular exterior surface configuration, said second pair of hydroformed tubular members comprising a pair of longitudinally spaced inverted U-shaped hydroformed tubular members, each including a cross portion constituting one of said cross structures and a pair of leg portions extending downwardly from opposite ends of said cross portion, said pairs of leg portions constituting pairs of laterally spaced upright pillar defining structures.

25. A space frame as defined in claim 24 wherein said pair of side rail structures comprises a pair of hydroformed members each being defined by an irregularly outwardly deformed tubular metallic wall fixed into a predetermined irregular exterior surface configuration.

26. A space frame as defined in claim 19 wherein all of said structures and said front structural assembly are formed of hydroformed tubular members each being defined by an irregularly outwardly deformed tubular metallic wall fixed into a predetermined irregular exterior surface configuration.

* * * * *